United States Patent [19]

Atsushi

[11] Patent Number: 5,706,459
[45] Date of Patent: Jan. 6, 1998

[54] PROCESSOR HAVING A VARIABLE NUMBER OF STAGES IN A PIPELINE

[75] Inventor: Sakurai Atsushi, Kawasaki, Japan

[73] Assignee: Fujitsu Limited, Kawasaki, Japan

[21] Appl. No.: 367,494

[22] Filed: Dec. 30, 1994

[30] Foreign Application Priority Data

Jan. 6, 1994 [JP] Japan .................... 6-000255
Jan. 6, 1994 [JP] Japan .................... 6-000256

[51] Int. Cl.⁶ .................................. G06F 9/38
[52] U.S. Cl. ........................... 395/376; 395/800
[58] Field of Search .................... 395/376, 800, 395/381

[56] References Cited

U.S. PATENT DOCUMENTS

| | | | |
|---|---|---|---|
| 4,454,578 | 6/1984 | Matsumoto et al. | 395/375 |
| 4,872,111 | 10/1989 | Daberkow et al. | 395/250 |
| 4,912,635 | 3/1990 | Nishimukai et al. | 395/375 |
| 4,967,338 | 10/1990 | Kiyohara et al. | 395/375 |

*Primary Examiner*—David Y. Eng
*Attorney, Agent, or Firm*—Staas & Halsey

[57] ABSTRACT

A processor, having a variable number of stages in a pipeline, splits, during a pipeline process, an instruction fetch stage or a memory access stage during an instruction fetch or a memory access of operand data for an external memory. This enables a simultaneous operation for both inputting instruction data and outputting an address for a fetch of the succeeding instruction data or a simultaneous operation for both inputting operand data and outputting an address for an access of the succeeding operand data.

43 Claims, 36 Drawing Sheets

FIG. 3
PRIOR ART
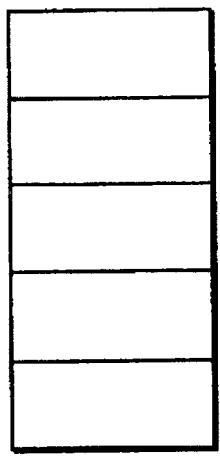
STEP 3: EXCEPTION PROCESS HANDLER EXECUTION
FIG. 4
PRIOR ART
BRANCH INSTRUCTION
DELAY SLOT
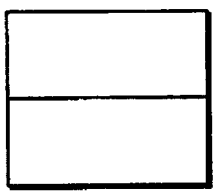
STEP 4
BRANCH TARGET
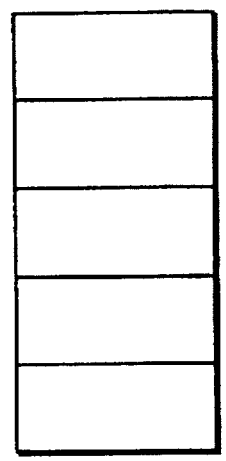
STEP 5
SEQUENCE INSTRUCTION
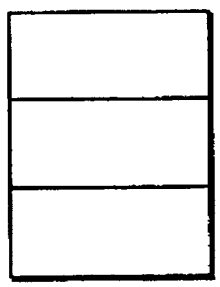

STEP 3: EXCEPTION PROCESS HANDLER EXECUTION

DELAYED BRANCH INSTRUCTION
DELAY SLOT
STEP 4: BRANCH TARGET
SEQUENCE INSTRUCTION

PROCESSOR HAVING A VARIABLE NUMBER OF STAGES IN A PIPELINE

BACKGROUND OF THE INVENTION

1. Field of the Invention

This invention pertains to a central processing unit for use in a computer system, and more particularly, to a microprocessor having a pipeline controller.

2. Description of the Related Arts

Recent processors operating on a RISC (Reduced Instruction Set Computer) basis have a pipeline architecture without an exception. Such a processor is called a RISC pipeline processor.

A data hazard, a structural hazard and a control hazard are three [3] factors preventing the performance of a RISC pipeline processor from being improved, which must be eliminated for expediting a processor operation.

It is believed that, of the functions peculiar to a RISC pipeline processor, a function called a delayed branch is effective in eliminating a control hazard.

A pipeline process is such that instructions stored at contiguous addresses in a memory are inputted continuously to a pipeline. Hence, after a branch instruction is inputted to a pipeline, instructions executed when the branch instruction does not generate a branch are inputted continuously. And when the branch instruction generates a branch, after instructions succeeding the branch instruction already inputted in the pipeline are canceled, branch target instructions are newly inputted to the pipeline. Accordingly, when the branch instruction generates a branch, a cancellation of instructions in a pipeline causes a problem of delaying a pipeline process.

A solution for this problem is known to exist, which is the use of a function of generating a branch without canceling instructions already stored in a pipeline by inputting, into a pipeline after a branch instruction, instructions originally supposed to be executed before the branch instruction but not dependent on a branch instruction.

Because this function causes other instructions to be executed after a branch instruction is executed and then branch target instructions based on a branch generated by the branch instruction to be executed, it appears that a branch instruction is delayed. Thus, this function is called a delayed branch function. Further, a branch instruction related to a delayed branch function is called a delayed branch instruction, and an instruction not dependent on a delayed branch instruction and executed after a delayed branch instruction is called a delay slot instruction.

The optimization function of a compiler executed on a RISC processor realizes a delayed branch function, namely an operation of inserting a delay slot instruction after a delayed branch instruction.

Here, when the execution of a delayed branch instruction for generating a branch has been completed, for example, in case of an exception event generated by a fault or an interruption, the execution of a delay slot instruction and a branch target instruction has not been completed yet. These instructions whose execution has not yet been completed do not have mutually contiguous storage addresses on a memory. Therefore, for executing an exception process for dealing with the generation of an exception event, and for properly resuming an original program, it is necessary to save in a stack the program counter values of both the branch target instruction and the delay slot instruction at the instant when the exception event is generated. Furthermore, the existence of a plurality of delay slot instructions requires their respective program counter values be saved in a stack.

Such a circumstance has a problem in increasing the amount of time necessary for a processor operation to shift from an original program to an exception process and from an exception process to an original program. That is, because a stack is generally formed on a main storage memory, the more the number of times for accessing a stack on a main storage memory accompanying a memory wait, the more time it takes for a memory wait, thereby delaying the process. In addition, when the processor operation shifts from an exception process to an original program, it is more complex to retrieve a plurality of program counter values and to execute instructions corresponding to the addresses specified by the plurality of program counter values, than to retrieve a singularity of a program counter value and to execute an instruction corresponding to the address specified by the singularity of a program counter value, thus rendering hardware complicated.

The above problems are explained more concretely by referring to FIG. 1 through FIG. 4.

FIG. 1 is a first one of explanatory diagrams illustrating in a four [4] part series a conventional exception process executed for an exception event generated while a delay slot instruction is being executed.

FIG. 1 assumes a case in which a delay slot instruction is an ineffective instruction, when a delay slot instruction is executed and then a branch target instruction corresponding to the delayed branch instruction is executed, after a delayed branch instruction for generating a branch is executed.

FIG. 2 is a second one of explanatory diagrams illustrating in a four [4] part series a conventional exception process executed for an exception event generated while a delay slot instruction is being executed.

FIG. 2 shows a step 1 of decoding a delay slot instruction in which a delay slot instruction is detected as an ineffective instruction.

FIG. 2 also shows a step 2 of saving in a stack the program counter values of a branch target instruction and a delay slot instruction.

FIG. 3 is a third one of explanatory diagrams illustrating in a four [4] part series a conventional exception process executed for an exception event generated while a delay slot instruction is being executed.

FIG. 3 shows a step 3 of executing an exception process handler corresponding to the generation of an ineffective instruction exception, which eliminates the cause of the exception event.

FIG. 4 is a fourth one of explanatory diagrams illustrating in a four [4] part series a conventional exception process executed for an exception event generated while a delay slot instruction is being executed.

FIG. 4 shows a step 4 of executing a delay slot instruction, after retrieving from the stack the program counter values of the branch target instruction and the delay slot instruction. Because the exception process handler has eliminated the cause of the exception event, the ineffective instruction exception does not generate another exception event.

FIG. 4 also shows a step 5 of executing a branch target instruction.

Thus, the execution of an exception process requires two [2] program counter values, i.e. that of the branch target instruction and that of the delay slot instruction, to be saved in and retrieved from a stack before and after executing the exception process.

Although the above description relates to a problem arising in an exception process when an ineffective instruction exception is detected while a delay slot instruction is being executed, a similar problem arises when any cancellation type exception other than an ineffective instruction exception is detected while a delay slot instruction is being executed. A cancellation type exception is defined as an exception event by which: the execution of an instruction (a delay slot instruction in the above example) in which an exception event is detected is once canceled; and the execution of the instruction is resumed after the execution of an exception process handler.

In such a case, the operation of writing data into a register or a memory by a delay slot instruction is canceled, upon detecting an exception event. The execution of an exception process for a cancellation type exception also requires the program counter values of the delay slot instruction and branch target instruction immediately succeeding the delay slot instruction to be saved in a stack before executing the exception process, upon detecting an exception event.

As well, a problem similar to the one described above arises, when a completion type exception is detected while a delayed branch instruction is being executed. A completion type exception is defined as an exception event by which: the execution of an instruction (a delayed branch instruction in the above example) in which an exception event is detected is completed; and the execution of an instruction succeeding the instruction in which an exception event is detected is started after the execution of an exception process handler.

In such a case, the operation of writing data into a register or a memory by a delay slot instruction is completed, upon detecting an exception event. The execution of an exception process for a completion type exception also requires the program counter values of the delay slot instruction succeeding the delayed branch instruction and the branch target instruction to be executed immediately succeeding the delayed branch instruction to be saved in a stack before executing the exception process, upon detecting an exception event.

When a completion type exception is detected upon executing the last delay slot instruction, (which is the delay slot instruction itself when there is only one [1] delay slot instruction,) such a problem as described above does not arise, because the program counter value of the branch target instruction to be executed immediately succeeding the delay slot instruction need only be saved in a stack.

When a cancellation type exception is detected upon executing a delayed branch instruction, such a problem as described above does not arise, either, because the program counter value of the delayed branch instruction need only be saved in a stack.

FIG. 5 is a circuit diagram illustrating a partial configuration of a pipeline controller for use in a conventional pipeline processor.

More specifically, FIG. 5 shows the configuration of a program counter pipeline (a PC pipeline) of a pipeline controller.

Generally, a pipeline processor is such that each of an instruction fetch module, an instruction decode module, an instruction execute module, a memory access module and a write back module jointly forms a pipeline. Each module parallelly executes its processing for a different instruction in a single instruction cycle.

A program counter value that an adder 100 (hereafter referred to as a PC_adder 100) sequentially increments by two [2] from a predetermined initial value flows successively through an instruction fetch stage program counter value retaining unit 101 (hereafter referred to as a PC_IF 101), an instruction decode stage program counter value retaining unit 102 (hereafter referred to as a PC_ID 102), an instruction execute stage program counter value retaining unit 103 (hereafter referred to as a PC_EX 103), a memory access stage program counter value retaining unit 104 (hereafter referred to as a PC_MA 104) and a write back stage program counter value retaining unit 105 (hereafter referred to as a PC_WB 105), in synchronization with a clock signal inputted via the four [4] AND gates, the AND_IF 111, the AND ID 112, the AND_EX 113 and the AND_MA 114, each having an inverter at one [1] of its two [2] input terminals not receiving the clock signal. More concretely, the PC_adder 100 sequentially increments a program counter value by two [2] through feeding back to itself (i.e. the PC_adder 100) a program counter value outputted from the PC_IF 101.

As a result, each of an instruction fetch module, an instruction decode module, an instruction execute module, a memory access module and a write back module (none of which is shown) executes its process related to an instruction specified by the program counter value retained in the corresponding one of the program counter value retaining units, i.e. the PC_IF 101, the PC_ID 102, the PC_EX 103, the PC_MA 104 and the PC_WB 105.

The instruction fetch module fetches an instruction from a memory. The instruction decode module decodes a fetched instruction. The instruction execute module executes a decoded instruction. The memory access module accesses a memory for reading from or writing into a memory operand data. The write back module writes into a register contained in the inside of a processor chip operand data obtained from the memory by the memory access module or operand data processed by the instruction execute module.

The OR gates, i.e. the OR_IF 121, the OR_ID 122 and the OR_EX 123, as well as wait signals if_wait, id_wait, ex_wait and ma_wait will be described later in detail.

A program counter pipeline as described above is necessary for retaining the program counter values of respective modules e.g. when any of the respective modules generate an exception process.

A pipeline controller may also comprise an operand pipeline for transmitting to respective modules instruction operands, in addition to the program counter pipeline.

FIG. 6 is an explanatory diagram illustrating conventional pipeline processes without a memory wait.

More specifically, FIG. 6 shows how an instruction fetch module, an instruction decode module, an instruction execute module, a memory access module and a write back module (none of which are shown here) parallelly execute respective execution stages corresponding to instructions A through D in each of instruction cycles 1 through 8.

In instruction cycle 1, the instruction fetch module (not shown) executes an instruction fetch stage (hereafter referred to as an IF stage) for instruction A.

In instruction cycle 2, the instruction decode module (not shown) executes an instruction decode stage (hereafter referred to as an ID stage) for instruction A, and the instruction fetch module executes an IF stage for instruction B succeeding instruction A.

In instruction cycle 3, the instruction execute module (not shown) executes an instruction execute stage (hereafter referred to as an EX stage) for instruction A, the instruction decode module executes an ID stage for instruction B, and the instruction fetch module executes an IF stage for instruction C succeeding instruction B.

In instruction cycle 4, the memory access module (not shown) executes a memory access stage (hereafter referred to as an MA stage) for instruction A, the instruction execute module executes an EX stage for instruction B, the instruction decode module executes an ID stage for instruction C, and the instruction fetch module executes an IF stage for instruction D succeeding instruction C.

In instruction cycle 5, the write back module (not shown) executes a write back stage (hereafter referred to as a WB stage) for instruction A, the memory access module executes an MA stage for instruction B, the instruction execute module executes an EX stage for instruction C, and the instruction decode module executes an ID stage for instruction D. As well, the instruction fetch module becomes free to start executing an IF stage for instruction E (not shown) succeeding instruction D.

In instruction cycle 6, the write back module executes a WB stage for instruction B, the memory access module executes an MA stage for instruction C, and the instruction execute module executes an EX stage for instruction D. As well, the instruction fetch module becomes free to start executing an IF stage for instruction F (not shown) succeeding instruction E.

In instruction cycle 7, the write back module executes a WB stage for instruction C, and the memory access module executes an MA stage for instruction D. As well, the instruction fetch module becomes free to start executing an IF stage for instruction G (not shown) succeeding instruction F.

In instruction cycle 8, the write back module executes a WB stage for instruction D. As well, the instruction fetch module becomes free to start executing an IF stage for instruction H (not shown) succeeding instruction G.

The execution of an IF stage and an MA stage causes the above pipeline process to perform a data read/write operation to a memory. Such a memory could be either one contained in the inside of a processor chip or one connected to the outside of a processor chip, which are hereafter referred to as an internal memory and an external memory, respectively.

Because it is generally difficult to access an external memory at a time interval equivalent to a pipeline pitch (= an instruction cycle), a memory wait arises.

FIG. 7 is an explanatory diagram illustrating conventional pipeline processes with a memory wait.

Because the operation in case that an IF stage generates a memory wait is almost identical to the operation in case that an MA stage generates a memory wait, FIG. 7 shows a case in which an MA stage generates a memory wait, for the sake of explanatory simplicity. FIG. 7 further shows that IFw, IDw, EXw and MAw indicate a memory wait, upon executing an IF stage, an ID stage, an EX stage and an MA stage, respectively.

When a memory wait arises in the MA stage for instruction A, the MA stage supposed to end in instruction cycle 4 is repeated in instruction cycle 5 due to the memory wait. Because instruction cycle 4 aborts the execution of the MA stage for instruction A, instruction cycle 5 repeats the execution of respective stages in instruction cycle 4 for the successive instruction stream. That is, instruction cycle 5 executes the MA stage for instruction A, the EX stage for instruction B, the ID stage for instruction C and the IF stage for instruction D, which are begun to be executed but aborted in instruction cycle 4.

The structure shown in FIG. 5 realizes the above operation. A memory access wait signal ma_wait asserted at the timing shown in FIG. 7 turns off the four [4] AND gates, the AND_MA 114, the AND_EX 113, the AND_ID 112 and the AND_IF 111 via the three [3] OR gates, the OR_EX 123, the OR_ID 122 and the OR_IF 121. Since this prevents instruction cycle 5 from receiving the clock signal, each of the PC_MA 104, the PC_EX 103, the PC_ID 102 and the PC_IF 101 maintains its status of instruction 4.

Thus, the entire pipeline has a wait time having a duration equivalent to one [1] instruction cycle, thereby delaying their currently executed processes for that amount of time.

This is evident from a comparison between FIG. 6 illustrating pipeline processes without a memory wait and FIG. 7 illustrating pipeline processes with a memory wait. Although instruction cycle 6 completes the execution e.g. of instruction B when a memory wait does not arise as shown in FIG. 6, instruction cycle 7, instead of instruction cycle 6, completes the execution of instruction B when a memory wait does arise as shown in FIG. 7.

A memory wait arising in the IF stage asserts an instruction fetch wait signal if_wait, thereby turning off one [1] AND gate, the AND_IF 111 via one [1] OR gate, the OR_IF 121. This sets the PC_IF 101 in a wait status.

As well, a memory wait may arise in the ID stage or the EX stage.

When a wait arises in the ID stage, a multi-cycle wait generated by the execution of a multi-cycle instruction such as a multiplication instruction must be considered.

A memory wait arising in the ID stage asserts an instruction decode wait signal id_wait, thereby turning off two [2] AND gates, the AND_IF 111 and the AND_ID 112 via one [1] OR gate, the OR_ID 122. This sets the $PC_{13}$ IF 101 and the PC_ID 102 in a wait status.

When a wait arises in the EX stage, a load use interlock generated when a next instruction operates an operand loaded from a memory must be considered.

A memory wait arising in the EX stage asserts an instruction decode wait signal $ex_{13}$ wait, thereby turning off three [3] AND gates the AND_IF 111, the AND_ID 112 and the AND_EX 113 via one [1] OR gate, the OR_EX 123. This sets the PC_IF 101, the PC_ID 102 and the PC_EX 103 in a wait status.

FIG. 8 is an explanatory diagram illustrating conventional pipeline processes with a memory wait in the MA stage of every instruction.

More specifically, FIG. 8 shows a case in which the whole pipeline processes experience a conspicuous delay.

Generally, a processor chip internally generates an operand address for accessing an external memory, but a constant time lag exists until the external memory recognizes the operand address. The constant time lag is the sum of a signal transmission delay in a bus and a bus connection circuit within the processor chip, a signal transmission delay in an output buffer driver circuit, a signal processing delay in an output buffer circuit itself for driving an external terminal of the processor chip having a large capacitance, and a signal transmission delay in an address bus outside of the processor chip due to its wiring capacitance and resistance.

As well, another time lag exists due to a signal transmission delay from the instant at which the external memory outputs operand data until the instant at which the processor chip receives the operand data.

FIG. 9 is an explanatory diagram illustrating conventional pipeline processes with one [1] wait, upon accessing an external address bus and an external data bus.

The processor chip must internally determine accessed operand data before the completion of the MA stage. Therefore, assuming the time lag when the processor chip accesses the external memory to be a half of the instruction cycle each for the operand address and the operand data, even if a memory wait (one [1] wait) having a duration of one [1] instruction cycle is inserted in the MA stage of each instruction for accessing the external memory, as shown in (a) and (b) of FIG. 9, the effective access time for the external memory is one [1] instruction cycle.

That is, as described earlier, even though one [1] wait is inserted in the MA stage, since it is difficult to access the external memory at a time interval of a pipeline pitch (=one [1] instruction cycle), because of the existence of the above time lags, the effective access time for the external memory ends up in one [1] instruction cycle.

FIG. 10 is an explanatory diagram illustrating conventional pipeline processes with two [2] waits, upon accessing an external address bus and an external data bus.

As explained in the description of FIG. 9, conventional pipeline processes require a further memory wait. For instance, by inserting two [2] waits in the MA stage for each instruction for accessing the external memory, i.e. by extending the duration for the MA stage to three [3] instruction cycles, as shown in (a) and (b) of FIG. 10, the effective access time for the external memory becomes two [2] instruction cycles.

Such a problem occurs not only in the MA stage but also in the IF stage.

To summarize the above, the prior art has a problem in increasing the processing delay of all the pipeline processes, because the signal delays in the interface between a processor chip and an external memory reduce the effective access time for accessing the external memory in pipeline processes, which necessitates an extra memory wait for compensating the

SUMMARY OF THE INVENTION

This invention aims at preventing the exception process from being delayed, the control from becoming complicated, and hardware from becoming complicated, by enabling the saved program counter value to be singled, when a completion type exception is detected during the execution of a delayed branch instruction or when a cancellation type is detected during the execution of a delay slot instruction.

This invention also aims at preventing a signal lag due to an interface between the inside and the outside of a processor chip from negatively affecting the effective access time upon accessing an external memory for pipeline processes.

This invention structures pipeline processes as follows: Upon decoding a delay slot instruction, if the delay slot instruction is detected to be an ineffective instruction, the program counter value of a delayed branch instruction immediately preceding the delay slot instruction is saved in a stack. Upon completing an exception process, the program counter value of a delayed branch instruction is retrieved from the stack, thereby re-executing the delayed branch instruction.

This invention also structures pipeline processes as follows: Upon executing an instruction fetch on an external memory, an instruction fetch stage is split, thereby concurrently fetching an instruction data and outputting addresses for a next instruction fetch. Upon executing an memory access to operand data, a memory access stage is split, thereby concurrently accessing operand data and outputting addresses for reading out next operand data. These split stages reduce a wait entering an instruction cycle.

BRIEF DESCRIPTION OF THE DRAWINGS

One of an ordinary skill in the art can easily understand additional features and objects of this invention from the description of the preferred embodiments and the attached drawings. In the drawings:

FIG. 3 is a third one of explanatory diagrams illustrating in a four [4] part series a conventional exception process executed for an exception generated while a delay slot instruction is being executed;

FIG. 4 is a fourth one of explanatory diagrams illustrating in a four [4] part series a conventional exception process executed for an exception generated while a delay slot instruction is being executed;

DESCRIPTION OF THE PREFERRED EMBODIMENTS

Figure 11:
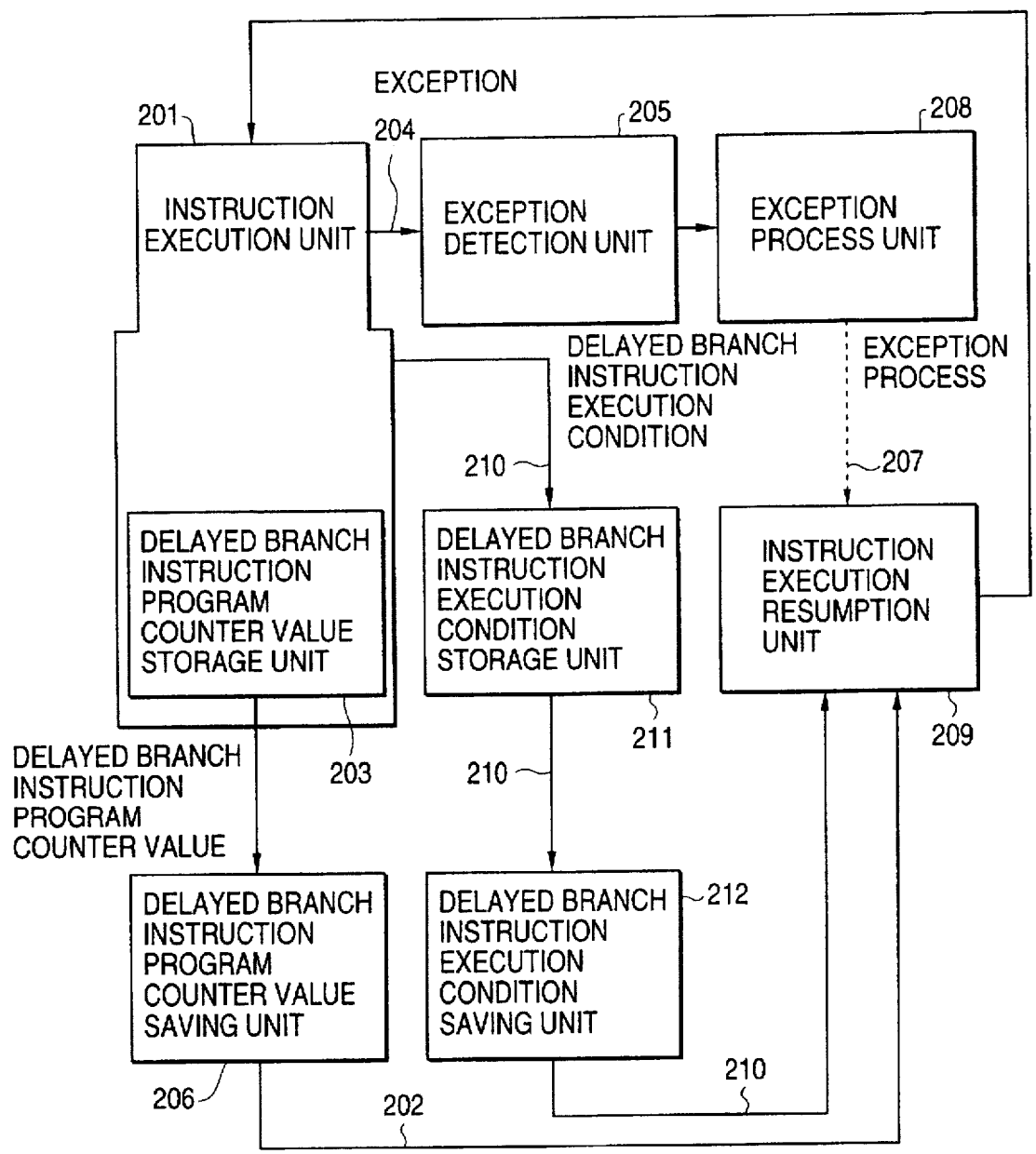
FIG. 11 is a block diagram illustrating the global configuration of a first embodiment of this invention.

FIG. 11 is a block diagram illustrating global configuration of a first embodiment.

An instruction execution unit 201 executes an instruction and includes the following function: After executing a delayed branch instruction which is a branch instruction, the instruction execution unit 201 executes a delay slot instruction which is a sequence instruction succeeding the delayed branch instruction; and when the delayed branch instruction generates a branch, the instruction execution unit 201 executes a branch target instruction after executing a delay slot instruction.

A pipeline processor is an entire CPU internally having a pipeline structure. It has the instruction execution unit 201 comprising, for example, an instruction pipeline (formed by instruction pipeline tags) for storing in each of the pipeline stages a corresponding instruction sequentially shifted in synchronization with the progress of pipeline stages, a program counter pipeline (a PC pipeline) for storing in each of the pipeline stages a corresponding program counter value sequentially shifted in synchronization with the progress of pipeline stages, and a pipeline process module for executing a process for the instruction (stored in the instruction pipeline) corresponding to each of the pipeline stages in synchronization with the progress of pipeline stages.

Here, the pipeline process module comprises an instruction fetch module, an instruction decode module, an instruction execute module, a memory access module and a write back module, for example.

A delayed branch instruction program counter value storage unit 203 provided e.g. in the program counter pipeline within the instruction execution unit 201 stores a delayed branch instruction program counter value 202.

An exception detection unit 205 detects at least one [1] exception 204 which is either or both of a completion type exception that may be generated while executing the delayed branch instruction and a cancellation type exception that may be generated while executing the delay slot instruction. An exception 204 may be an instruction break exception that is detected when the program counter value of an instruction being fetched matches a predetermined break point value, an ineffective instruction exception that is detected when an instruction being decoded is an ineffective instruction, or an operand access exception that is detected when the address or data of an operand used in an instruction being executed matches a predetermined break point value.

A delayed branch instruction program counter value saving unit 206 saves the delayed branch instruction program counter value 202 by reading it out from the delayed branch instruction program counter value storage unit 203 provided in the program counter pipeline in the instruction execution unit 201, when the exception detection unit 205 detects at least one [1] exception 204 which is either or both of a completion type exception that may be generated while executing the delayed branch instruction and a cancellation type exception that may be generated while executing the delay slot instruction. The delayed branch instruction program counter value saving unit 206 comprises a stack pointer and a stack which is an address area on a memory the stack pointer specifies.

An exception process unit 208 invokes an exception process 207 corresponding to the type of an exception 204 detected by the exception detection unit 205.

Upon completing the exception process 207 invoked by the exception process unit 208 depending on whether the exception 204 is a completion type exception or a cancellation type exception, an instruction execution resumption unit 209 retrieves the delayed branch instruction program counter value 202 saved by the delayed branch instruction program counter value saving unit 206, thereby having the instruction execution unit 201 resume the execution of instructions from the delayed branch instruction.

After retrieving the delayed branch instruction program counter value 202 of the delayed branch instruction, the instruction execution resumption unit 209 has the instruction execution unit 201 reexecute the delayed branch instruction and then a delay slot instruction, followed by either a string of sequence instructions succeeding the delay slot instruction or a string of branch target instructions corresponding to the delayed branch instruction.

More specifically, after retrieving the delayed branch instruction program counter value 202 and the delayed branch instruction execution condition 210, by setting the delayed branch instruction program counter value 202 in the program counter pipeline in the instruction execution unit 201, the instruction execution resumption unit 209 has the instruction execution unit 201 resume the execution of pipeline processes.

This invention may further add to the above configuration a delayed branch instruction execution condition storage unit 211 and a delayed branch instruction execution condition saving unit 212.

The delayed branch instruction execution condition storage unit 211 stores the delayed branch instruction execution condition 210. The delayed branch instruction execution condition storage unit 211 may be a register for storing a processor status flag.

The delayed branch instruction execution condition saving unit 212 saves the delayed branch instruction execution condition 210 stored in the delayed branch instruction execution condition storage unit 211, when the exception detection unit 205 detects at least one [1] exception 204 which is either or both of a completion type exception that may be generated while executing the delayed branch instruction and a cancellation type exception that may be generated while executing the delay slot instruction. As with the delayed branch instruction program counter value saving unit 206, the delayed branch instruction execution condition saving unit 212 comprises a stack pointer and a stack which is an address area on a memory the stack pointer specifies.

The instruction execution resumption unit 209 retrieves the delayed branch instruction execution condition 210 saved by the delayed branch instruction execution condition saying unit 212, as well as the delayed branch instruction program counter value 202 saved by the delayed branch instruction program counter value saving unit 206. More specifically, the instruction execution resumption unit 209 has the instruction execution unit 201 reexecute the delayed branch instruction the delayed branch instruction program counter value 202 specifies and then a delay slot instruction, followed by either a string of sequence instructions succeeding the delay slot instruction or a string of branch target instructions corresponding to the delayed branch instruction.

To summarize the above, this invention handles an exception process as follows:

The delayed branch instruction program counter value saving unit 206 saves in a stack the delayed branch instruction program counter value 202 stored in the delayed branch instruction program counter value storage unit 203, instead of two [2] program counter values, i.e. that of a branch target instruction and that of a delay slot instruction, upon initiating an exception process. The instruction execution resumption unit 209 retrieves the delayed branch instruction program counter value 202 saved in the stack and reactivates the instruction execution unit 201, upon completing the exception process.

Thus, this invention requires only one [1] program counter value to be saved.

When an exception process has different branch conditions, a delayed branch instruction may or may not generate a branch. Thus, this invention further handles an exception process as follows:

The delayed branch instruction execution condition saving unit 212 saves in a stack the delayed branch instruction execution condition 210 stored in the delayed branch instruction execution condition storage unit 211, upon initiating an exception process. The instruction execution resumption unit 209 retrieves the delayed branch instruction execution condition 210 saved in the stack and reactivates the instruction execution unit 201, upon completing the exception process.

Because the delayed branch instruction execution condition saving unit 212 saves the delayed branch instruction execution condition 210 in a stack as one [1] of processor status flags generally saved upon initiating an exception process, it does not increase a processing load to save the delayed branch instruction execution condition 210.

The first embodiment of this invention is described below in further detail with reference to other attached drawings.

Figure 12:
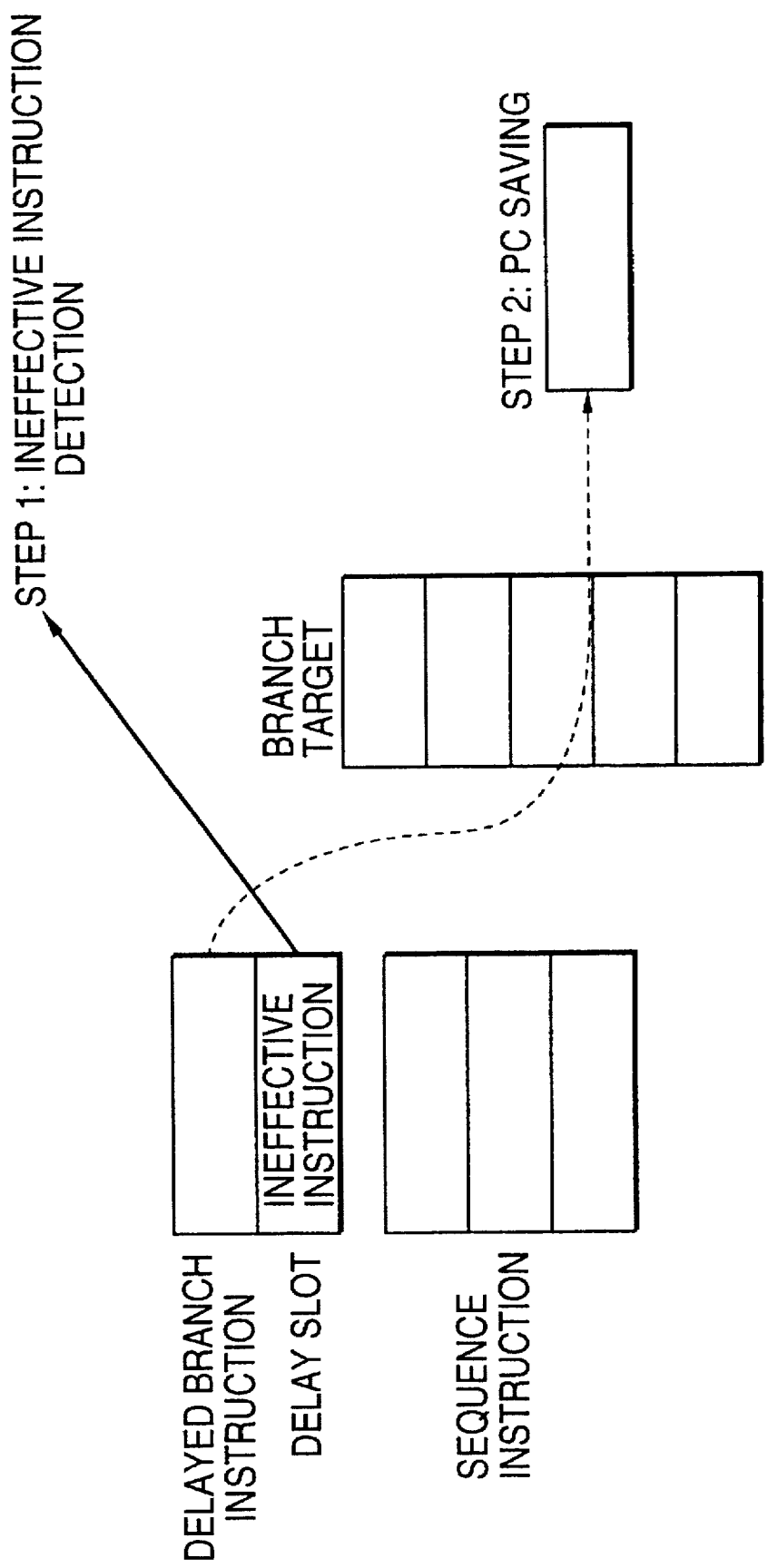
FIG. 12 is a first one of explanatory diagrams illustrating in a three [3] part series an invented exception process executed for an exception generated while a delay slot instruction is being executed.

FIG. 12 is a first one of explanatory diagrams illustrating in a three [3] part series an invented exception process executed for an exception generated while a delay slot instruction is being decoded.

Figure 1:
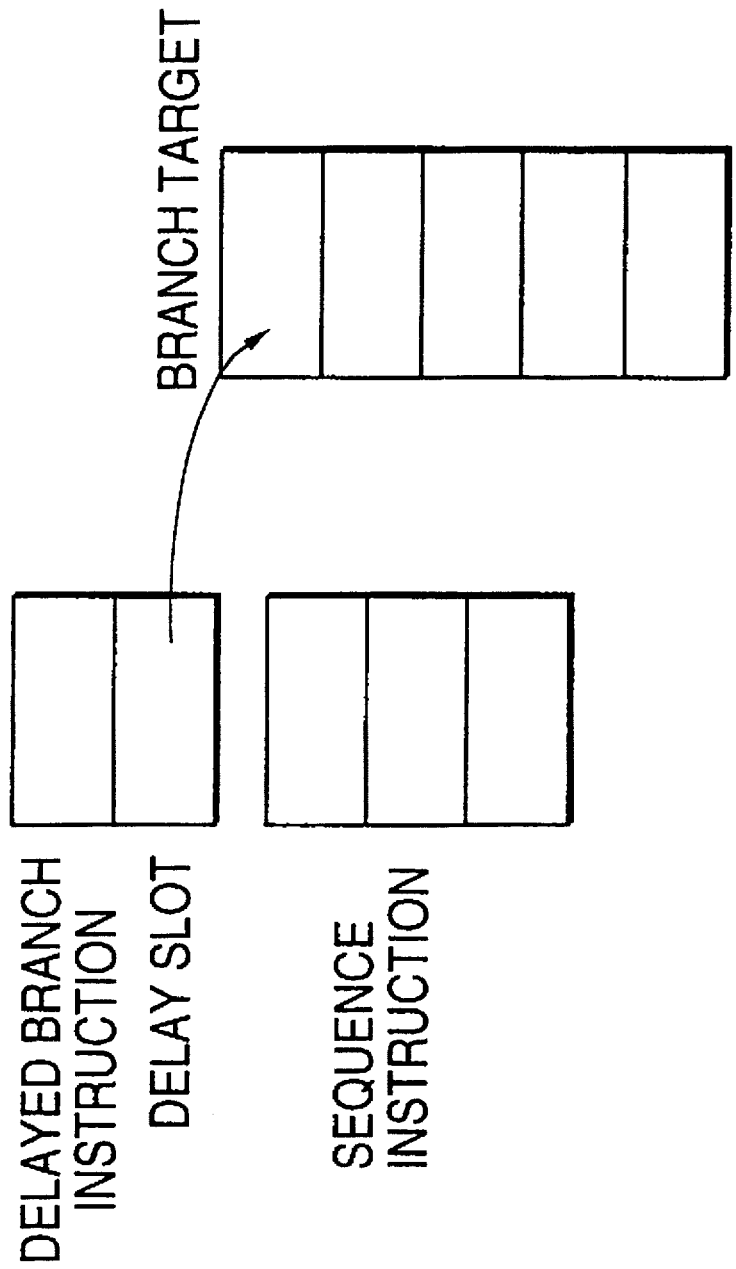
FIG. 1 is a first one of explanatory diagrams illustrating in a four [4] part series a conventional exception process executed for an exception generated while a delay slot instruction is being executed.
Figure 2:
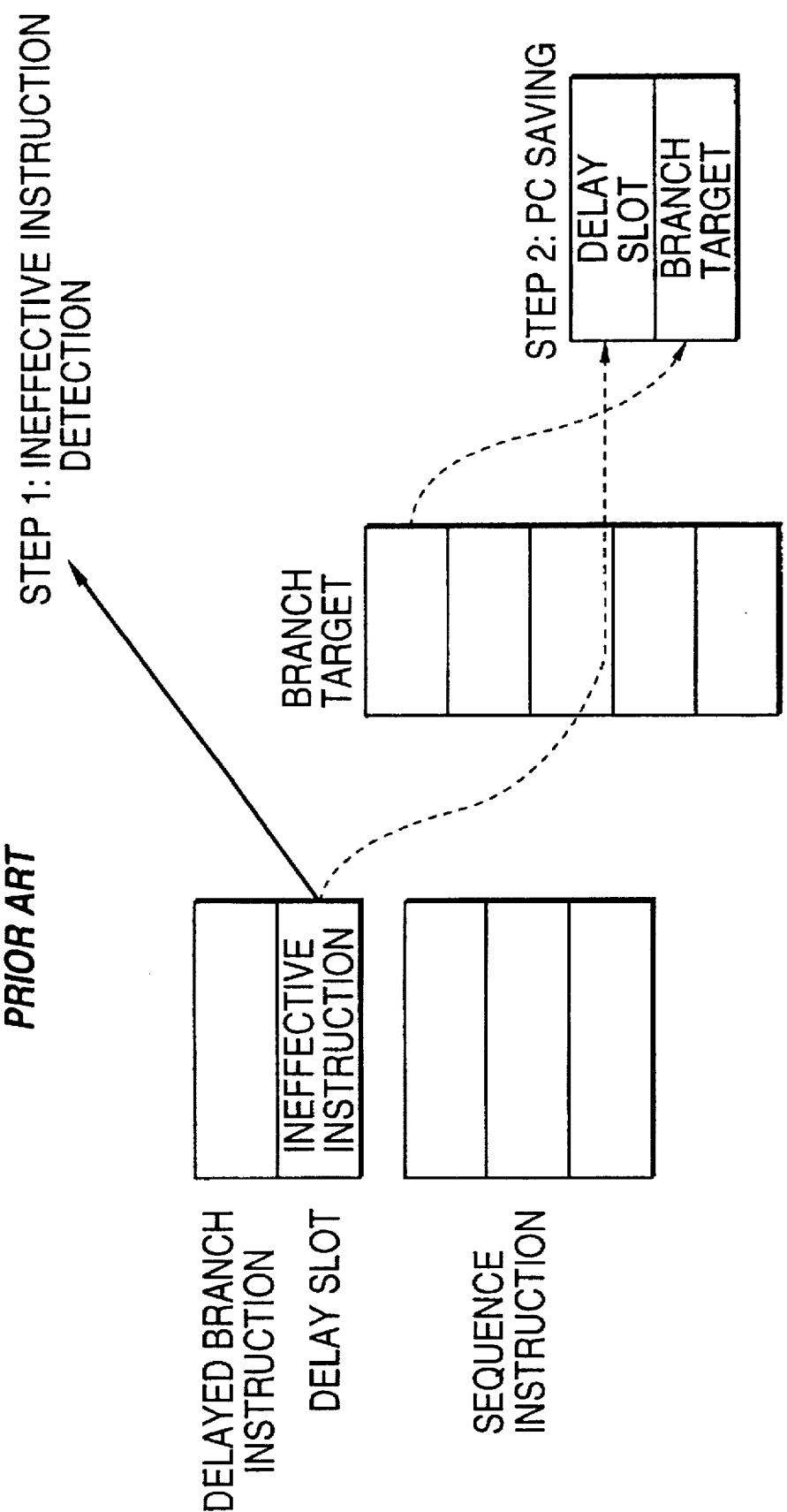
FIG. 2 is a second one of explanatory diagrams illustrating in a four [4] part series a conventional exception process executed for an exception generated while a delay slot instruction is being executed.
Figure 5:
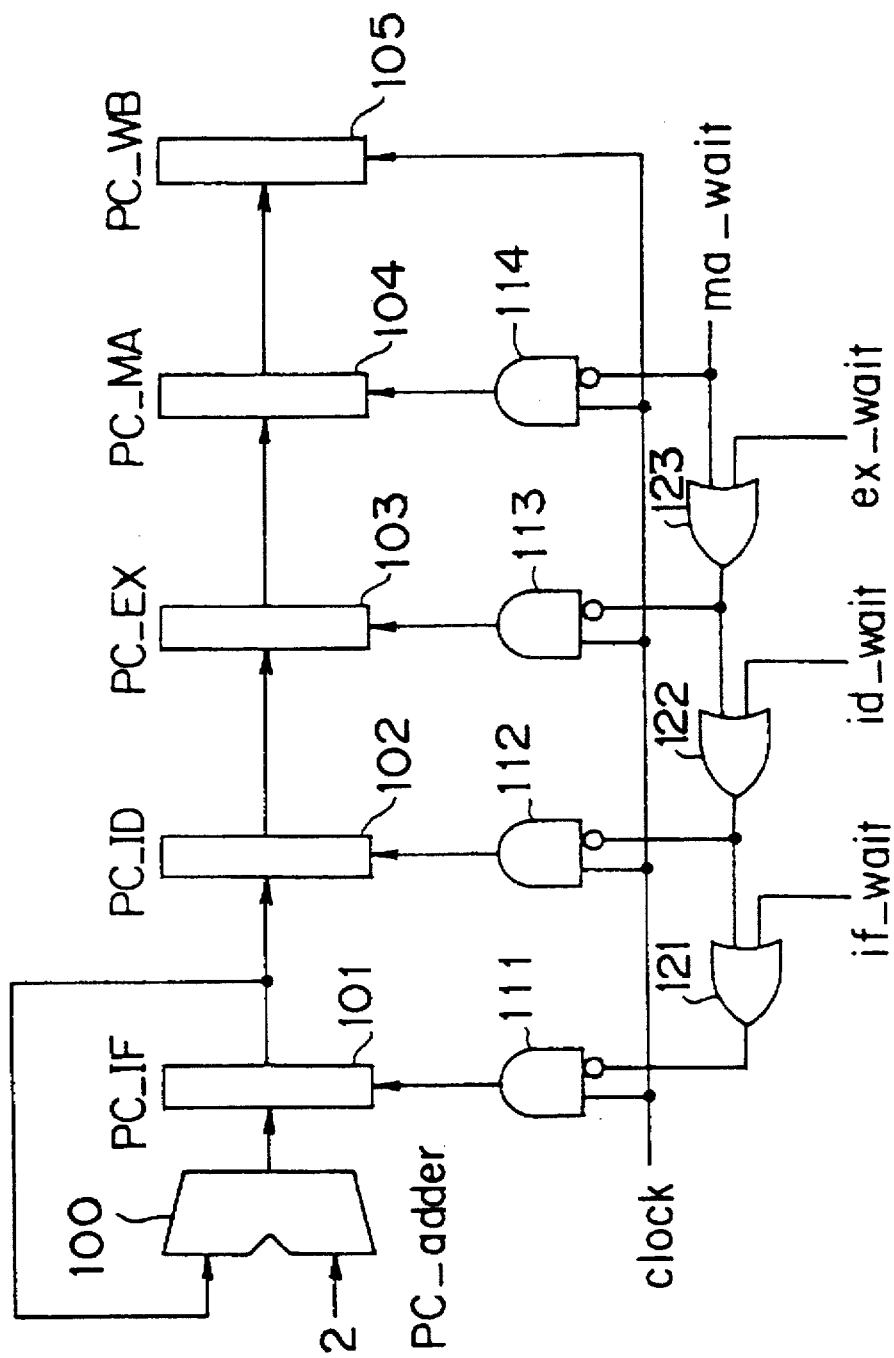
FIG. 5 is a circuit diagram illustrating a partial configuration of a pipeline controller for use in a conventional pipeline processor.

As with the case shown in FIG. 1, FIG. 12 assumes a case in which a delay slot instruction is an ineffective instruction, where, after a delayed branch instruction for generating a branch is executed, a delay slot instruction is executed, and then a branch target instruction corresponding to the delayed branch instruction is executed.

FIG. 12 shows a step 1 of decoding a delay slot instruction in which a delay slot instruction is detected as an ineffective instruction.

FIG. 12 also shows a step 2 of saving in a stack the delayed branch instruction program counter value 202, instead of the program counter values of a branch target instruction and a delay slot instruction as in a prior art.

Figure 13:
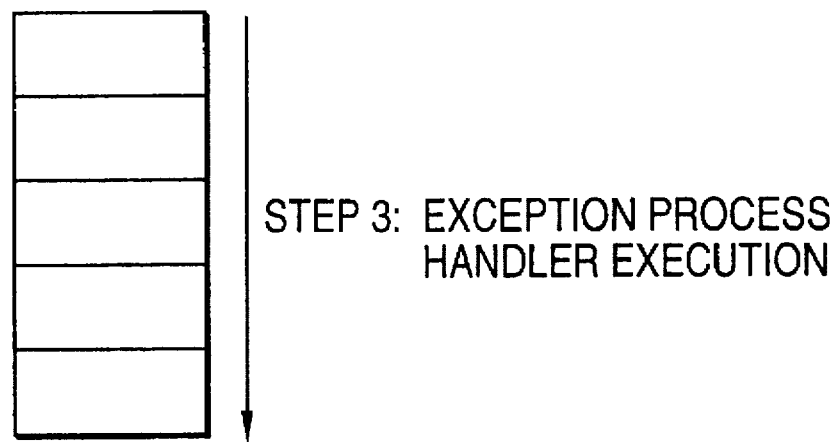
FIG. 13 is a second one of explanatory diagrams illustrating in a three [3] part series an invented exception process executed for an exception generated while a delay slot instruction is being executed.

FIG. 13 is a second one of explanatory diagrams illustrating in a three [3] part series an invented exception process executed for an exception generated while a delay slot instruction is being decoded.

FIG. 13 shows a step 3 of executing an exception process handler corresponding to a generated exception of an ineffective instruction, thereby eliminating the cause of the exception.

Figure 14:
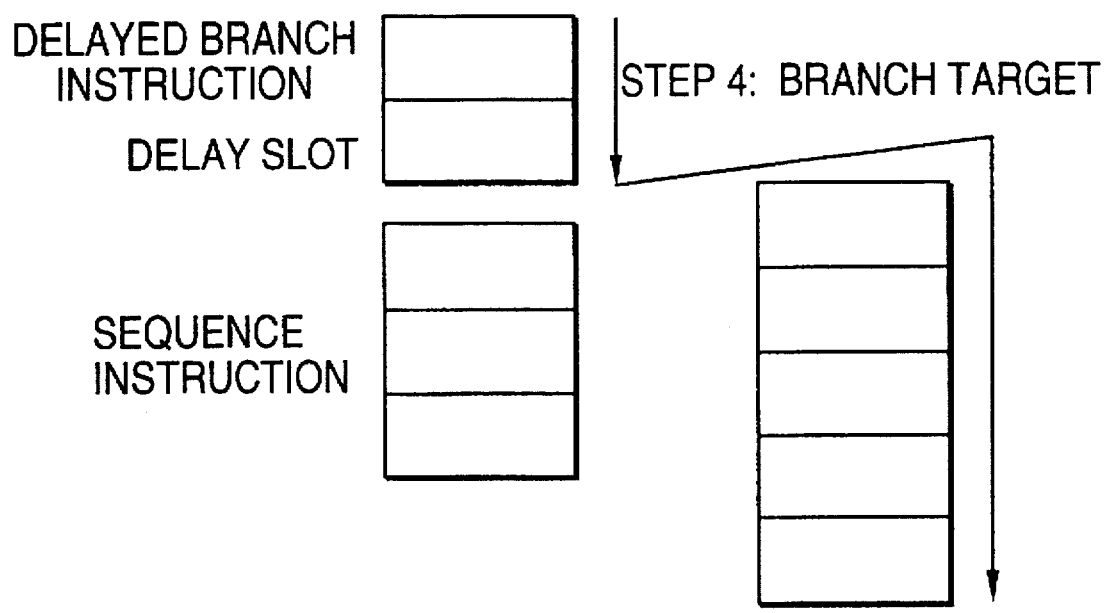
FIG. 14 is a third one of explanatory diagrams illustrating in a three [3] part series an invented exception process executed for an exception generated while a delay slot instruction is being executed.

FIG. 14 is a third one of explanatory diagrams illustrating in a three [3] part series an invented exception process executed for an exception generated while a delay slot instruction is being decoded.

FIG. 14 shows a step 4 of reexecuting a delayed branch instruction, after retrieving from the stack the delayed branch instruction program counter value 202, and then executing a delay slot instruction and a branch target instruction.

Accordingly, because this invention causes the instruction execution unit 201 to resume executing a delayed branch instruction instead of a delay slot instruction, it eliminates a problem of the two [2] program counter values, i.e. that of the branch target instruction and that of the delay slot instruction, having inconsecutive values. Thus, it requires only one [1] program counter value to be saved in a stack.

Based on the above, the concrete configuration and operation of the first embodiment of this invention is discussed below in further detail.

Figure 15:
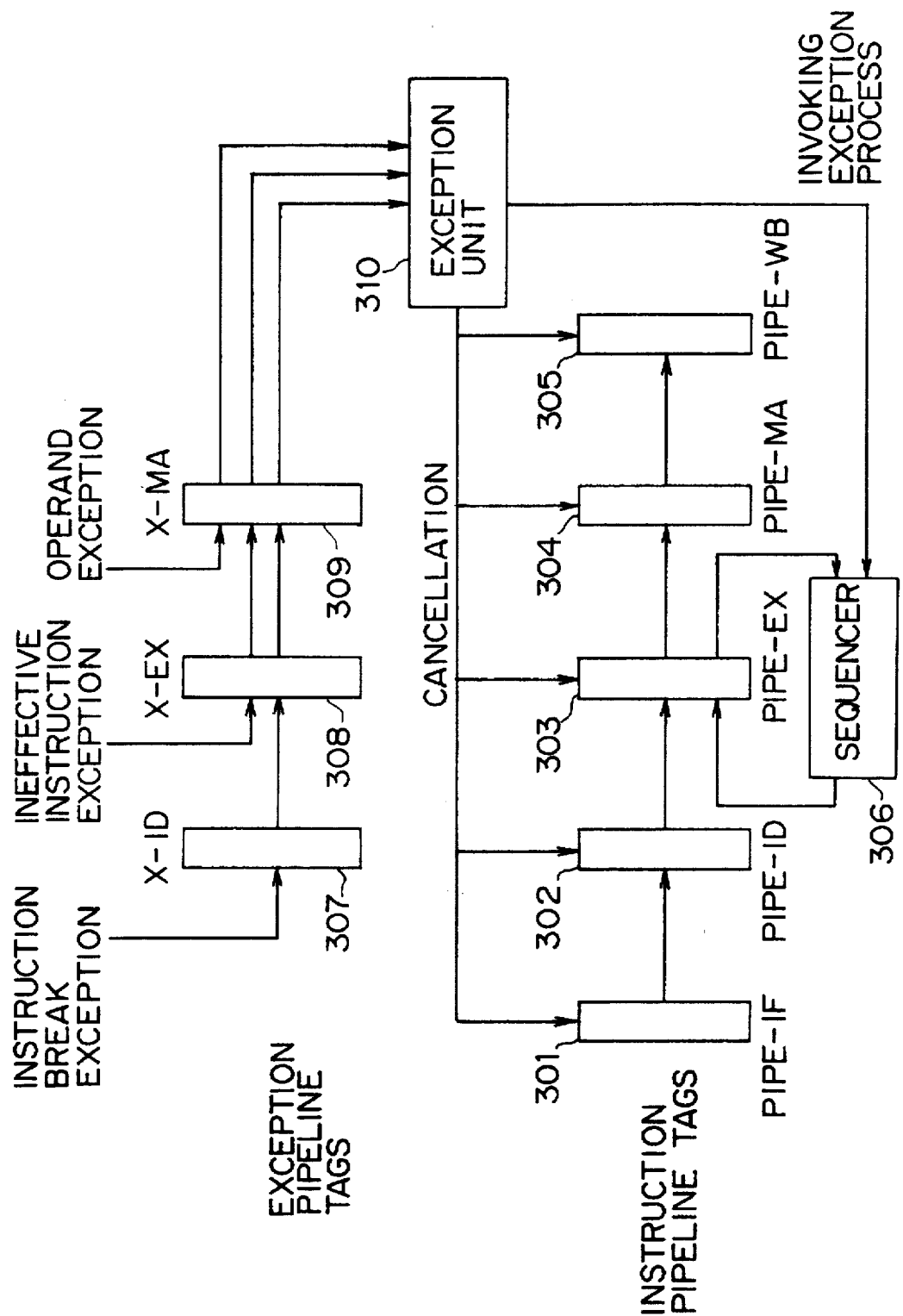
FIG. 15 is a circuit diagram illustrating the configuration of pipeline tags of a pipeline controller pursuant to the first embodiment.
Figure 16:
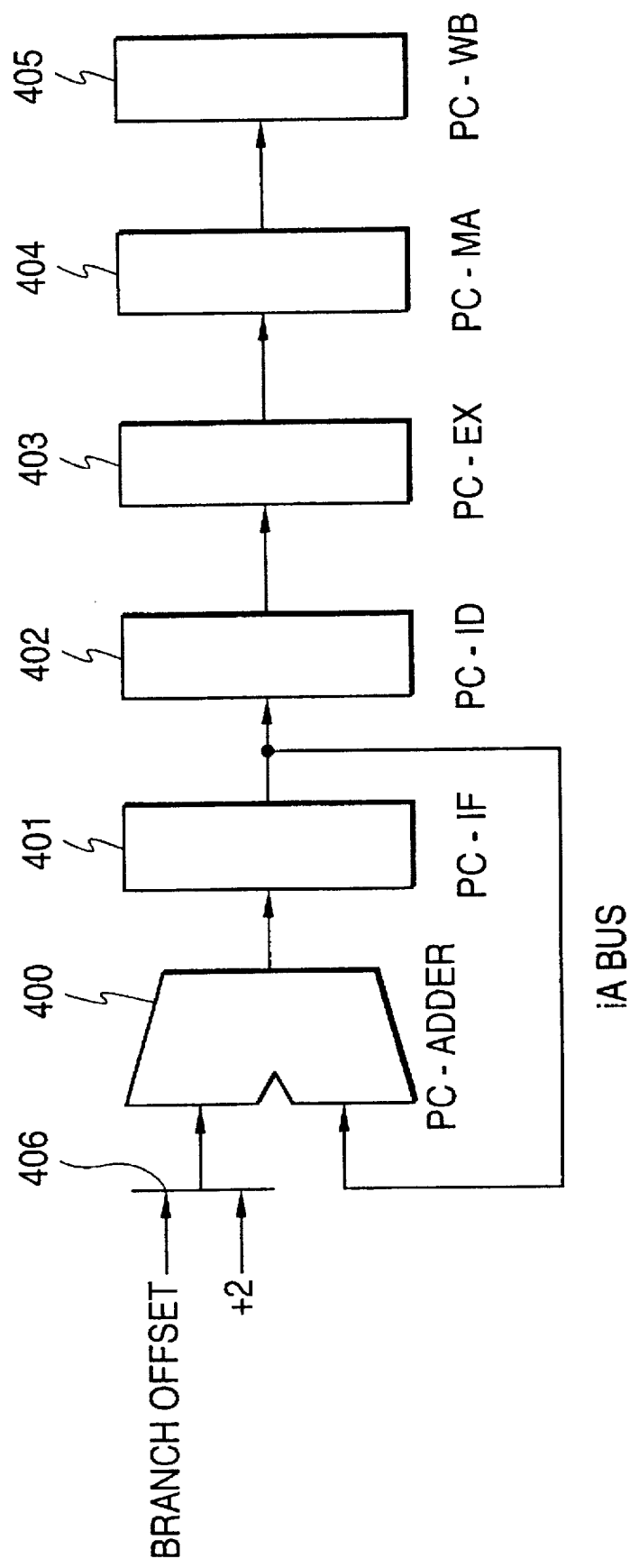
FIG. 16 is a circuit diagram illustrating the configuration of a program counter pipeline (a PC pipeline) pursuant to the first embodiment.
Figure 17:
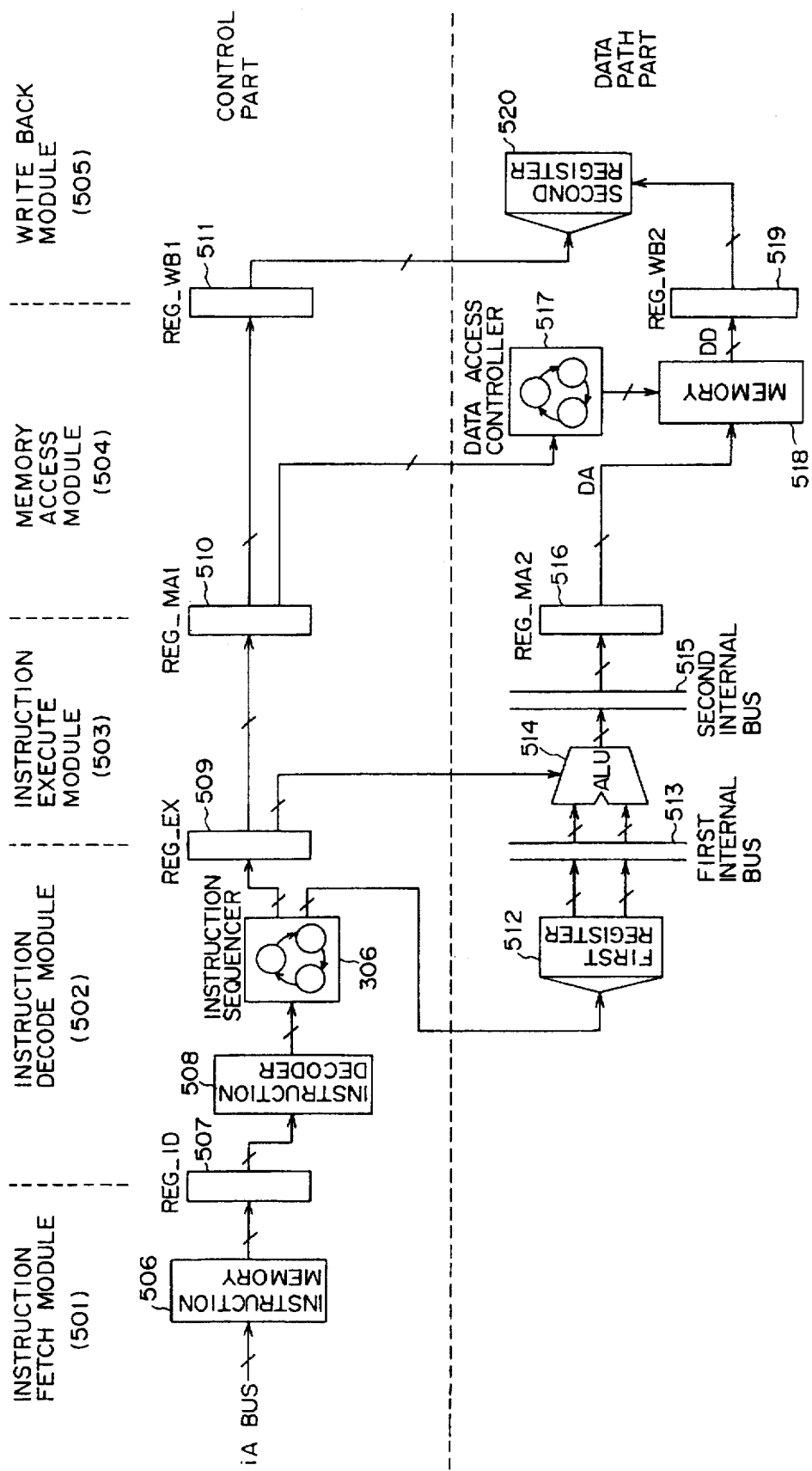
FIG. 17 is a circuit diagram illustrating the configuration of a pipeline processing unit pursuant to the first embodiment.

FIGS. 15, 16 and 17 are circuit diagrams illustrating partial configurations of a pipeline controller for use in an invented pipeline processor.

FIG. 15 is a circuit diagram illustrating the configuration of pipeline tags of a pipeline controller pursuant to the first embodiment.

An instruction fetch stage instruction pipeline tag 301 (hereafter referred to as a PIPE-IF 301), an instruction decode stage instruction pipeline tag 302 (hereafter referred to as a PIPE-ID 302), an instruction execute stage instruction pipeline tag 303 (hereafter referred to as a PIPE-EX 303), a memory access stage instruction pipeline tag 304 (hereafter referred to as a PIPE-MA 304), and a write back stage instruction pipeline tag 305 (hereafter referred to as a PIPE-WB 305) sequentially shift an instruction fetched from a memory, in synchronization with a clock signal not specifically shown.

An exception unit 310 receives an instruction break' exception detected in the instruction fetch stage via an instruction decode stage exception pipeline tag 307 (hereafter referred to as an X-ID 307), an ineffective instruction exception detected in the instruction decode stage via an instruction execute stage exception pipeline tag (hereafter referred to as an X-EX 308) and an operand access exception detected in the instruction execute stage via a memory access stage exception pipeline tag 309 (hereafter referred to as an X-MA 309).

The exception unit 310, based on an exception event read out from the X-MA 309, cancels instructions stored in the instruction pipeline tags, i.e. the PIPE-IF 301, the PIPE-ID 302, the PIPE-EX 303, the PIPE-MA 304 and the PIPE-WB 305. More specifically, the exception unit 310 has the exception pipeline tags, the X-ID 307, the X-EX 308 and the X-MA 309 turn respective ineffective instruction bits to "1".

The exception unit 310 also instructs an instruction sequencer 306 to invoke an exception process, which will be described later. In addition, the instruction sequencer 306 has the PIPE-EX 303 retain an instruction for plural instruction cycles for executing a multi-instruction cycle operation such as a multiplication instruction.

FIG. 16 is a circuit diagram illustrating the configuration of a program counter pipeline (a PC pipeline) pursuant to the first embodiment.

An instruction fetch stage program counter value retaining unit 401 (hereafter referred to as a PC_IF 401), an instruction decode stage program counter value retaining unit 402 (hereafter referred to as a PC_ID 402), an instruction execute stage program counter value retaining unit 403 (hereafter referred to as a PC_EX 403), a memory access stage program counter value retaining unit 404 (hereafter referred to as a PC_MA 404), and a write back stage program counter value retaining unit 405 (hereafter referred to as a PC_WB 405) sequentially shift, in synchronization with a clock signal (not shown), a program counter value having a predetermined initial value, supplied via a multiplexer MUX 406 and incremented by two [2] by an adder 400 (hereafter referred to as a PC_adder 400).

An input of an a program counter value from the PC_IF 401 back into the PC_adder 400 causes a program counter value to be sequentially incremented.

Upon executing a branch instruction, the PC_adder 400 receives via the multiplexer MUX 406 a branch offset address obtained by an instruction decode module 502 as a result of decoding a branch instruction and accessing a register. Consequently, the PC_adder 400 calculates the address of a branch target instruction by adding the above branch offset address to the current program counter value outputted from the PC_IF 401.

FIG. 17 is a circuit diagram illustrating the configuration of a pipeline processing unit pursuant to the first embodiment.

By shifting a control signal among modules at a timing specified by a clock signal (not shown), an instruction fetch module 501, an instruction decode module 502, an instruction execute module 503, a memory access module 504 and a write back module 505 respectively perform processes (described later) related to instructions stored in the instruction pipeline tags, i.e. the PIPE-IF 301, the PIPE-ID 302, the PIPE-EX 303, the PIPE-MA 304 and the PIPE-WB 305 shown in FIG. 15, by referring to the program counter values stored in the program counter value retaining units, i.e. the PC_IF 401, the PC_ID 402, the PC_EX 403, the PC_MA 404 and the PC_WB 405 shown in FIG. 16, all in synchronization with the clock signal.

The instruction fetch module 501 fetches from an instruction memory 506 an instruction stored at the address specified by an iA bus, and shifts it to an instruction decode stage register REG_ID 507.

The instruction decode module 502 has an instruction decoder 508 decode an instruction shifted by the instruction decode stage register REG_ID 507 and output plural control signals for plural instructions to the instruction sequencer 306. (Refer to FIG. 15.) Then, the instruction decode module 502 shifts them from the instruction sequencer 306 to an instruction execute stage register REG_EX 509. The instruction decode module 502 also has the instruction sequencer 306 output a register selection signal to a first register 512, upon using operand data stored in the first register 512. As well, the instruction decode module 502 activates the instruction sequencer 306 when an exception arises, which will be described later.

The instruction execute module 503 shifts the plural control signals for plural instructions shifted in the instruction execute stage register REG_EX 509 to a first memory access stage register REG_MA1 510, and outputs them to an ALU 514 for its operation as necessary. Upon executing a requested operation, the ALU 514 outputs a result to a second internal bus 515. The instruction execute module 503 shifts the result via the second internal bus 515 to a second memory access stage register REG_MA2 516, when the result is used as an address for a memory access.

The memory access module 504 shifts the control signal from the first memory access stage register REG_MA1 510 to a first write back stage register REG_WB1 511 and outputs the control signals to a data access controller 517, when it is necessary to write into or read from a memory 518 operand data. Here, the instruction decoder 508 determines the necessity, upon decoding an instruction, and supplies the control signal via the instruction sequencer 306 and the REG_EX 509 to the ALU 514.

The memory access module 504 has the data access controller 517 generate (from the control signals supplied from the instruction decoder 508 via the instruction sequencer 306, the REG_EX 509 and the REG_MA1 510) and output a memory access control signal for use, together with an address DA from the second memory access stage register REG_MA2 516, in writing into or reading from the memory 518 operand data. Upon reading operand data from the memory 518, the memory access module 504 shifts them to a second write back stage register REG_WB2 519. Upon writing operand data into the memory 518, however, the memory access module 504 does not shift them to the second write back stage register REG_WB2 519, since it is unnecessary to write them in it.

The write back module 505 shifts from the memory 518 via the second write back stage register REG_WB 2 519 into a second register 520 operand data DD, which have been obtained either through a memory access by the data access controller 517 or operand data obtained through an operation by the ALU 514 and supplied via the second internal bus 515.

Figure 18:
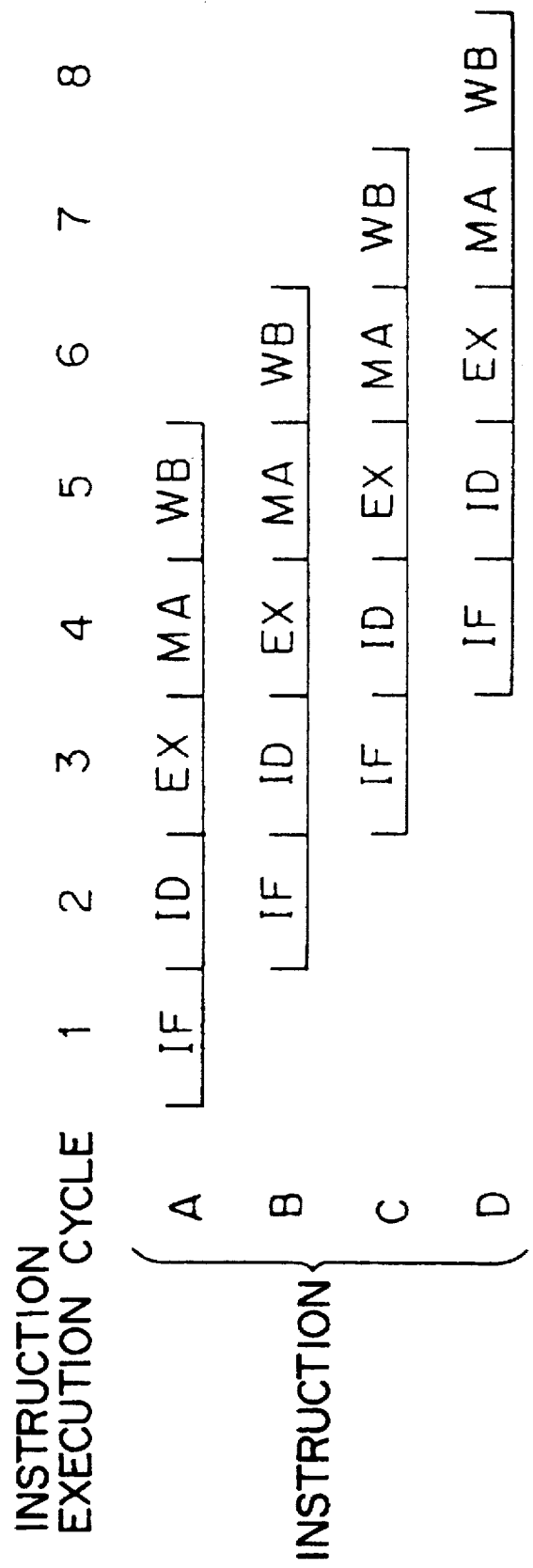
FIG. 18 is an explanatory diagram illustrating basic pipeline processes without a memory wait.

FIG. 18 is an explanatory diagram illustrating basic pipeline processes without a memory wait.

More specifically, FIG. 18 shows how the instruction fetch module 501, the instruction decode module 502, the instruction execute module 503, the memory access module 504 and the write back module 505 (shown in FIG. 17) parallelly execute respective execution stages corresponding to instructions A through D in each of instruction cycles 1 through 8.

In instruction cycle 1, the instruction fetch module 501 executes an instruction fetch stage (hereafter referred to as an IF stage) for instruction A.

In instruction cycle 2, the instruction decode module 502 executes an instruction decode stage (hereafter referred to as an ID stage) for instruction A, and the instruction fetch module 501 executes an IF stage for instruction B succeeding instruction A.

In instruction cycle 3, the instruction execute module 503 executes an instruction execute stage (hereafter referred to as an EX stage) for instruction A, the instruction decode module 502 executes an ID stage for instruction B, and the instruction fetch module 501 executes an IF stage for instruction C succeeding instruction B.

In instruction cycle 4, the memory access module 504 executes a memory access stage (hereafter referred to as an MA stage) for instruction A, the instruction execute module 503 executes an EX stage for instruction B, the instruction decode module 502 executes an ID stage for instruction C, and the instruction fetch module 501 executes an IF stage for instruction D succeeding instruction C.

In instruction cycle 5, the write back module 505 executes a write back stage (hereafter referred to as a WB stage) for instruction A, the memory access module 504 executes an MA stage for instruction B, the instruction execute module 503 executes an EX stage for instruction C, and the instruction decode module 502 executes an ID stage for instruction D. As well, the instruction fetch module 501 becomes free to start executing an IF stage for instruction E (not shown) succeeding instruction D.

In instruction cycle 6, the write back module 505 executes a WB stage for instruction B, the memory access module 504 executes an MA stage for instruction C, and the instruction execute module 503 executes an EX stage for instruction D. As well, the instruction fetch module 501 becomes free to start executing an IF stage for instruction F (not shown) succeeding instruction E.

In instruction cycle 7, the write back module 505 executes a WB stage for instruction C, and the memory access module 504 executes an MA stage for instruction D. As well, the instruction fetch module 501 becomes free to start executing an IF stage for instruction G (not shown) succeeding instruction F.

In instruction cycle 8, the write back module 505 executes a WB stage for instruction D. As well, the instruction fetch module 501 becomes free to start executing an IF stage for instruction H (not shown) succeeding instruction G.

Figure 19:
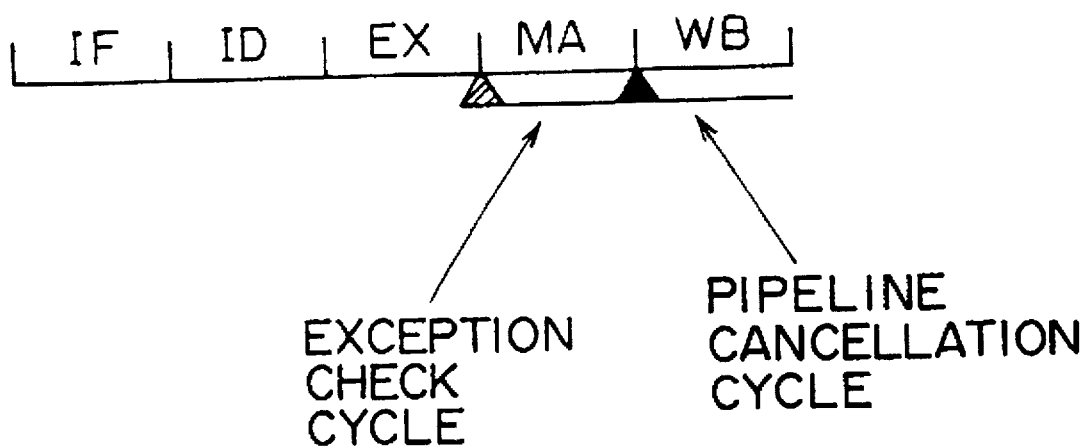
FIG. 19 is an explanatory diagram illustrating a timing for processing an exception event.

FIG. 19 is an explanatory diagram illustrating a timing for processing an exception event.

An exception event in an instruction stream can be detected at a timing in any of an instruction fetch stage, an instruction decode stage and an instruction execute stage.

An exception event detected in an instruction fetch stage includes an instruction break exception, for example. Such an exception event arises, after a user sets in a register (not shown) a desired instruction program counter value, as a break point value, for suspending the execution of a program while debugging a program, when a program counter value stored in the PC_IF 401 (shown in FIG. 16) matches the break point value, while the instruction fetch module 501 executes the instruction fetch stage, during the execution of the program.

An exception event detected in an instruction decode stage includes an ineffective instruction exception, for example. Such an exception event arises, after the instruction decode module 502 decodes an instruction in an instruction decode stage, when the decoded instruction is an ineffective instruction.

An exception event detected in an instruction execute stage includes an operand access exception, for example. Such an exception event arises, after the instruction execute module 503 executes an instruction in an instruction execute stage, when the address or data of the calculated operand matches that or match those of the break point preset by the user.

Upon detecting an instruction break exception when the instruction fetch module 501 executes an instruction fetch stage, the X-ID 307 retains the exception event at the timing of the instruction decode stage corresponding to the instruction in which an exception event is detected. Then, the X-EX 308 retains the exception event at the timing of the instruction execute stage corresponding to the instruction in which an exception event is detected, and the X-MA 309 retains the exception event at the timing of the instruction decode stage corresponding to the instruction in which an exception event is detected. Thus, the exception pipeline tags, i.e. the X-ID 307, the X-EX 308 and the X-MA 309, sequentially shift the exception event to the exception unit 310. In this case, the fact that an instruction break exception arises can be recognized by turning to "1" a predetermined bit in data retained in each of the exception pipeline tags, i.e. the X-ID 307, the X-EX 308 and the X-MA 309.

Upon detecting an ineffective instruction exception when the instruction decode module 502 executes an instruction decode stage, the X-EX 308 retains the exception event, together with data supplied from the X-ID 307, at the timing of the instruction execute stage corresponding to the instruction in which an exception event is detected. Then, the X-MA 309 retains the exception event at the timing of the memory access stage corresponding to the instruction in which an exception event is detected. Thus, the X-EX 308 and the X-MA 309 sequentially shift the exception event to the exception unit 310. In this case, the fact that an ineffective instruction exception arises can be recognized by turning to "1" a predetermined bit in data retained in each of the exception pipeline tags, i.e. the X-ID 307, the X-EX 308 and the X-MA 309.

Upon detecting an operand access exception when the instruction execute module 503 executes an instruction execute stage, the X-MA 309 retains the exception event, together with data supplied from the X-EX 308, at the timing of the memory access stage corresponding to the instruction in which an exception event is detected. Then, the X-MA 309 retains the exception event at the timing of the memory access stage corresponding to the instruction in which an exception event is detected. Thus, the X-MA 309 shifts the exception event to the exception unit 310. In this case, the fact that an operand access exception arises can be recognized by turning to "1" a predetermined bit in data retained in the X-MA 309.

In this way, the exception unit 310 reads out from the X-MA 309 an exception event eventually retained in the X-MA 309 at the timing of the memory access stage corresponding to the instruction in which an exception event is detected. A timing of the memory access stage is called an exception check cycle. The exception unit 310 checks whether or not an exception event has arisen in an exception check cycle, and prioritizes plural exceptions, as applicable, for determining the sequence of exception processes to be executed.

Then, the exception unit 310 cancels instructions retained in the instruction pipeline tags, i.e. the PIPE-IF 301, the PIPE-ID 302, the PIPE-EX 303, the PIPE-MA 304 and the PIPE-WB 305, at the timing of the write back stage corresponding to the instruction in which an exception event is detected. A timing of the write back stage is called a pipeline cancellation cycle.

Figure 20:
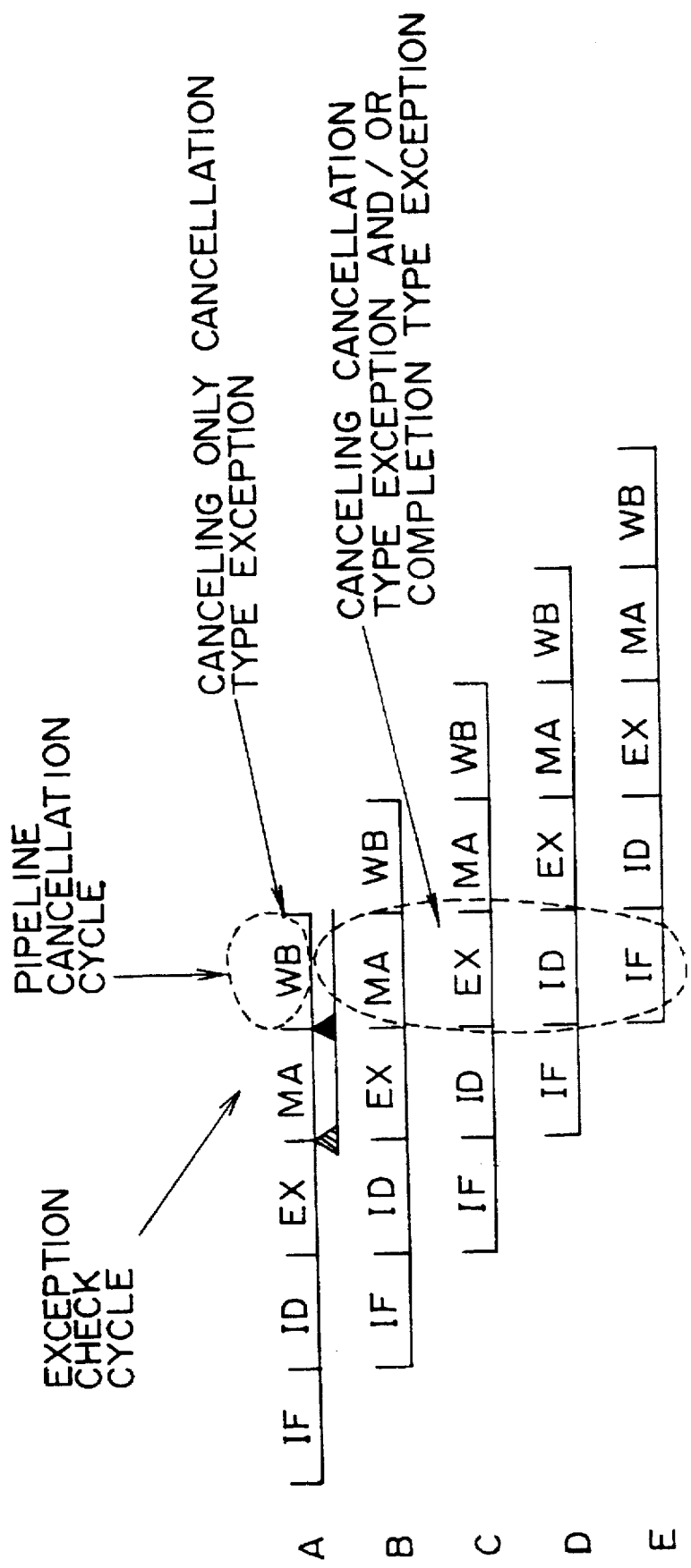
FIG. 20 is an explanatory diagram illustrating a pipeline cancellation when an exception event arises.

FIG. 20 is an explanatory diagram illustrating a pipeline cancellation when an exception event arises.

When an cancellation type exception is detected in instruction A, because the execution of instruction A needs to be canceled, upon detecting in an exception check cycle a cancellation type exception in the memory access stage corresponding to instruction A, the exception unit 310 cancels in a pipeline cancellation cycle instruction data in the PIPE-WB 305 for use in the write back stage corresponding to instruction A. Concurrently, the exception unit 310 cancels instruction data in the PIPE-MA 304 for use in the memory access stage corresponding to instruction B, instruction data in the PIPE-EX 303 for use in the instruction execute stage corresponding to instruction C, instruction data in the PIPE-ID 302 for use in the instruction decode stage corresponding to instruction D and instruction data in the PIPE-IF 301 for use in the instruction fetch stage corresponding to instruction E.

On the other hand, when a completion type exception is detected in instruction A, because the execution of instruction A need not be canceled, upon detecting in an exception check cycle a cancellation type exception in the memory access stage corresponding to instruction A, the exception unit 310 does not cancel in a pipeline cancellation cycle instruction data in the PIPE-WB 305 for use in the write back stage corresponding to instruction A. Concurrently, the exception unit 310 cancels instruction data in the PIPE-MA 304 for use in the memory access stage corresponding to instruction B, instruction data in the PIPE-EX 303 for use in the instruction execute stage corresponding to instruction C, instruction data in the PIPE-ID 302 for use in the instruction decode stage corresponding to instruction D and instruction data in the PIPE-IF 301 for use in the instruction fetch stage corresponding to instruction E.

As described earlier, a prior art has a problem in executing an exception process handler, e.g. in case of a single delay slot instruction, either when a completion type exception is detected during the execution of a delayed branch instruction or when a cancellation type exception is detected during the execution of a delay slot instruction.

Figure 21:
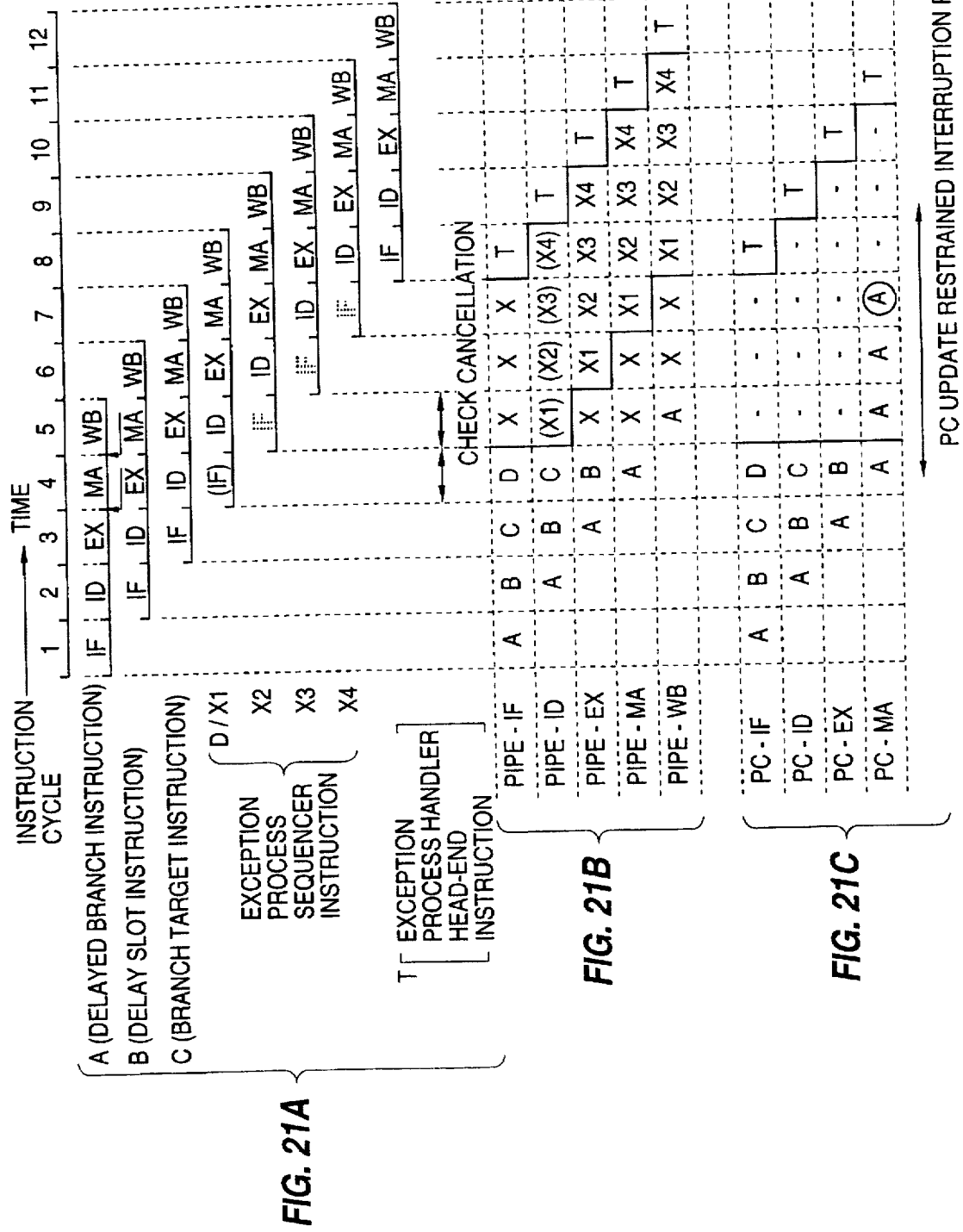
FIGS. 21A, 21B and 21C are explanatory diagrams illustrating pipeline processes when a completion type exception arises in a delayed branch instruction.

FIGS. 21A, 21B and 21C are explanatory diagrams illustrating pipeline processes when a completion type exception arises in a delayed branch instruction.

As shown in FIG. 21A, when a completion type exception arises while executing any of the instruction fetch stage (instruction cycle 1), the instruction decode stage (instruction cycle 2) and the instruction execute stage (instruction cycle 3) corresponding to delayed branch instruction A, the exception unit 310 (shown in FIG. 15) recognizes whether or not an exception event has arisen by executing an exception check cycle in a memory access stage (instruction cycle 4) corresponding to delayed branch instruction A.

As a result, by executing a pipeline cancellation cycle in the write back stage (instruction cycle 5) corresponding to delayed branch instruction A, the exception unit 310 cancels data on delay slot instruction B in the PIPE-MA 304, data on branch target instruction C in the PIPE-EX 303, data on instruction D succeeding branch target instruction C in the PIPE-ID 302 and data on instruction succeeding instruction D in the PIPE-IF 301, which are marked "x" in FIG. 21B. As described earlier, upon detecting a completion type exception, the exception unit 310 need not cancel data on delayed branch instruction A in the PIPE-WB 305 in which an exception event is detected.

At the same time, while executing the pipeline cancellation cycle (instruction cycle 5) corresponding to delayed branch instruction A, the exception unit 310 instructs the instruction sequencer 306 to invoke an exception process. The instruction sequencer 306 sequentially supplies to the PIPE-EX 303 exception process sequencer instructions X1 through X4 shown in FIGS. 21A and 21B in an instruction decode stage (instruction cycles 5 through 8).

As shown in FIG. 21B, the PIPE-EX 303, the PIPE-MA 304 and the PIPE-WB 305 sequentially retain the exception process sequencer instructions X1 through X4 respectively in the instruction execute stage, the memory access stage and the write back stage, and the instruction execute module 503, the memory access module 504 and the write back module 505 execute processes corresponding to respective instructions. These processes are control processes for activating an exception process handler.

As well, the exception unit 310 has a control circuit (not shown) prohibit the PC_MA 404 (shown in FIG. 16) from updating its content in instruction cycles 5, 6 and 7.

Further, as shown in FIG. 21A, because the PIPE-IF 301 fetches instruction D succeeding branch target instruction C in instruction cycle 4 and the PIPE-ID 302 decodes the same in instruction cycle 5, the exception unit 310 shifts data on instruction D through the PIPE-IF 301 and the PIPE-ID 302. However, because the exception unit 310 inputs to the PIPE-EX 303 an output from the instruction sequencer 306 instead of an output from the PIPE-ID 302, instruction D is not executed anyway.

Also, as shown in FIG. 21B, the reason why the contents (X1) through (X4) of the PIPE-ID 302 are in parentheses is because the exception process sequencer instructions X1 through X4 from the instruction sequencer 306 to the PIPE-EX 303, at the timing in the instruction decode stage in which instruction data are outputted from the PIPE-ID 302, are not actually supplied from the PIPE-ID 302.

The operations of the above described exception process sequencer instructions X1 through X4 are explained below in detail.

As shown in FIGS. 21A and 21B, in instruction cycle 5, the instruction decode module 502 outputs control signals for exception process sequencer instruction X1 and generates an internal vector for calculating the address of an exception process handler by executing the instruction decode stage corresponding to the data on exception process sequencer instruction X1 outputted from the instruction sequencer 306.

As well, as shown in FIGS. 21A and 21B, in instruction cycle 6, the instruction decode module 502 outputs control signals for instruction X2 and reads from the first register 512 the values of a processor status flag and a stack pointer by executing the instruction decode stage corresponding to the data on exception process sequencer instruction X2 outputted from the instruction sequencer 306.

Contemporaneously, as shown in FIGS. 21A and 21B, the instruction execute module 503 executes the instruction execute stage corresponding to the data on exception process sequencer instruction X1 retained in the PIPE-EX 303 and calculates address on a memory at which address data of the head end instruction of an exception process handler are stored by using the internal vector.

As shown in FIGS. 21A and 21B, in instruction cycle 7, the instruction decode module 502 executes the instruction decode stage corresponding to the data on exception process sequencer instruction X3 outputted from the instruction sequencer 306, outputs the control signals for instruction X3, and reads a stack pointer value from the first register 512.

Further, as shown in FIG. 21C, the instruction decode module 502 reads from the PC_MA 404 (shown in FIG. 16) the program counter value of delayed branch instruction A. Simultaneously, the instruction execute module 503 executes the instruction execute stage corresponding to the data on exception process sequencer instruction X2 retained in the PIPE-EX 303, and calculates a stack pointer value for pushing on a stack the processor status flag read from the first register 512 in instruction cycle 6, as shown in FIGS. 21A and 21B.

At the same time, the memory access module 504 executes the memory access stage corresponding to the data on exception process sequencer instruction X1 retained in the PIPE-MA 304, accesses the memory at the address calculated in instruction cycle 6, and loads the address data on the head end instruction of the exception process handler, as shown in FIGS. 21A and 21B.

In instruction cycle 8, the instruction execute module 503 executes the instruction execute stage corresponding to the data on exception process sequencer instruction X3 retained in the PIPE-EX 303, and calculates a stack pointer value for pushing on a stack the processor status flag read from the PC_MA 404 in instruction cycle 7, as shown in FIGS. 21A and 21B.

At the same time, the memory access module 504 executes the memory access stage corresponding to the data on exception process sequencer instruction X2 retained in the PIPE-MA 304, and pushes the processor status flag read from the first register 512 in instruction cycle 6 on the stack in the memory address area corresponding to the stack pointer value calculated in instruction cycle 7, as shown in FIGS. 21A and 21B.

Also, at the same time, the write back module 505 executes the write back stage corresponding to the data on exception process sequencer instruction X1 retained in the PIPE-WB 305, and writes into the PC_IF 401 (shown in FIG. 16) the address data of the head end instruction of the exception process handler loaded from the memory in instruction cycle 7, as shown in FIGS. 21A and 21B.

In instruction cycle 9, the memory access module 504 executes the memory access stage corresponding to the data on exception process sequencer instruction X3 retained in the PIPE-MA 304, and pushes the program counter value of delayed branch instruction A read from the PC_MA 404 in instruction cycle 7 on the stack in the memory address area corresponding to the stack pointer value calculated in instruction cycle 8, as shown in FIGS. 21A and 21B.

At the same time, the write back module 505 executes the write back stage corresponding to the data on exception process sequencer instruction X2 retained in the PIPE-WB 305 and writes into the stack pointer the stack pointer value calculated in instruction cycle 7.

In instruction cycle 10, the write back module 505 executes the write back stage corresponding to the data on exception process sequencer instruction X3 retained in the PIPE-WB 305, and writes into the stack pointer the stack pointer value calculated in instruction cycle 8, as shown in FIGS. 21A and 21B.

The exception unit 310 has a control circuit (not shown) lift the ban on updating the PC_MA 404 (shown in FIG. 16) on and after instruction cycle 8. Since exception process sequencer instruction X4 is an NOP operation, it causes nothing in respective stages.

As described above, in instruction cycle 8, data on the exception process handler are supplied sequentially to the instruction pipeline tags, i.e. the PIPE-IF 301, the PIPE-ID 302, the PIPE-EX 303, the PIPE-MA 304 and the PIPE-WB 305 (shown in FIG. 15) and the PC pipeline, i.e. the PC_IF 401, the PC_ID 402, the PC_EX 403, the PC_MA 404 and the PC_WB 405 (shown in FIG. 16), thereby executing the exception process.

The above described process requires a smaller capacity of a stack and a less delay in shifting from an original program to an exception process than that of a prior art, because the program counter value of delayed branch instruction A need only be saved in a stack instead of the program counter values of both a delay slot instruction and a branch target instruction. Although the above description does not specifically mention a case in which a memory wait arises while accessing the stack formed on a main storage memory, the delay difference between the prior art and this embodiment is generally greater.

Figure 22:
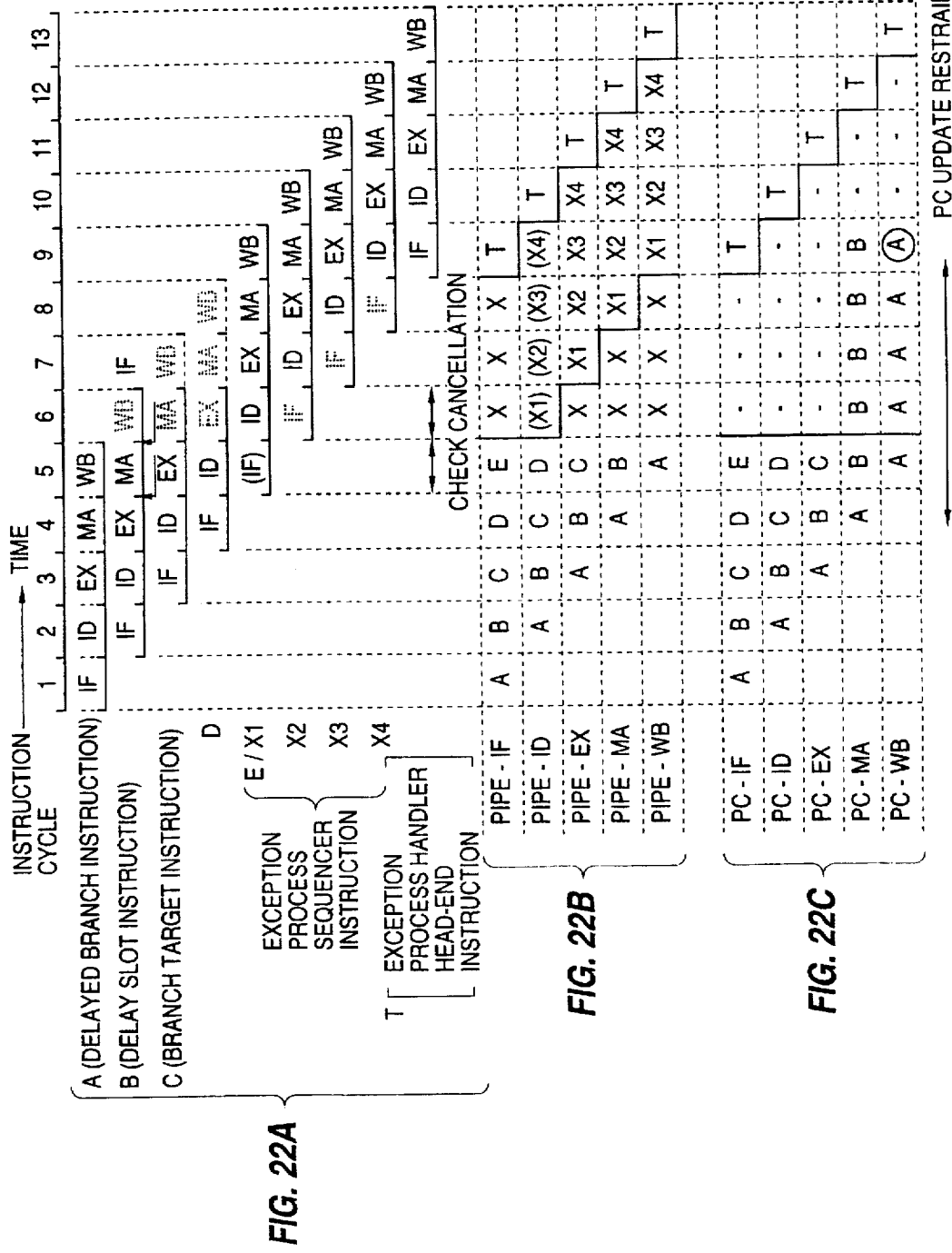
FIGS. 22A, 22B and 22C are explanatory diagrams illustrating pipeline processes when a cancellation type exception arises in a delay slot instruction.

FIG. 22 is an explanatory diagram illustrating pipeline processes when a cancellation type exception arises in a delay slot instruction.

More specifically, FIG. 22 shows a concrete example of operations of an exception process, after executing a delayed branch instruction generating a branch, when a cancellation type exception is detected while executing a delay slot instruction.

As shown in FIG. 21A, when a cancellation type exception arises while executing any of the instruction fetch stage (instruction cycle 2), the instruction decode stage (instruction cycle 3) and the instruction execute stage (instruction cycle 4) corresponding to delay slot instruction B, the exception unit 310 (shown in FIG. 15) recognizes whether or not an exception event has arisen by executing an exception check cycle in a memory access stage (instruction cycle 5) corresponding to delay slot instruction B.

As a result, by executing a pipeline cancellation cycle in the write back stage (instruction cycle 6) corresponding to delay slot instruction B, the exception unit 310 cancels data on delay slot instruction B in the PIPE-WB 305, data on branch target instruction C in the PIPE-MA 304, data on instruction D succeeding branch target instruction C in the PIPE-EX 303, data on instruction succeeding instruction D in the PIPE-ID 302 and data on instruction E succeeding instruction D in the PIPE-IF 301 which are marked "x" in FIG. 22B. Hence, upon detecting a cancellation type exception, the exception unit 310 cancels data on delay slot instruction B in the PIPE-WB 305 in which an exception event is detected.

At the same time, while executing the pipeline cancellation cycle (instruction cycle 6) corresponding to delay slot instruction B, the exception unit 310 instructs the instruction sequencer 306 to invoke an exception process. The instruction sequencer 306 sequentially supplies to the PIPE-EX 303 the exception process sequence instructions X1 through X4 shown in FIG. 22A or FIG. 22B in an instruction decode stage (instruction cycles 6 through 9).

As shown in FIG. 22B, the PIPE-EX 303, the PIPE-MA 304 and the PIPE-WB 305 sequentially retain the exception process sequencer instructions X1 through X4 respectively in the instruction execute stage, the memory access stage and the write back stage, and the instruction execute module 503, the memory access module 504 and the write back module 505 execute processes corresponding to respective instructions. These processes are control processes for activating an exception process handler.

As well, the exception unit 310 has a control circuit (not shown) prohibit the PC_MA 404 (shown in FIG. 16) from updating its content in instruction cycles 6 through 9.

Thereafter, the control process for activating the exception process handler executed by the exception process sequencer instructions X1 through X4 in instruction cycles 6 through 11 are exactly the same as that executed by the exception process sequencer instructions X1 through X4 in instruction cycles 5 through 10 in FIG. 21A, 21B and 21C. And the exception process by the instructions of the exception process handler begins sequentially from instruction cycle 9.

Figure 23:
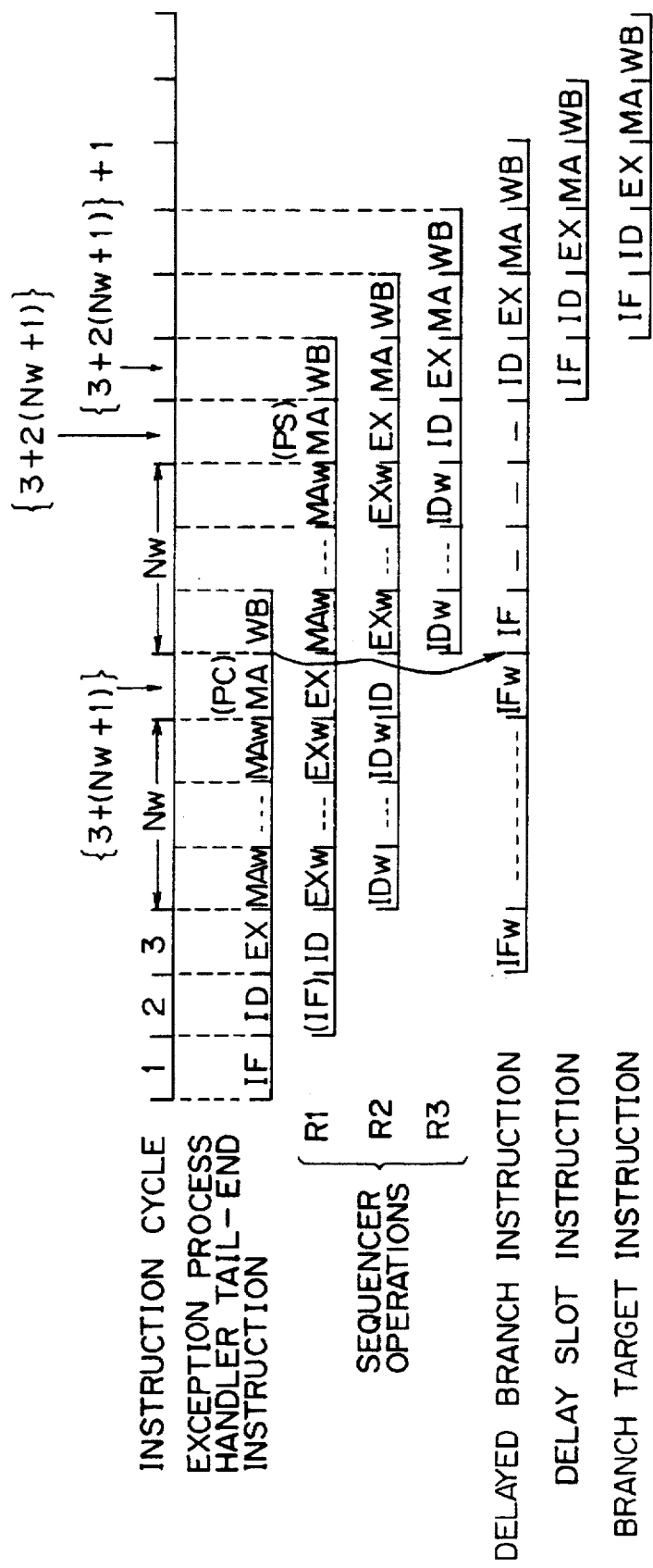
FIG. 23 is an explanatory diagram illustrating pipeline processes when a processor operation returns from the exception process handler to the original program, upon completing an exception process, pursuant to the first embodiment.

FIG. 23 is an explanatory diagram illustrating pipeline processes when a processor operation returns from the exception process handler to the original program, upon completing an exception process, pursuant to the first embodiment.

Figure 24:
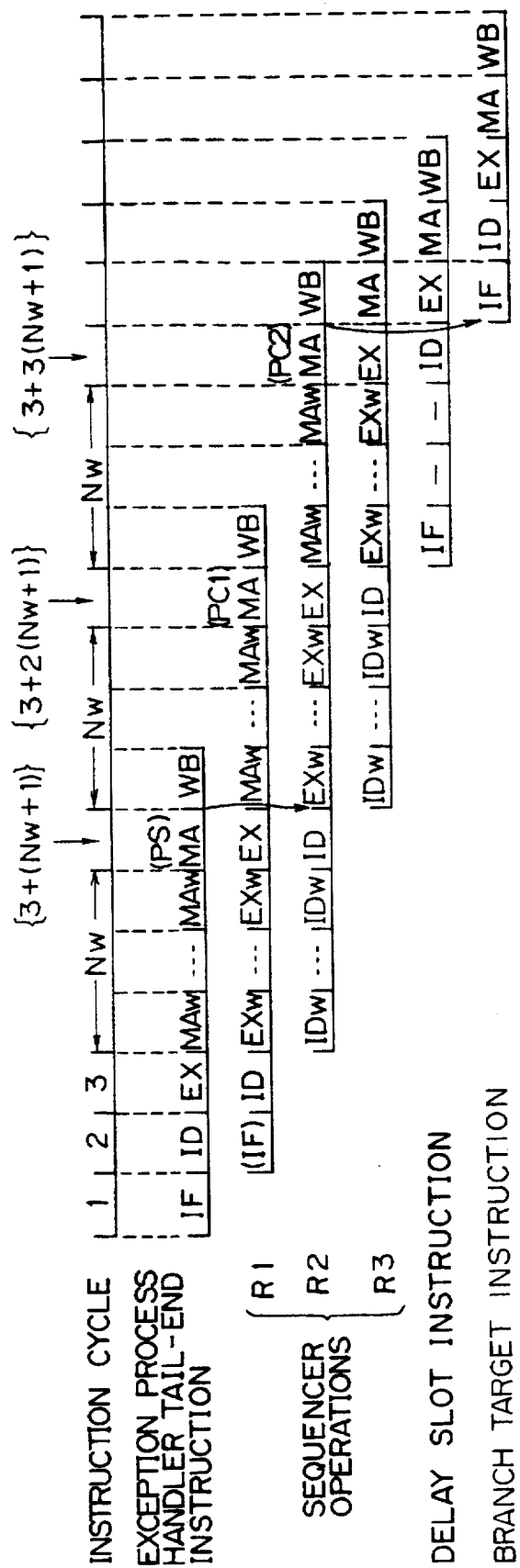
FIG. 24 is an explanatory diagram illustrating pipeline processes when a processor operation returns from the exception process handler to the original program, upon completing an exception process, pursuant to a prior art as compared with the first embodiment.

The description of FIG. 23, as with that of FIG. 24, assumes a case in which the execution, as a multi-cycle instruction, of the last instruction of the exception process handler activates the instruction sequencer 306, thereby enabling the retrieval the program counter value of the original program from the stack, the setting of it in the PC pipeline, and the retrieval of the program status flag. Also, they both assume that a memory wait of Nw cycles arises when a memory access is performed on a stack.

The number of instruction cycles from the start of executing the last instruction of the exception process handler to the end of the exception process through the execution of a delayed branch instruction and a delay slot instruction until the start of fetching the branch target instruction is {3+2(Nw+1)}+1.

FIG. 24 is an explanatory diagram illustrating pipeline processes when a processor operation returns from the exception process handler to the original program, upon completing an exception process, pursuant to a prior art as compared with the first embodiment.

On the other hand, because the prior art has one [1] more program counter value retrieved from the stack and branch target instruction cannot be fetched until after the second program counter value is read out, the number of instruction cycles from the beginning of the execution of the last instruction of the exception process handler through the execution of a delay slot instruction after the end of the exception process until the beginning of the instruction fetch of the post branch instruction is {3+3(Nw+1)}. However, because the prior art shows a case in which the program status flags (PS) store the information on the number of necessary program counter values to be read out, the prior art causes the program status flag to be read out before reading the program counter value.

Accordingly, the result obtained by subtracting the number of instruction cycles in the first embodiment from the number of the instruction cycles pursuant to the prior art is {3+2(Nw+1)}+1−{3+3(Nw+1)}=Nw. As a result, when a memory access has a wait, the first embodiment requires a duration for completing an exception process shorter than that of the prior art.

Although the above explanation pertains to a case of a single delay slot, even in the case of plural delay slots, the first embodiment requires one [1] program counter value for a delayed branch instruction to be saved in the stack. On the other hand, the prior art requires that the program counter value of the delay slot instructions on or after the instruction in which an exception event is detected and the program counter value of the branch target instruction need to be saved in the stack. Accordingly, the case of plural delay slots more clearly shows a distinct advantage of the first embodiment.

Although the description of the first embodiment does not explain a case in which the execution of an exception process causes a change on whether or not a delayed branch instruction generates a branch, this case can be generally coped with by saving in a stack information indicating the presence or absence of a branch generation as one [1] of the processor status flags (PS) saved in the stack, upon detecting an exception process, and by retrieving the information after completing the exception process. In this case, because the processor status flags (PS) are generally saved in a stack upon detecting an exception process, the first embodiment does not have a difference from the prior art in the processing load regarding the saving and retrieval of the processor status flags (PS) to and from the stack. Hence, as a net result, the first embodiment is advantageous over the prior art, because it requires a less number of program counter values necessary to be saved in a stack.

Figure 25:
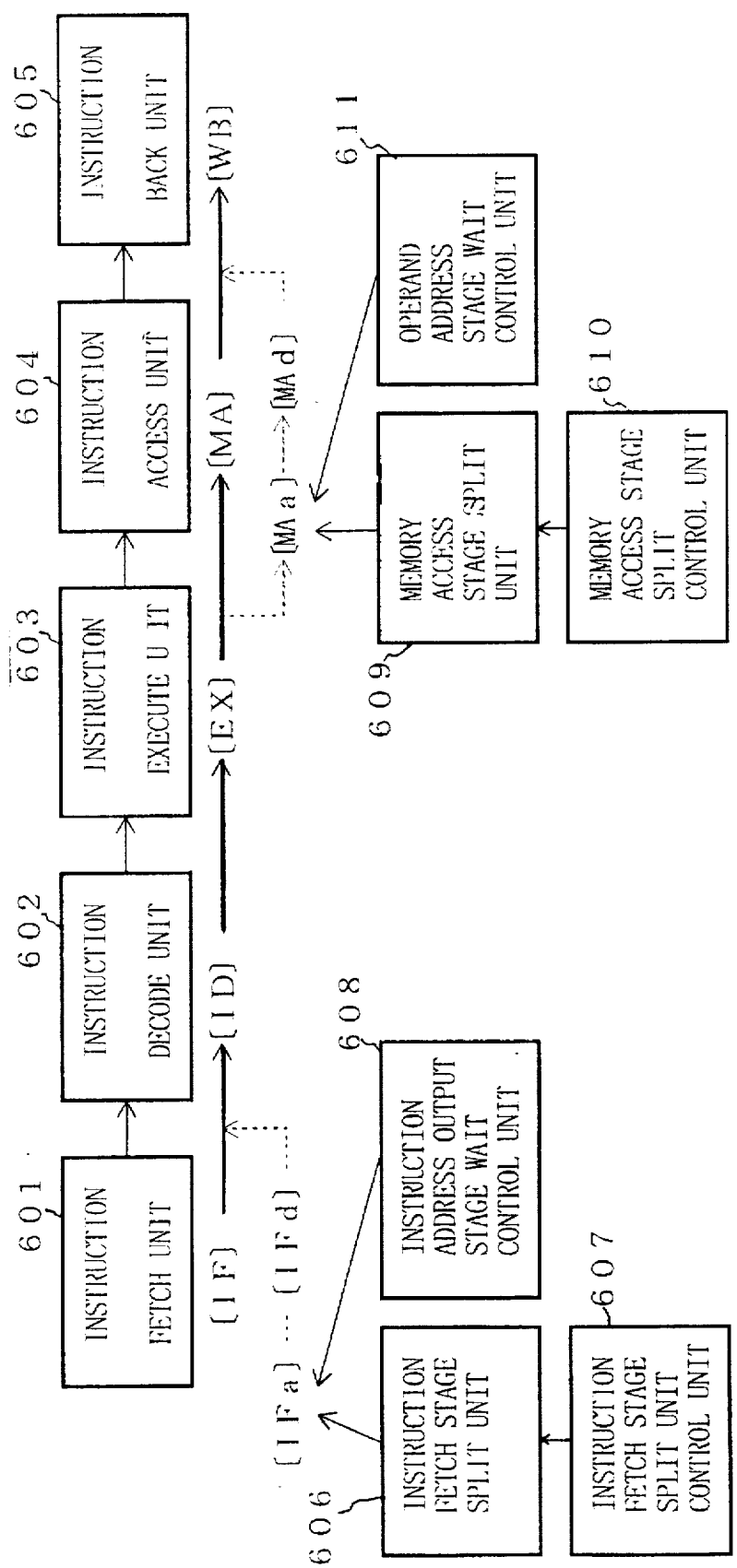
FIG. 25 is a block diagram illustrating the basic configuration of a second embodiment.

FIG. 25 is a block diagram illustrating the basic configuration of a second embodiment.

The second embodiment features an instruction fetch unit 601, an instruction decode unit 602, an instruction execute unit 603, a memory access unit 604 and a write back unit 605 as main pipeline components.

The instruction fetch unit 601 fetches an instruction from a memory unit, in an instruction fetch stage IF executable in parallel with another stage.

The instruction decode unit 602 decodes a fetched instruction, in an instruction decode stage ID executable in parallel with another stage.

The instruction execute unit 603 executes a decoded instruction, in an instruction execute stage EX executable in parallel with another stage.

The memory access unit 604 performs a read/write operation for a memory unit at an address calculated in the instruction execute stage EX, in a memory access stage MA executable in parallel with another stage.

The write back unit 605 writes into a register operand data obtained from the memory unit in the memory access stage MA or operand data processed in the instruction execute stage EX, in a write back stage WB executable in parallel with another stage.

An instruction fetch stage split unit 606 splits an instruction fetch stage IF into an instruction address output stage IFa for outputting to a memory unit an instruction address and an instruction data input stage IFd for inputting from the memory unit instruction data corresponding to the instruction address.

A case is assumed here in which a pipeline comprises an instruction fetch stage program counter value retaining unit 701 (hereafter referred to as a PC_IF 701), an instruction decode stage program counter value retaining unit 702 (hereafter referred to as a PC_ID 702), an instruction execute stage program counter value retaining unit 703 (hereafter referred to as a PC_EX 703), a memory access stage program counter value retaining unit 704 (hereafter referred to as a PC_MA 704) and a write back stage program counter value retaining unit 705 (hereafter referred to as a PC_WB 705) respectively for retaining data (e.g. on a program counter value) for use in the instruction fetch unit 601, the instruction decode unit 602, the instruction execute unit 603, the memory access unit 604 and the write back unit 605. In this case, the instruction fetch stage split unit 606 splits the PC_IF 701 into an instruction address output stage program counter value retaining unit 701a (hereafter referred to as a PC_IFa 701a) for outputting an instruction address to the memory unit and an instruction data input stage program counter value retaining unit 701d (hereafter referred to as a PC_IFd 701d) for inputting instruction data corresponding to an instruction address from the memory unit. (Refer to FIG. 26.)

A memory access stage split unit 609 splits a memory access stage MA into an operand address output stage MAa for outputting to the memory unit an operand address and an operand data read/write stage MAd for reading from or writing into the memory unit operand data corresponding to the operand address.

The same case as above for the instruction fetch stage split unit instruction fetch stage split unit 606 is also assumed here for the memory access stage split unit 609. In this case, the memory access stage split unit 609 splits the PC_MA 704 into: an operand address output stage program counter value retaining unit 704a (hereafter referred to as a PC_MAa 704a) for retaining an instruction address for use in the operand address output stage MAa, which is a stage for outputting an operand address to the memory unit; and an operand data read/write stage program counter value retaining unit 704d (hereafter referred to as a PC_MAd 704d) for retaining a program counter value for use in the operand data read/write stage MAd, which is a stage for reading from or writing into the memory unit operand data corresponding to the operand address. (Refer to FIG. 26.)

The second embodiment may be structured to further include an instruction fetch stage split control unit 607 and a memory access stage split control unit 610, (both corresponding to a pipeline wait/stage number controller 1001,) in addition to the above configuration. (Refer to FIG. 34.)

The instruction fetch stage split control unit 607 causes the instruction fetch stage split unit 606 to split an instruction fetch stage IF, if the instruction fetch stage split unit 606 has not split the instruction fetch stage IF, when an instruction fetch arises for an external memory connected to the outside of the processor chip.

The instruction fetch stage split control unit 607 also causes the instruction fetch stage split unit 606 to unsplit an instruction fetch stage IF, if the instruction fetch stage split unit 606 has split the instruction fetch stage IF, when the execution of a branch instruction generates a branch and a fetch of the branch target instruction corresponding to the branch arises for an internal memory contained in the inside of the processor chip.

The memory access stage split control unit 610 causes the memory access stage split unit 609 to split a memory access stage MAr if the memory access stage split unit 609 has not split the memory access stage MA, when an operand data access arises for an external memory connected to the outside of the processor chip.

The memory access stage split control unit 610 also causes the instruction fetch stage split unit 606 to unsplit a memory access stage MA, if the memory access stage split unit 609 has split the memory access stage MA, when an instruction not accompanying a memory access is executed and an instruction succeeding the instruction has arisen for an internal memory contained in the inside of the processor chip.

The second embodiment may be structured to further include an instruction address output stage wait control unit 608 and an operand address output stage wait control unit 611, (both corresponding to the pipeline wait/stage number controller 1001,) in addition to the above configuration. (Refer to FIG. 34.)

The instruction address output stage wait control unit 608 puts the instruction address output stage IFa in a wait status for a desired number of instruction cycles.

The operand address output stage wait control unit 611 puts the operand address output stage MAa in a wait status for a desired number of instruction cycles.

The second embodiment as described above may be configured to enable the instruction fetch unit 601 to execute the operation of outputting an instruction address in the instruction address output stage IFa in parallel with the operation of inputting instruction data in the instruction data input stage IFd, and the memory access unit 604 to execute the operation of outputting an operand address in the operand address output stage MAa in parallel with the operation of reading or writing operand data in the operand data read/write stage MAd.

The instruction fetch stage split control unit 607 does not have the instruction fetch stage split unit 606 split the instruction fetch stage IF, if an instruction stored in an internal memory contained in the inside of the processor chip is fetched. As a result, the penalty due to a cancellation of a pipeline process when a branch arises may be reduced.

The instruction fetch stage split control unit 607 has the instruction fetch stage split unit 606 split the instruction fetch stage IF, if the instruction fetch stage split unit 606 has not split the instruction fetch stage IF, when an instruction fetch arises for an external memory connected to the outside of the processor chip. This enables the duration of processes in other stages put in a wait status to be shortened in an instruction cycle in which the split instruction fetch stages IFa and IFd are executed, thereby improving the performance of pipeline processes at a timing other than when a branch arises. In this case, the instruction address output stage wait control unit 608 appropriately controls the wait status of the instruction address output stage IFa generated by splitting the instruction fetch stage IF.

The instruction fetch stage split control unit 607 has the instruction fetch stage split unit 606 unsplit the split instruction fetch stages IFa and IFd when the execution of a branch instruction generates a branch and the instruction fetch unit 601 fetches the branch target instruction corresponding to the branch. At this time, the instruction address output stage wait control unit 608 optimizes the pipeline status without corrupting effective data during a pipeline process.

The memory access stage split control unit 610 has the memory access stage split unit 609 split the memory access stage MA, if the memory access stage split-unit 609 has not split the memory access stage MA, when a memory access arises for an external memory connected to the outside of the processor chip. This enables the duration of processes in other stages put in a wait status to be shortened in an instruction cycle in which the split memory access stages MAa and MAd are executed, thereby improving the performance of pipeline processes at a timing other than when a branch arises. In this case, the operand address output stage wait control unit 611 appropriately controls the wait status of the operand address output stage MAa generated by splitting the memory access stage MA.

The memory access stage split control unit 610 has the memory access stage split unit 609 unsplit the memory access stages MAa and MAd when the execution of a branch instruction generates a branch and the instruction fetch unit 601 fetches the branch target instruction corresponding to the branch. In this case, the operand address output stage wait control unit 611 optimizes the wait status of the operand address output stage MAa generated by splitting the memory access stage MA.

When the instruction execute unit 603 executes an instruction not accompanying a memory access and the memory access of an instruction succeeding the instruction is one for the internal memory contained in the inside of the processor chip, by unsplitting the split memory access stages MAa and MAd, the operand address output stage wait control unit 611 optimizes the pipeline status without corrupting effective data during a pipeline process.

The second embodiment will be described below in further detail with reference to FIGS. 26, 27 and 28.

Figure 26:
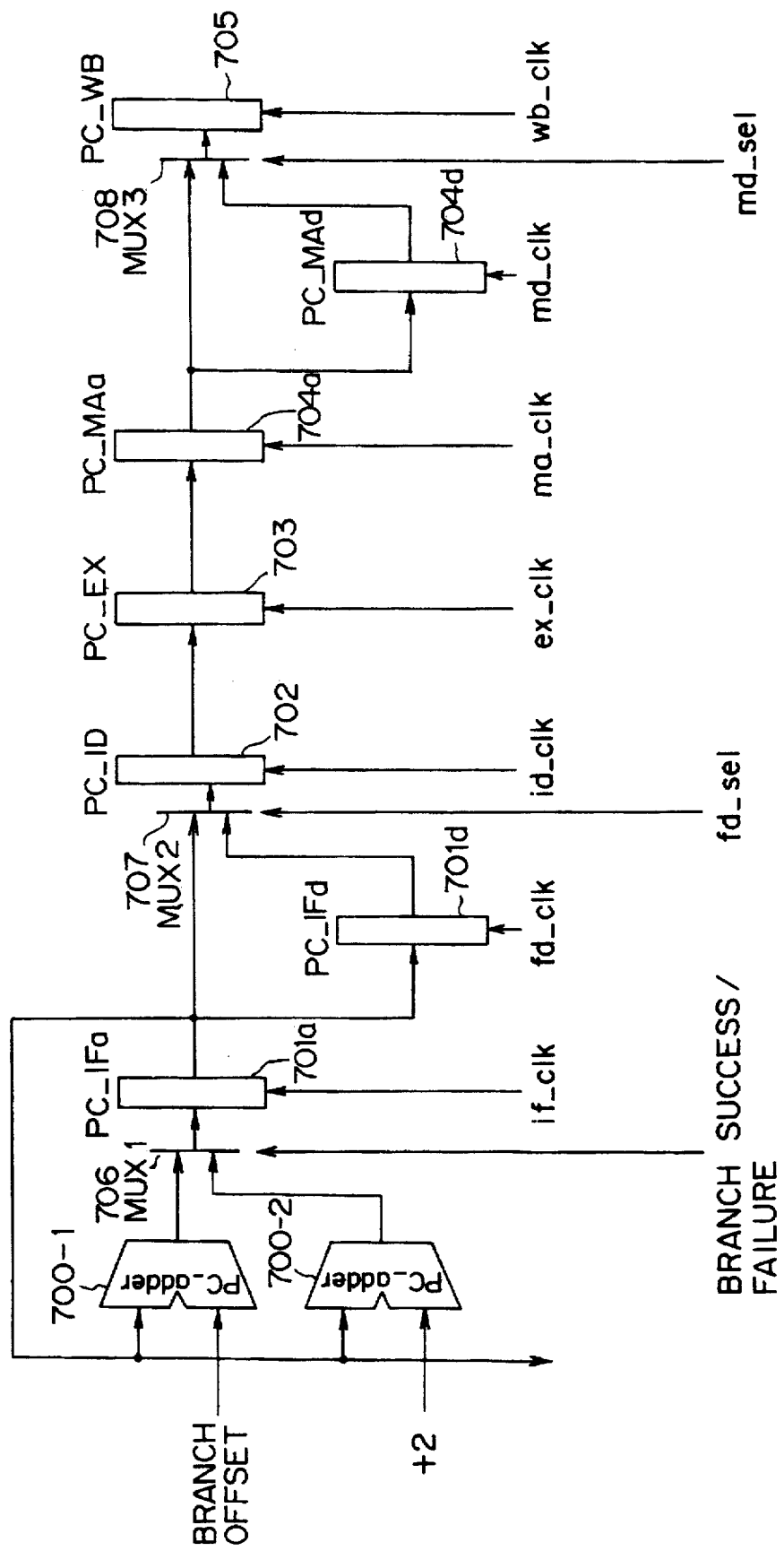
FIG. 26 is a first one of circuit diagrams illustrating in a two [2] part series the partial configuration of a program counter pipeline (a PC pipeline) for use in a pipeline controller pursuant to the second embodiment.

FIG. 26 is a first one of circuit diagrams illustrating in a two [2] part series the partial configuration of a program counter pipeline (a PC pipeline) for use in a pipeline controller pursuant to the second embodiment.

A first adder 700-1 (hereafter referred to as a first PC_adder 700-1) generates an address for use in a case with a branch during the execution of a program. A branch offset indicates an offset value from the address at which an instruction immediately before is fetched to the address at which a branch target instruction is stored. The first PC_adder 700-1 generates the program counter value of a branch target instruction by adding the branch offset to the program counter value of an instruction fetched immediately before.

A second adder 700-2 (hereafter referred to as a second PC_adder 700-2) generates an address for use in a case without a branch during the execution of a program. The second PC_adder 700-2 generates the program counter value of a next instruction to be fetched by incrementing by two [2] the program counter value of an instruction fetched immediately before.

A first multiplexer MUX1 70b selects for an output a program counter value from the first PC_adder 700-1 in case of a branch success or a program counter value from the second PC_adder 700-2 in case of a branch failure.

As discussed earlier in the description of FIG. 25, the instruction fetch stage split unit 606 may split an instruction fetch stage IF into an instruction address output stage IFa and an instruction data input stage IFd, as necessary. When the instruction fetch stage split unit 606 does not split an instruction fetch stage IF, a second multiplexer MUX2 supplies an output from the PC_IFa 701a directly to the PC_ID 702. If the instruction fetch stage split unit 606 has split an instruction fetch stage IF, the second multiplexer MUX2 707 supplies an output from the PC_IFa 701a via the PC_IFd 701d to the PC_ID 702.

The PC_ID 702 supplies its output to the PC_EX 703.

As discussed earlier in the description of FIG. 25, the memory access stage split unit 609 may split a memory access stage MA into an operand address output stage MAa and an operand data read/write stage MAd, as necessary. When the memory access stage split unit 609 does not split a memory access stage MA, a third multiplexer MUX3 708 supplies an output from the PC_MAa 704a directly to the PC_WB 705. If the memory access stage split unit 609 has split an instruction fetch stage IF, the third multiplexer MUX3 708 supplies an output from the PC_MAa 704a via the PC_MAd 704d to the PC_WB 705.

Figure 27:
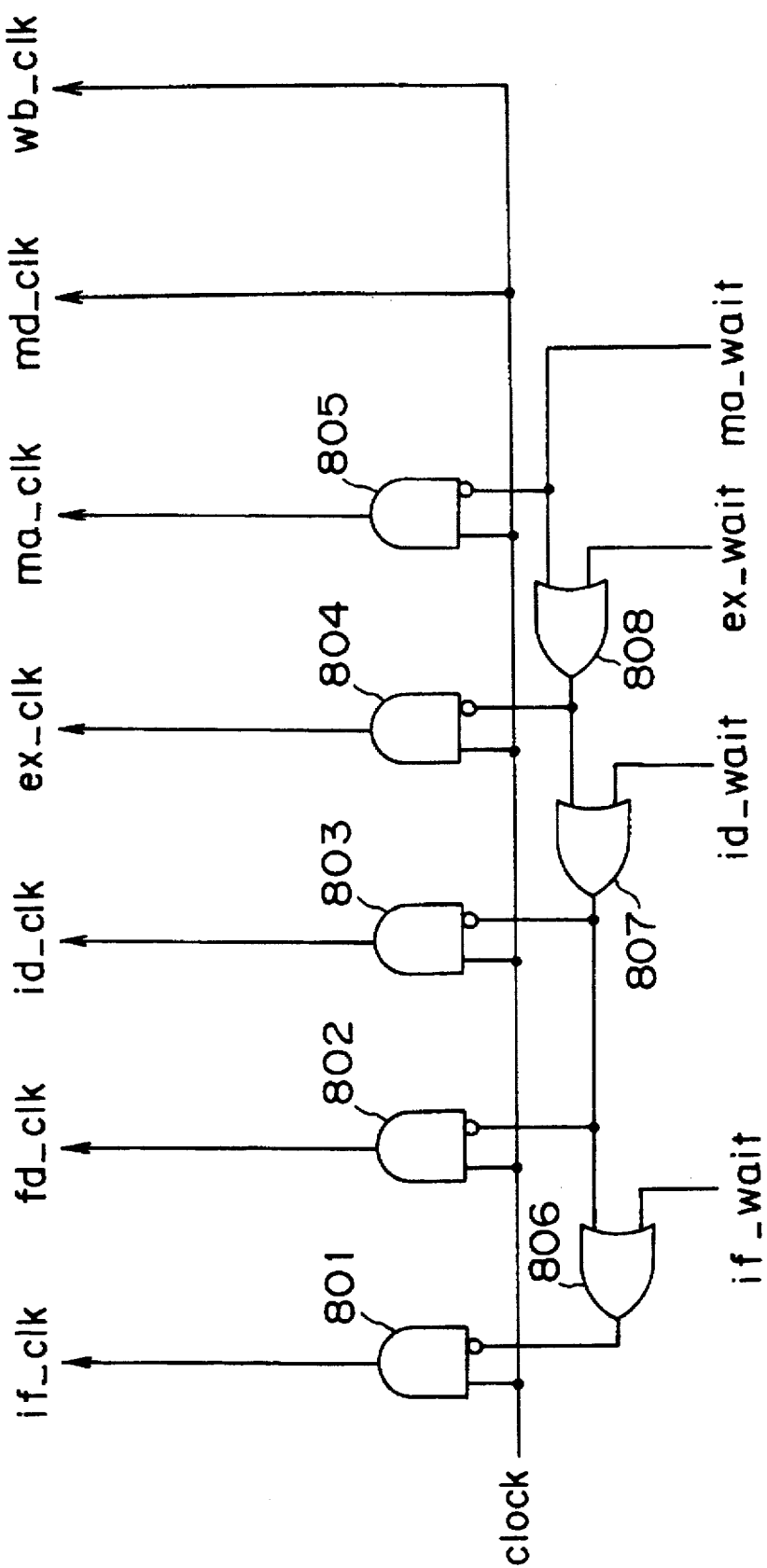
FIG. 27 is a second one of circuit diagrams illustrating in a two [2] part series the partial configuration of a program counter pipeline (a PC pipeline) for use in a pipeline controller pursuant to the second embodiment.

FIG. 27 is a second one of circuit diagrams illustrating in a two [2] part series the partial configuration of a program counter pipeline (a PC pipeline) for use in a pipeline controller pursuant to the second embodiment.

Figure 28:
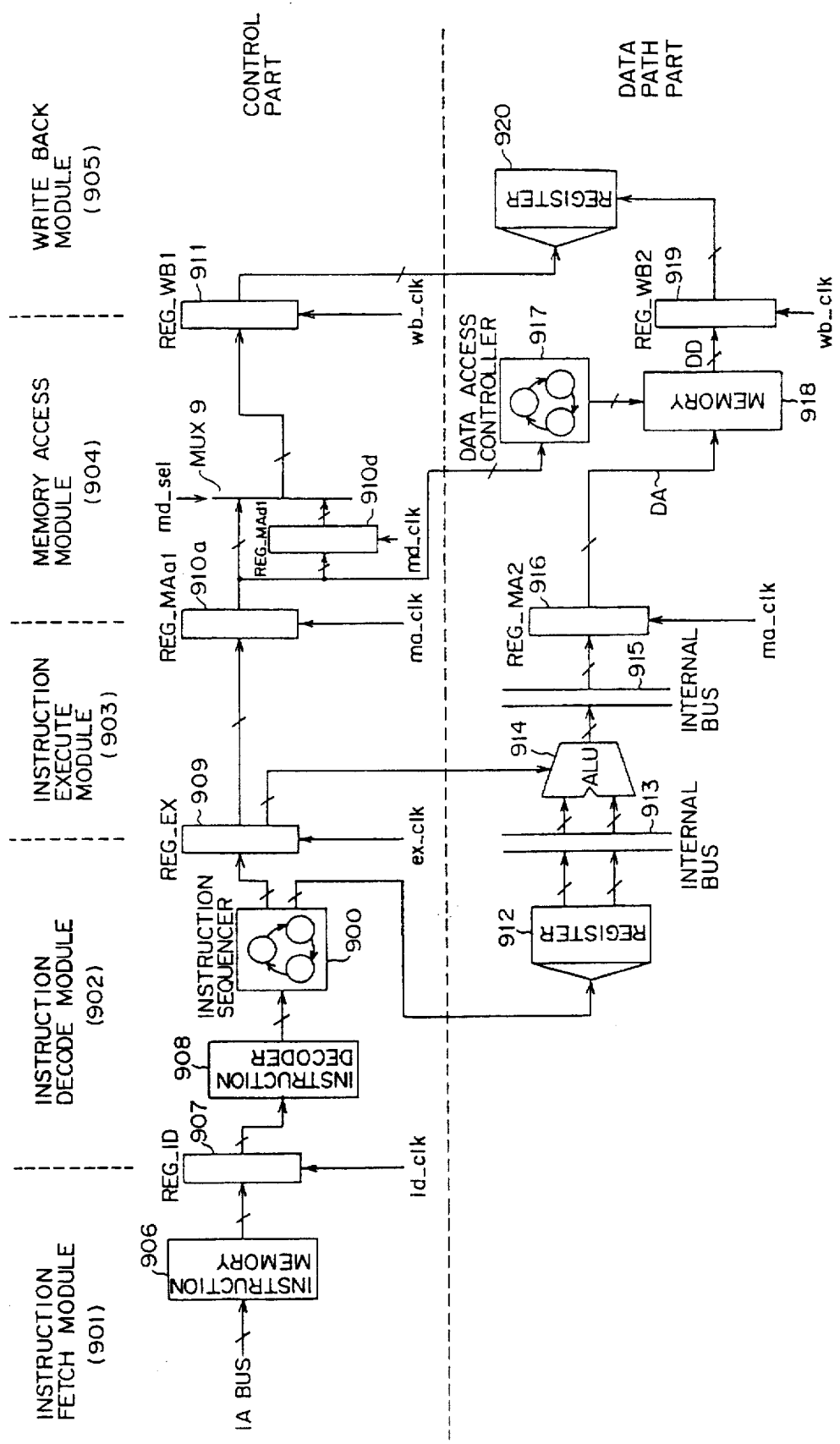
FIG. 28 is a circuit diagram illustrating the configuration of a pipeline processing unit pursuant to the second embodiment.
Figure 34:
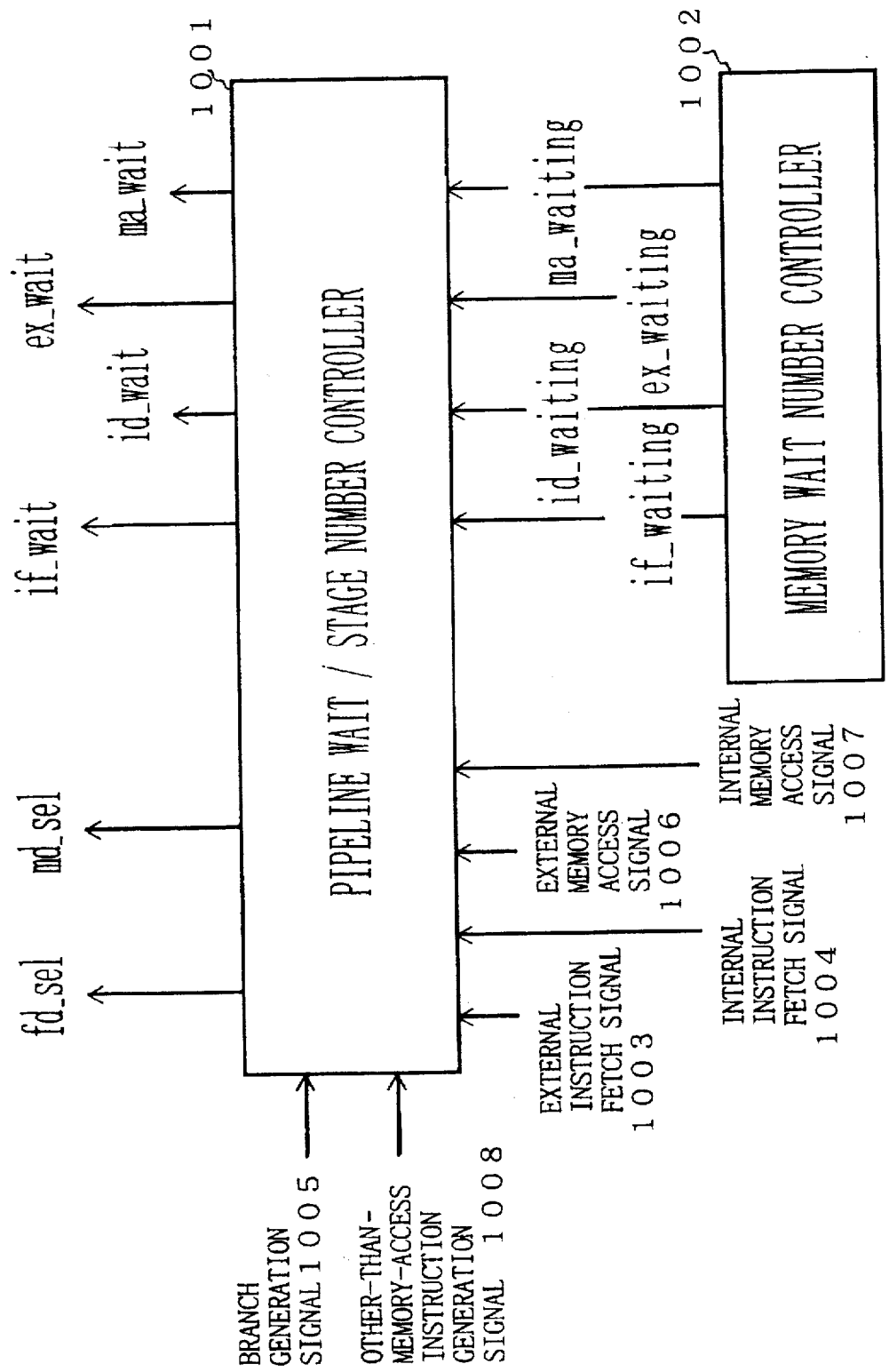
FIG. 34 is a circuit diagram illustrating the circumferential configuration of a pipeline wait/stage number controller.

More specifically, FIG. 27 shows the configuration of a pipeline controller for generating, from control signals outputted from the pipeline wait/stage number controller 1001 shown in FIG. 34, clock signals for their outputs to respective modules shown in FIG. 28.

FIG. 28 is a circuit diagram illustrating the configuration of a pipeline processing unit pursuant to the second embodiment.

An instruction fetch module 901, an instruction decode module 902, an instruction execute module 903, a memory access module 904 and a write back module 905 respectively perform exception processes by referring to the program counter value retaining units, i.e. the PC_IFa 701a, the PC_IFd 701d, the PC_ID 702, the PC_EX 703, the PC_MAa 704a, the PC_MAd 704d and the PC_WB 705 shown in FIG. 26, in synchronization with a clock signal (not shown).

The instruction fetch module 901 fetches from an instruction memory 906 an instruction stored at the address specified by an iA bus, and shifts it to an instruction decode stage register REG_ID 907.

The instruction decode module 902 has an instruction decoder 908 decode an instruction shifted by the instruction decode stage register REG_ID 907 and output plural control signals for plural instructions to the instruction sequencer 900. Then, the instruction decode module 902 shifts them from the instruction sequencer 900 to an instruction execute stage register REG_EX 909. The instruction decode module 902 also has the instruction sequencer 900 output a register selection signal to a first register 912, upon using operand data stored in the first register 912. As well, the instruction decode module 902 activates the instruction sequencer 900 when an exception event arises, which will be described later.

The instruction execute module 903 shifts the plural control signals for plural instructions shifted in the instruction execute stage register REG_EX 909 to a first memory access stage register REG_MAa1 910a, and outputs them to an ALU 914 for its operation as necessary. Upon executing a requested operation, the ALU 914 outputs a result to a second internal bus 915. The instruction execute module 903 shifts the result via the second internal bus 915 to a second memory access stage register REG_MA2 916, when the result is used as an address for a memory access.

The memory access module 904 shifts the control signals from the first memory access stage register REG_MAa1

910a via a multiplexer MUX9 to a first write back stage register REG_WB1 911. The control signals bypasses a memory access stage operand data register REG_MAd1 910d, if the memory access stage split unit 609 has not split a memory access stage MA. Yet, the control signals pass through the second memory access stage operand data register REG_MAd1 910d before the multiplexer MUX9, if the memory access stage split unit 609 has split a memory access stage MA into memory access stages MAa and MAd. (Refer to FIG. 25.) The memory access module 904 also outputs the control signals to a data access controller 917, when it is necessary to write into or read from a memory 918 instruction data.

The memory access module 904 has the data access controller 917 generate (from the control signals supplied from the instruction decoder 908 via the instruction sequencer 900, the REG_EX 909 and the REG_MAa1 910a) and output a memory access control signal for use, together with an address DA from the second memory access stage register REG_MA2 916, in writing into or reading from the memory 918 operand data. Upon reading operand data from the memory 918, the memory access module 904 shifts them to a second write back stage register REG_WB2 919. Upon writing operand data into the memory 918, however, the memory access module 904 does not shift them to the second write back stage register REG_WB2 919, since it is unnecessary to write them in it.

As well, the memory access module 904 has the multiplexer MUX9 supply a control signal to the data access controller 917, when an instruction requires operand data to be written in or read from the memory 918.

The write back module 905 shifts from the memory 918 via the second write back stage register REG_WB2 919 into a second register 920 either operand data obtained through a memory access by the data access controller 917 or operand data obtained through an operation by the ALU 914 and supplied via the second internal bus 915. More specifically, the second memory access stage register REG_MA2 916 in the data path part shifts an operand address calculated by the ALU 914 at the same timing as the first memory access stage register REG_MAa1 910a in the control part does, in synchronization with a clock signal (not shown).

As well, the write back module 905 has the first write back stage register REG_WB1 911 supply to the second register 920 control signals indicating a register number.

The operation of the second embodiment having the above configuration is described below in detail.

Figure 29:
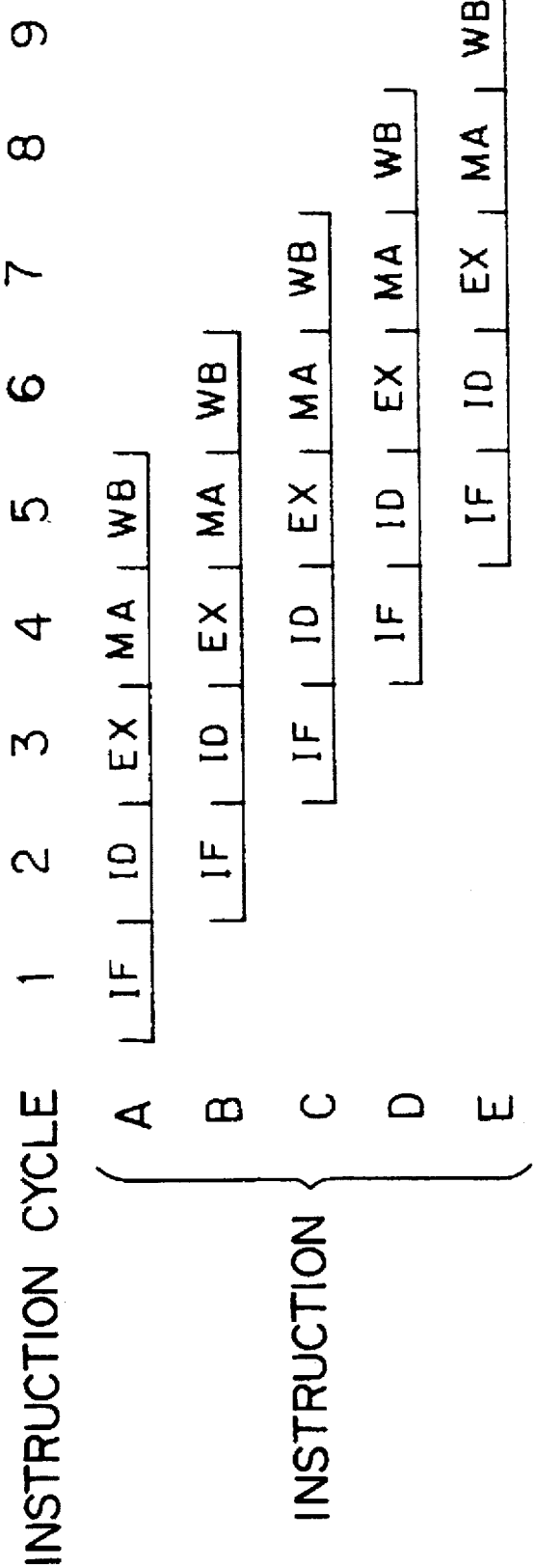
FIG. 29 is an explanatory diagram illustrating basic pipeline processes without a memory wait.

FIG. 29 is an explanatory diagram illustrating basic pipeline processes without a memory wait.

Figure 6:
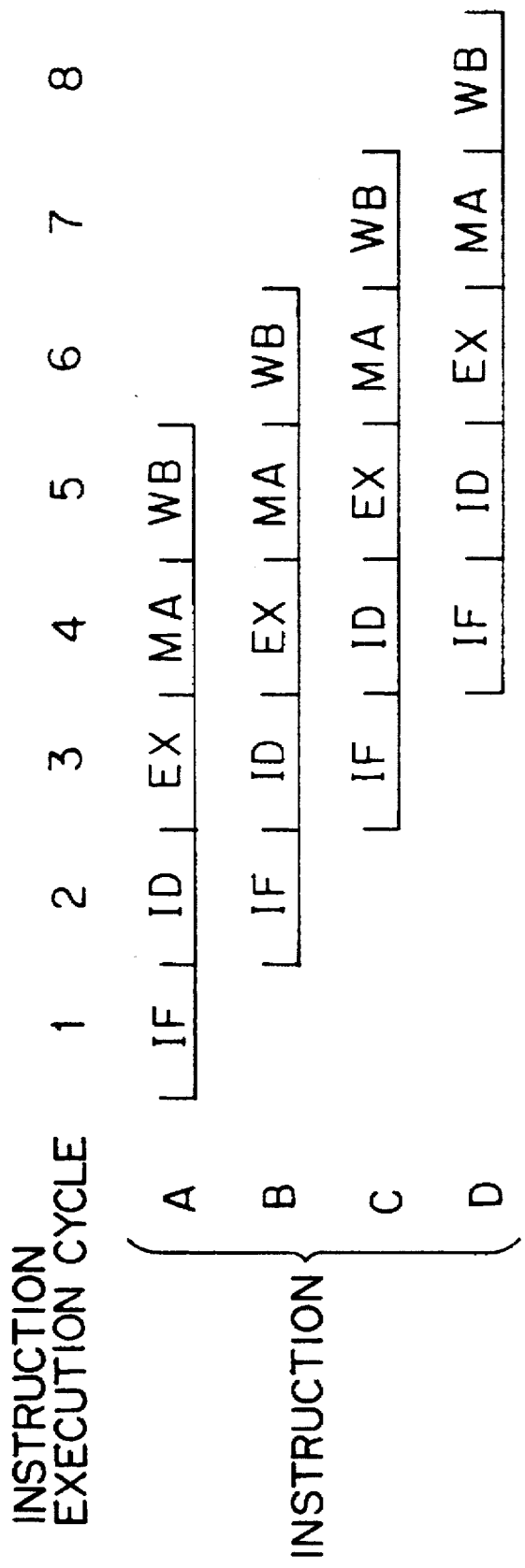
FIG. 6 is an explanatory diagram illustrating conventional pipeline processes without a memory wait.
Figure 7:
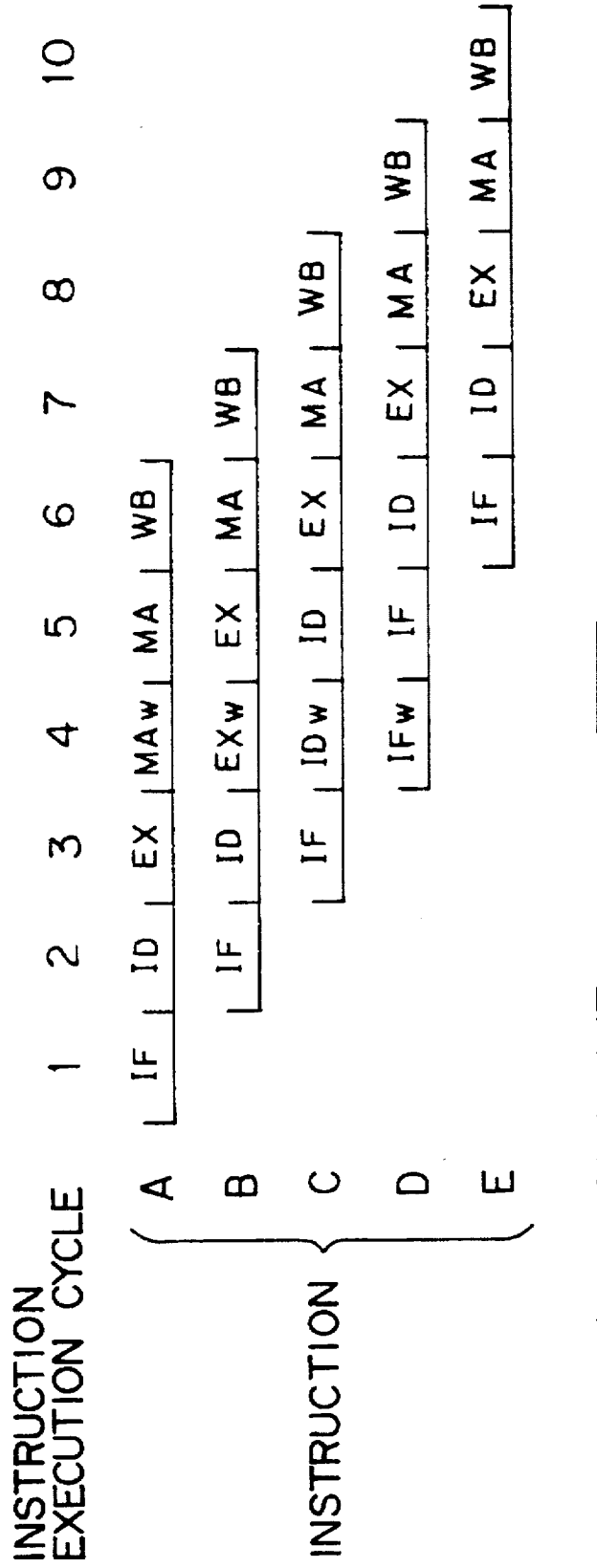
FIG. 7 is an explanatory diagram illustrating conventional pipeline processes with a memory wait.
Figure 8:
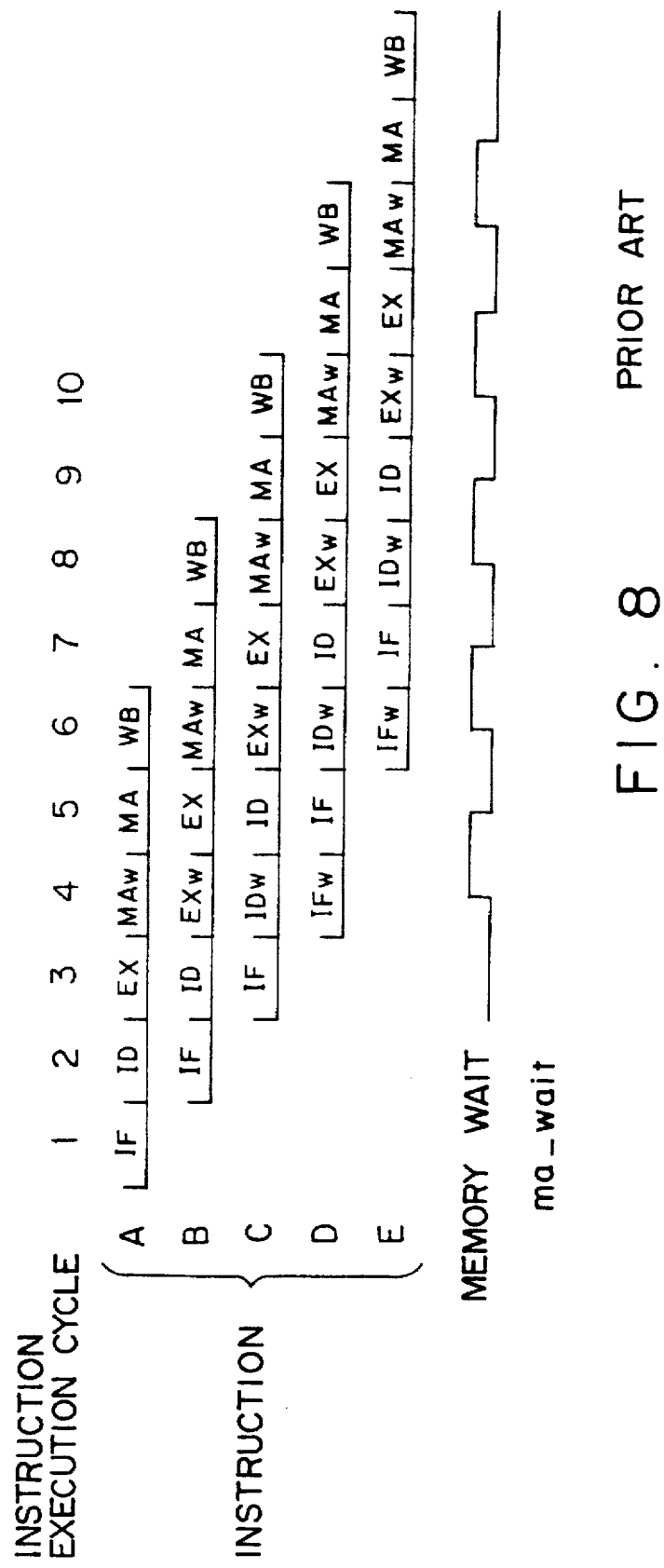
FIG. 8 is an explanatory diagram illustrating conventional pipeline processes with a memory wait in the MA stage of every instruction.
Figure 9:
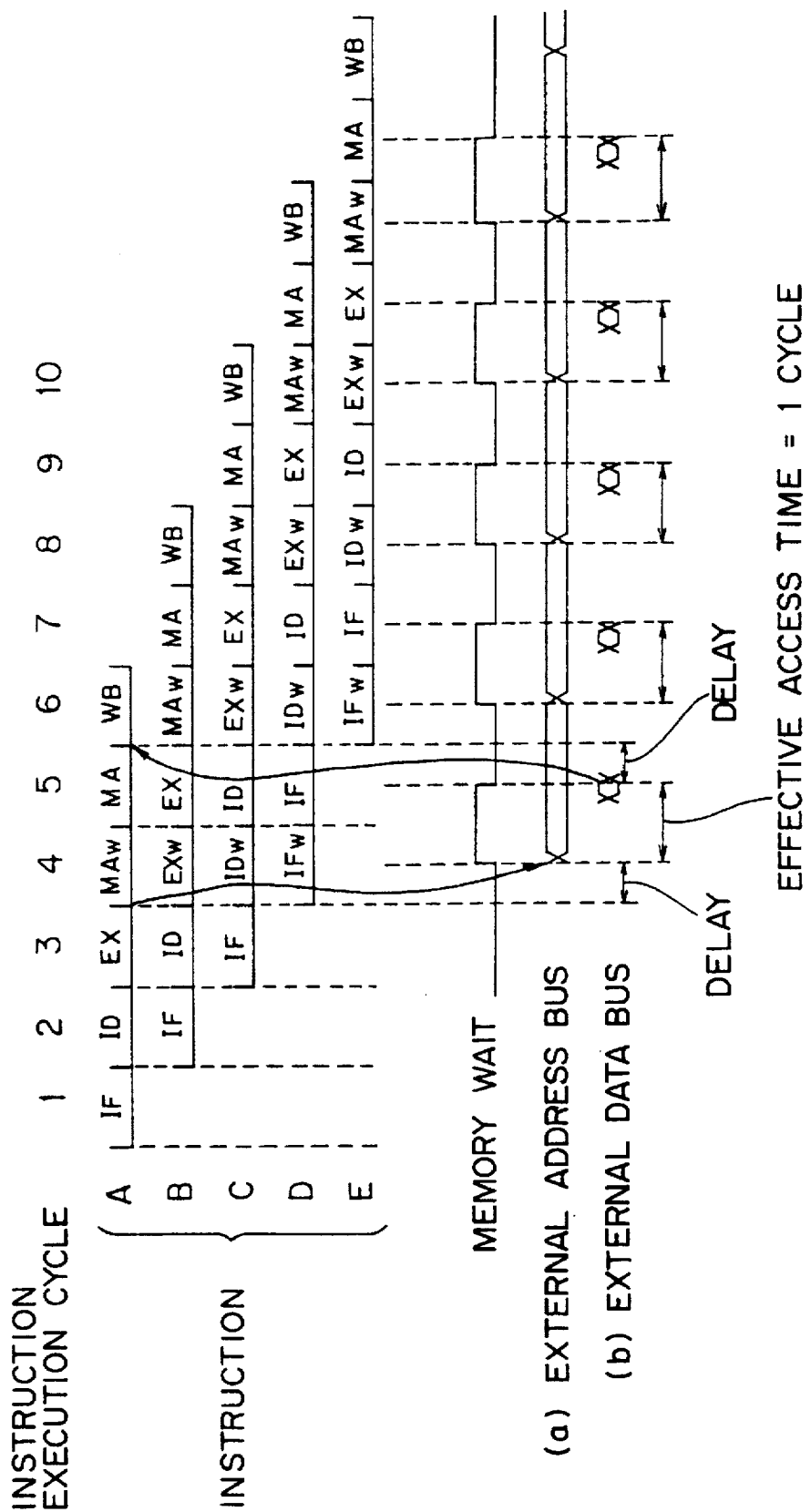
FIG. 9 is an explanatory diagram illustrating conventional pipeline processes with one [1] wait, upon accessing an external address bus and an external data bus.

In this case, neither an instruction fetch stage nor an memory access stage is split, the instruction fetch unit 601 supplies an output from the PC_IFa 701a to the PC_ID 702 via the second multiplexer MUX2, and the memory access unit 604 supplies an output from the PC_MAa 704a via the third multiplexer MUX3 to the PC_WB 705. That is, this case is exactly the same as that of generic pipeline processes shown in FIG. 6.

Figure 30:
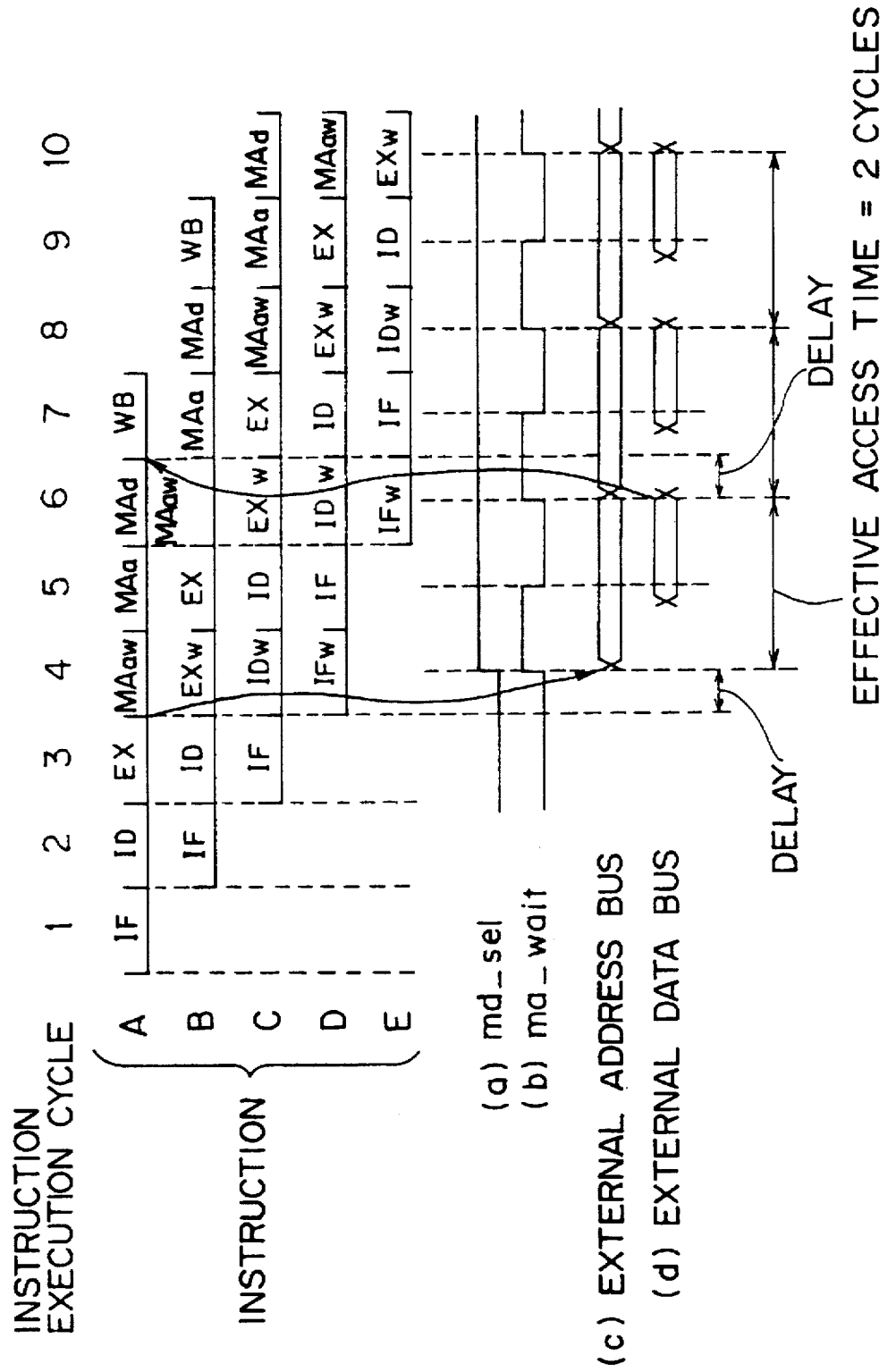
FIG. 30 is an explanatory diagram illustrating basic pipeline processes with two [2] waits, upon accessing an external address bus and an external data bus.

FIG. 30 is an explanatory diagram illustrating basic pipeline processes with two [2] waits, upon accessing an external address bus and an external data bus.

More specifically, FIG. 30 shows a case in which an external memory is difficult to be accessed at a time interval equivalent to a pipeline pitch (= one [1] instruction cycle).

Figure 10:
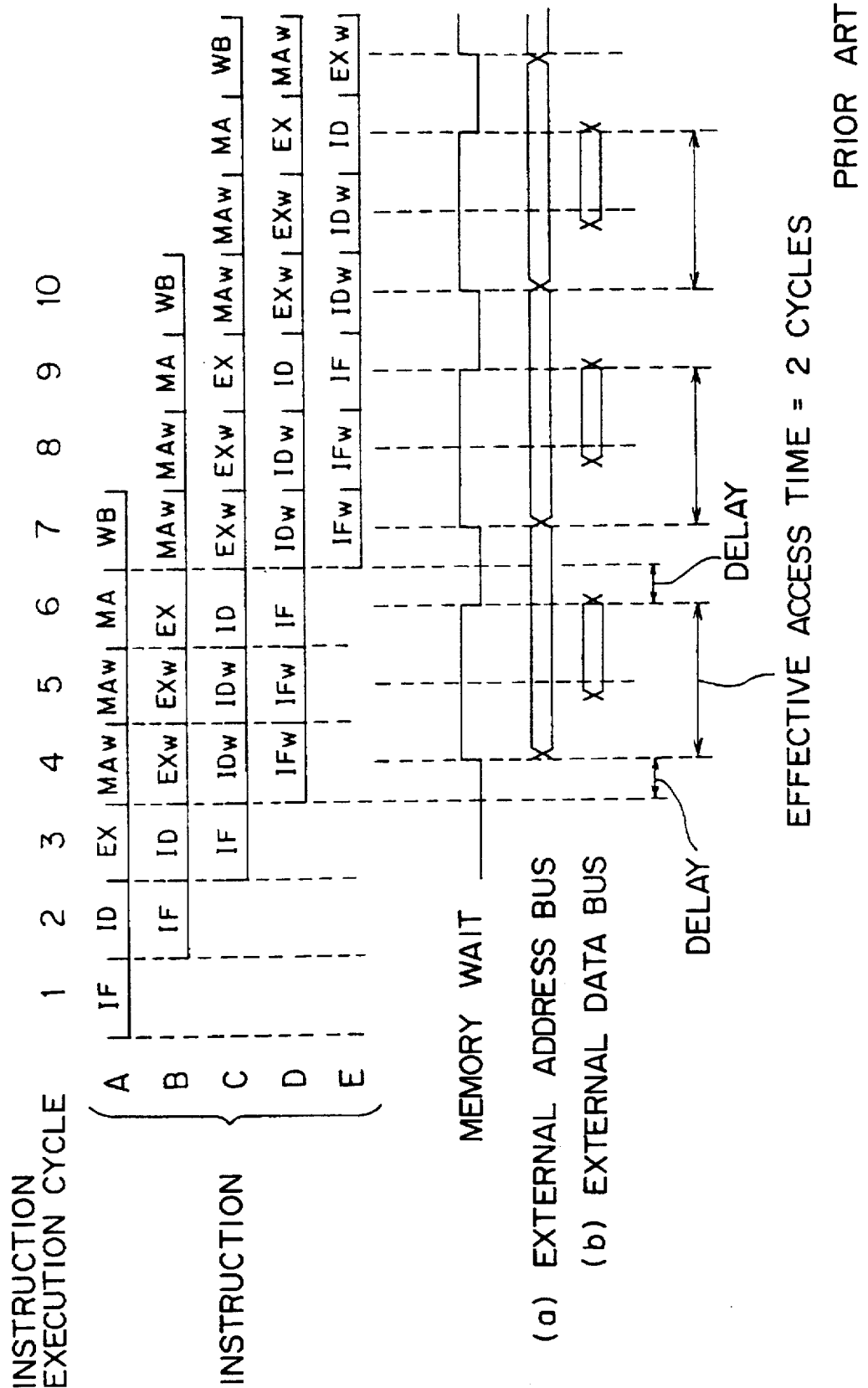
FIG. 10 is an explanatory diagram illustrating conventional pipeline processes with two [2] waits, upon accessing an external address bus and an external data bus.

FIG. 30 reveals the following as compared with FIG. 10, which shows a prior art.

As described earlier, the second embodiment shown in FIG. 30 features that the memory access stage split unit 609 splits a memory access stage MA into an operand address output stage MAa for outputting to the memory unit an operand address and an operand data read/write stage MAd for reading from or writing in the memory unit operand data corresponding to the operand address, whereas the prior art shown in FIG. 10 does not feature such a split.

Accordingly, whereas the execution of an operand data read/write stage MAd stage for instruction A in instruction cycle 6 causes operand data for instruction A to be exchanged between a CPU and an external memory, the execution of an operand address output stage MAa (MAaw) for instruction B in the same instruction cycle causes operand address to be outputted from the CPU to the external memory, for example.

That is, a split of a memory access stage MA into an operand address output stage MAa for outputting from the CPU to the external memory an operand address and an operand data read/write stage MAd for exchanging between the CPU and the external memory operand data enables the parallel operations for these two [2] instructions to be pipelined.

The operations of the second embodiment shown in FIG. 30 have the following advantage over those of the prior art shown in FIG. 10.

That is, in FIGS. 30 and 10, the instruction cycles necessary for executing a memory access are both three [3] instruction cycles. Consequently, both secure effective access time having a duration of two [2] instruction cycles for an external memory, as shown in parts (c) and (d) of FIG. 30 and parts (a) and (b) of FIG. 10.

Here, however, of the three [3] instruction cycles forming a memory access stage MA, while the case shown in FIG. 10 requires the duration in a memory wait status to be two [2] instruction cycles, the case shown in FIG. 30 requires the duration in a memory wait status to be only one [1] instruction cycle.

As a result, for instance, whereas the instruction execute stage EX for instruction B succeeding instruction A requires an insertion of two [2] memory waits (2EXw) having the same duration as two [2] waits (2MAw) inserted in the MA stage for instruction A in the case shown in FIG. 10, the instruction execute stage EX for instruction B succeeding instruction A requires an insertion of one [1] memory wait (EXw) having the same duration as one [1] wait (MAaw) inserted in the MA stage for instruction A in the case shown in FIG. 30.

Hence, an MAa stage succeeding an EX stage for instruction B can be executed in an instruction cycle 6 in which an MAd stage for instruction A is executed, in the case shown in FIG. 30. In instruction cycle 6, instructions C, D and E cannot repeat a status on and before instruction cycle 5.

Consequently, the duration of instruction cycles before instruction B completes its execution is ten [10] instruction cycles in the case shown in FIG. 10, whereas the duration of instruction cycles before instruction B completes its execution is nine [9] instruction cycles in the case shown in FIG. 30. Further, the duration of instruction cycles before instruction D completes its execution is sixteen [16] instruction cycles in the case shown in FIG. 10, whereas the duration of instruction cycles before instruction D completes its execution is thirteen [13] instruction cycles in the case shown in FIG. 30. Thus, the second embodiment shows that this invention is effective in reducing an overall pipeline delay as compared with a prior art.

Figure 31:
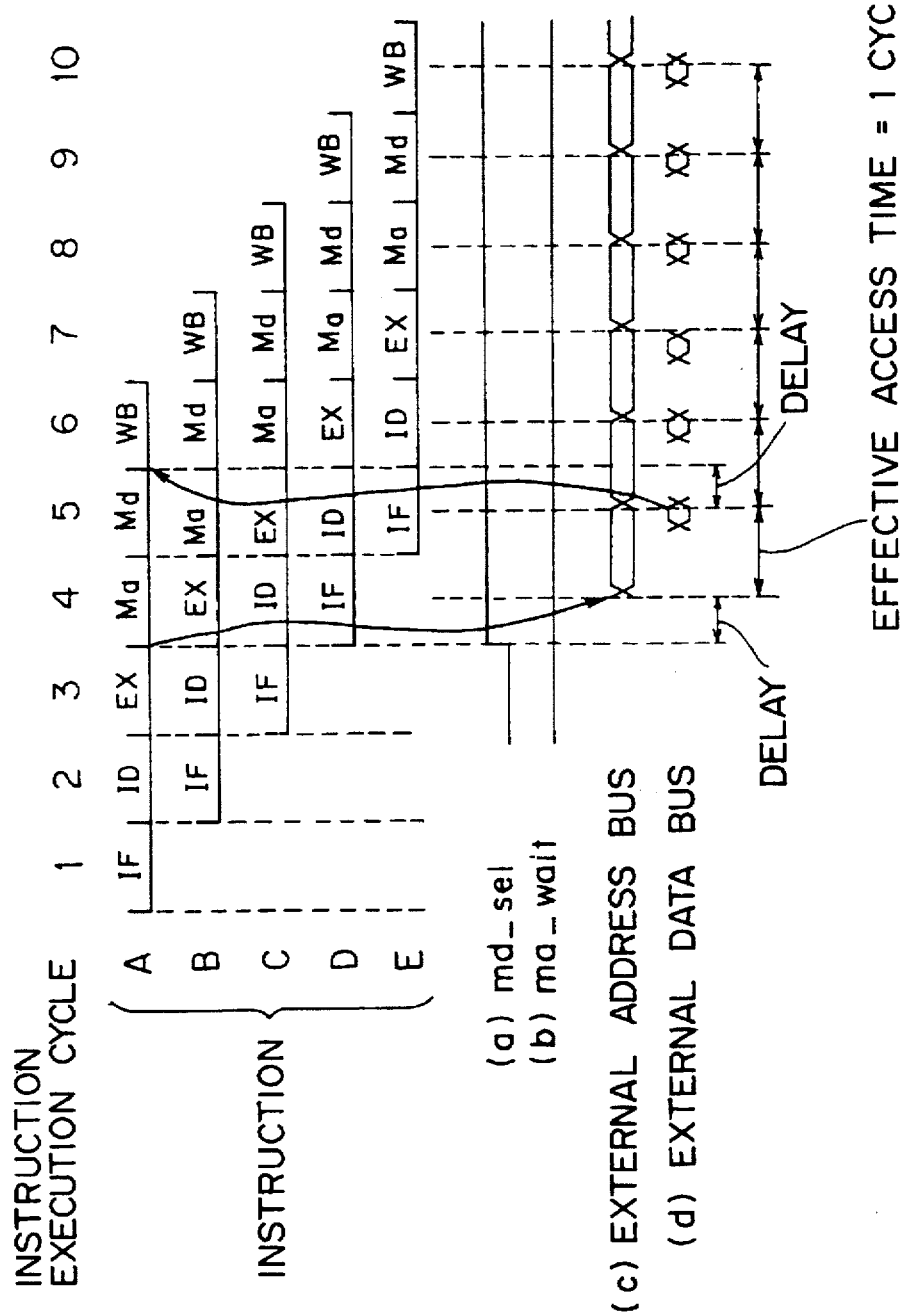
FIG. 31 is an explanatory diagram illustrating basic pipeline processes with one [1] wait, upon accessing an external address bus and an external data bus.

FIG. 31 is an explanatory diagram illustrating basic pipeline processes with one [1] wait, upon accessing an external address bus and an external data bus.

More specifically, FIG. 31 shows pipeline processes in which an external memory can be accessed at a time interval of a pipeline pitch (=one [1] instruction cycle).

As with the case shown in FIG. 30, the case shown in FIG. 31 features that the memory access stage split unit 609 splits a memory access stage MA into an operand address output stage MAa for outputting to the memory unit an operand address and an operand data read/write stage MAd for reading from or writing in the memory unit operand data corresponding to the operand address.

The same can be said about when the instruction fetch stage split unit 606 splits an instruction fetch stage IF into an instruction address output stage IFa for outputting to the memory unit an instruction address and an instruction data input stage IFd for inputting from the memory unit instruction data corresponding to the instruction address.

Here, when a branch instruction is executed by pipeline processes, a pipeline generally receives data on a group of instructions executed when a branch does not arise as a result of decoding a branch instruction succeeding data on the branch instruction. Hence, when a branch arises as a result of decoding a branch instruction, data on a group of instructions inputted in a pipeline succeeding data on a branch instruction need to be canceled, and data on a group of branch target instructions need to be reinputted.

In this case, when the instruction fetch stage split unit 606 splits an instruction fetch stage IF into instruction fetch stages IFa and IFd, the higher the number of pipeline processes, the larger the penalty of canceling pipeline processes at a time of generating a branch, thus deteriorating the performance of pipeline processes.

This problem is explained below by making a comparison between a case in which an instruction fetch stage IF is split and a case in which an instruction fetch stage IF is not split.

Figure 32:
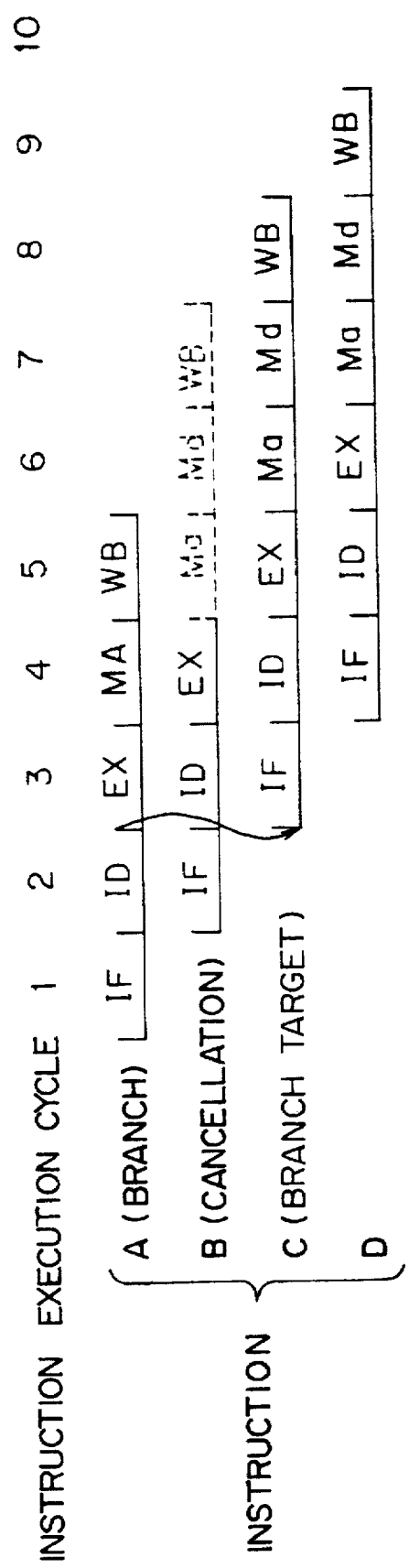
FIG. 32 is an explanatory diagram illustrating basic pipeline processes when a branch arises with an instruction fetch stage IF not being split.

FIG. 32 is an explanatory diagram illustrating basic pipeline processes when a branch arises with an instruction fetch stage IF not being split.

In instruction cycle 2, the instruction decode module 902 has the instruction decoder 908 decode a branch instruction A from the instruction decode stage register REG_ID 907 for retaining an instruction fetched in instruction cycle 1. Then, the instruction decode module 902 has the instruction sequencer 900 output a branch offset address as a part of operand data of the branch instruction A to the first PC_adder 700-1 shown in FIG. 26.

The first PC adder 700-1 adds the above branch offset address to the current program counter value outputted from the PC_IFa 701a.

The first multiplexer MUX1 selects a program counter value corresponding to a branch target instruction C thus obtained, and sets it in the PC_IFa 701a in instruction cycle 3. Also in instruction cycle 3, the instruction fetch module 901 fetches the branch target instruction C from the instruction memory 906 by outputting to the iA bus a program counter value corresponding to the branch target instruction C set in the PC_IFa 701a.

Therefore, if the instruction fetch stage split unit 606 has not split an instruction fetch stage IF, because the pipeline receives only data on a single instruction, i.e. instruction B, until the instruction cycle completes the branch instruction A, only data on that single instruction, i.e. instruction B, are canceled. More specifically, in instruction cycles 5 and 6, the memory access unit 604 has the PC_MAa 704a and the PC_MAd 704d clear their contents corresponding to instruction B; and in instruction cycle 7, the write back unit 605 has the PC_WB 705 clear its content corresponding to instruction B. The execution of an IF stage, an ID stage or an EX stage does not affect the execution of another instruction. Thus, contents in the PC_IFa 701a, the PC_ID 702 and the PC_EX 703 need not be cleared.

Figure 33:
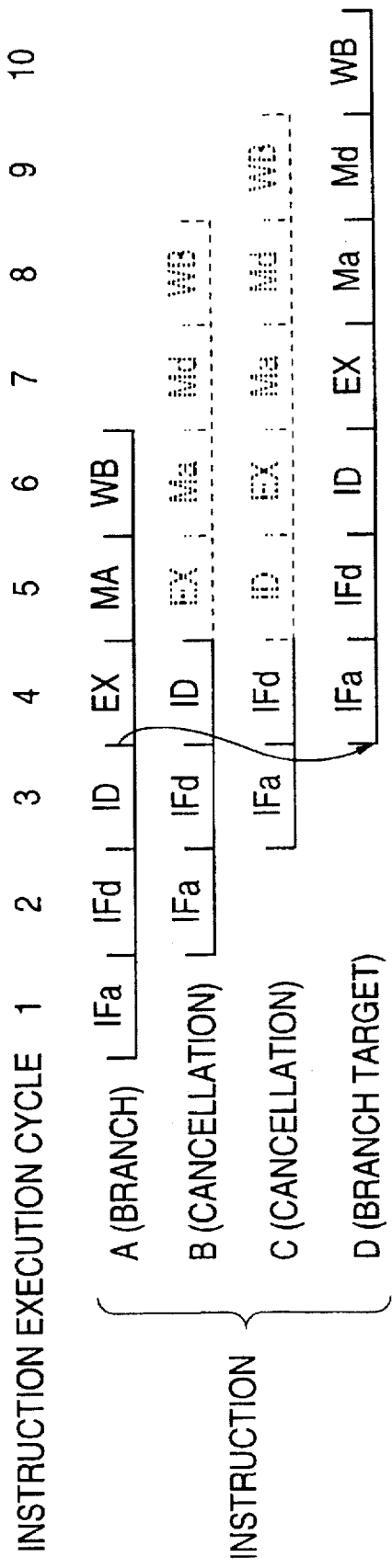
FIG. 33 is an explanatory diagram illustrating basic pipeline processes when a branch arises with an instruction fetch stage IF being split into IFa and IFd.

FIG. 33 is an explanatory diagram illustrating basic pipeline processes when a branch arises with an instruction fetch stage IF being split into IFa and IFd.

In this case, because a pipeline has received data on two [2] instructions, i.e. instruction B and instruction C, before the instruction decode unit 602 completes decoding the branch instruction A, data on these two [2] instructions, i.e. instruction B and instruction C, are canceled.

The above description can be summarized as follows: When an instruction fetch stage IF is not split as in the case shown in FIG. 32, because the execution of the branch instruction A generates a branch, and as a result, a duration of only two [2] instruction cycles needs to be taken before executing the branch target instruction C. If the instruction fetch stage split unit 606 has split an instruction fetch stage IF into an instruction address output stage IFa for outputting to a memory unit an instruction address and an instruction data input stage IFd for inputting from the memory unit instruction data corresponding to the instruction address as in the case shown in FIG. 32, the execution of a branch instruction generates a branch. As a result, a duration of three [3] instruction cycles needs to be taken before executing a branch target instruction. Hence, a higher number of pipeline processing stages effected by splitting an instruction fetch stage IF invites a performance deterioration for a pipeline.

To solve the above problem, the second embodiment features a control as to whether or not to split an instruction fetch stage IF and a memory access stage MA.

Returning to FIG. 25, more concrete operations are described as follows:

When the instruction fetch unit 601 fetches an instruction from an external memory, the instruction fetch stage split control unit 607 has the instruction fetch stage split unit 606 split an instruction fetch stage IF into IFa and IFd.

When the memory access unit 604 accesses an external memory, the memory access stage split control unit 610 has the memory access stage split unit 609 split a memory access stage MA into MAa and MAd.

When the execution of a branch instruction generates a branch and the instruction fetch unit 601 fetches a branch target instruction from an internal memory, the instruction fetch stage split control unit 607 has the instruction fetch stage split unit 606 unsplit the split instruction fetch stages IFa and IFd into the instruction fetch stage IF.

When the execution of an instruction not accompanying an operand access generates a succeeding instruction accompanying an operand access and the memory access unit 604 accesses an internal memory, the memory access stage split control unit 610 has the memory access stage split unit 609 unsplit the split memory access stages MAa and MAd into the memory access stage MA.

Because a RISC pipeline processor generally generates a memory access only when a load instruction or a store instruction is executed, the execution of an instruction other than the above may unsplit memory access stages.

FIG. 34 is a circuit diagram illustrating the circumferential configuration of a pipeline wait/stage number controller.

More specifically, FIG. 34 shows the relations among the pipeline wait/stage number controller 1001, a memory wait number controller 1002 and other signals.

The instruction fetch module 901 supplies an external instruction fetch signal 1003 and an internal instruction fetch signal 1004.

The instruction decode module 902 supplies a branch generation signal 1005 and an other-than-memory-access instruction generation signal 1008.

The memory access module 904 supplies an external memory access signal 1006 and an internal memory access signal 1007.

Their operations will be explained later in detail with reference to FIG. 28.

Figure 35:
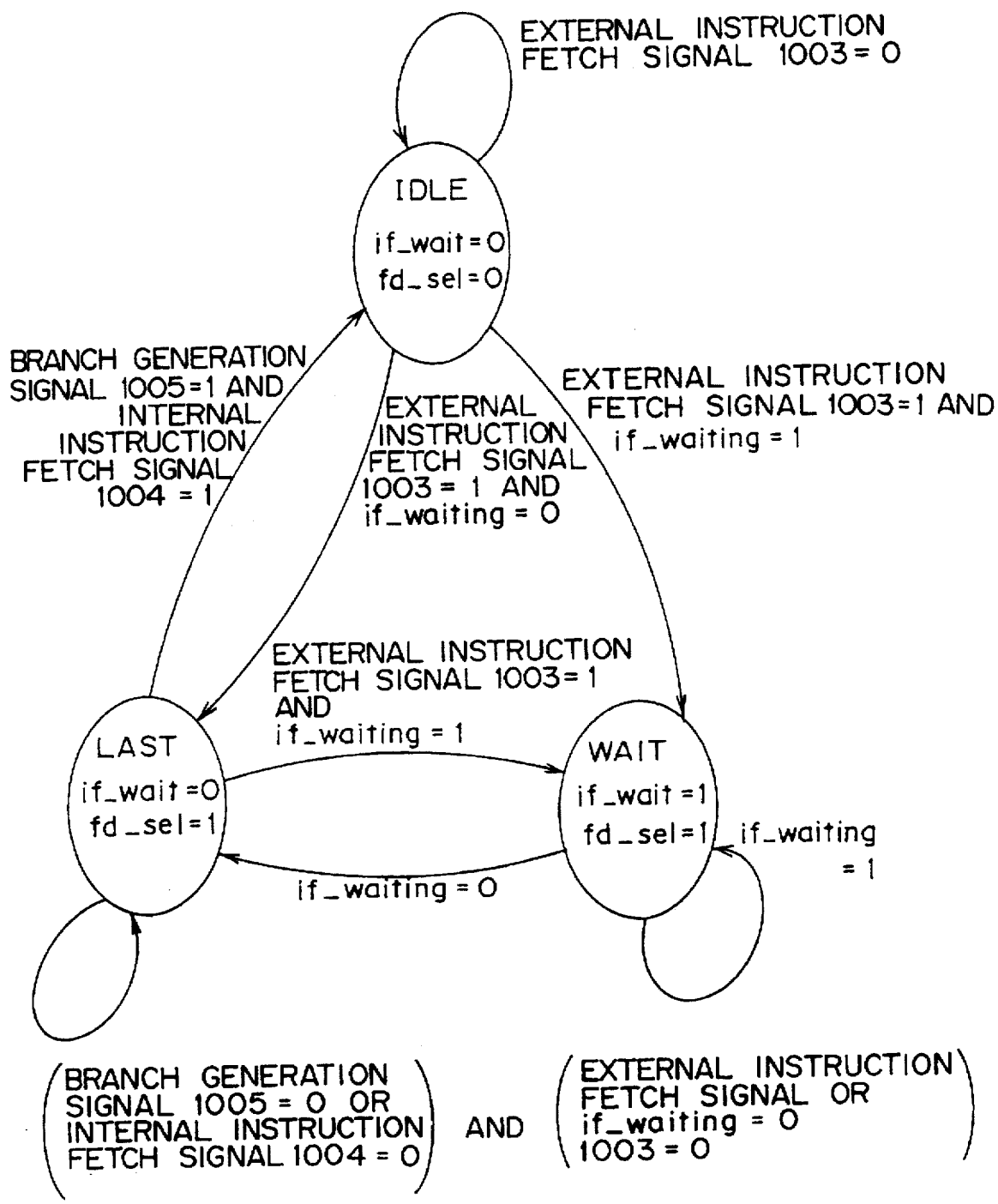
FIG. 35 is a status transition diagram illustrating an instruction fetch stage control operation.

FIG. 35 is a status transition diagram illustrating an instruction fetch stage control operation.

Figure 36:
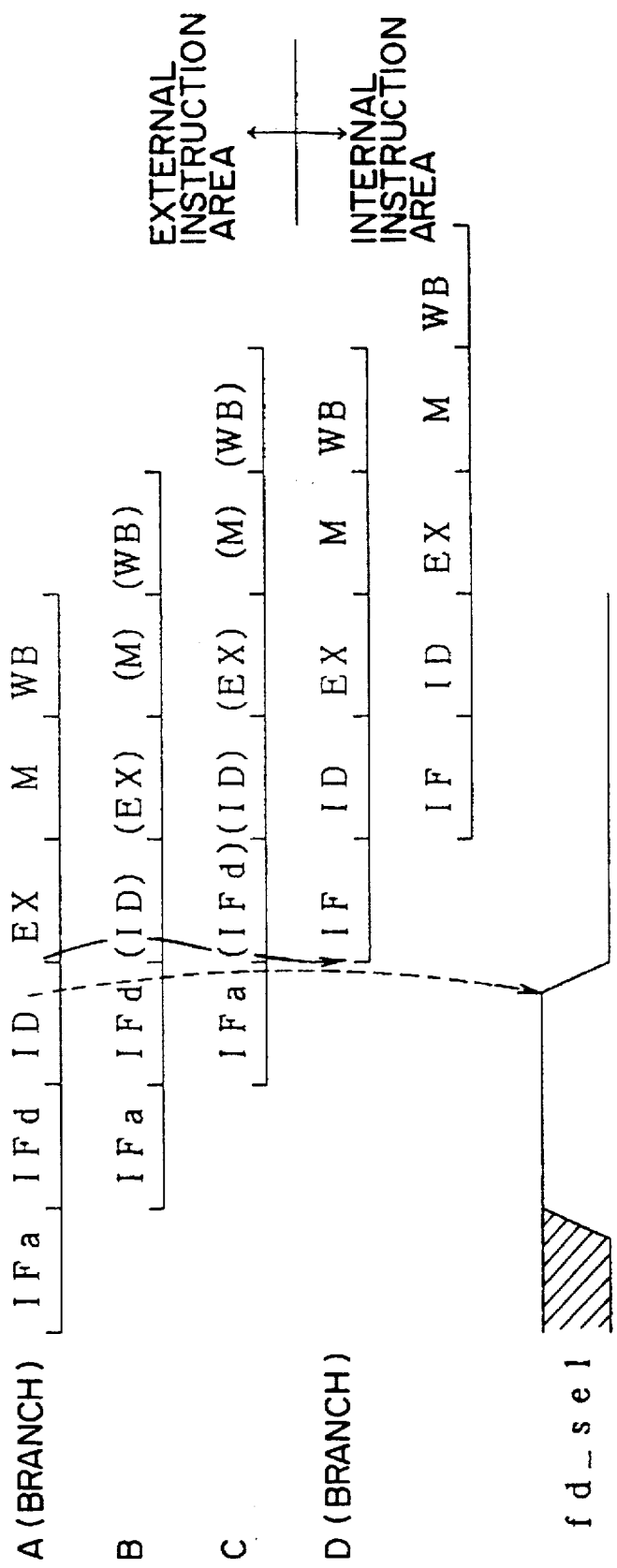
FIG. 36 is a timing chart illustrating an instruction fetch stage control operation.

FIG. 36 is a timing chart illustrating an instruction fetch stage control operation.

The pipeline wait/stage number controller 1001 functions as a finite status machine regarding an instruction fetch stage control operation, and takes any of three [3] statuses, namely IDLE, WAIT and LAST.

A first status is IDLE. The pipeline wait/stage number controller 1001 does not assert an if_wait signal or an fd_sel signal to the pipeline controllers shown in FIGS. 26, 27 and 28. This status can be achieved when an instruction stored in an internal memory (hereafter referred to as an internal instruction) is being fetched. In this status, the instruction fetch stage split 606 does not split an instruction fetch stage IF into IFa and IFd. However, the PC_ID 702 receives via the second multiplexer MUX2 an output from the PC_IFa 701a. Because the instruction fetch stage split unit 606 does not split the instruction fetch stage IF in the IDLE status, a penalty due to the cancellation of pipeline processes upon generating a branch is minimized.

The pipeline wait/stage number controller 1001 takes an IDLE status when the instruction fetch module 901 has the instruction fetch unit 601 fetch an internal instruction, which is defined as an instruction stored in an internal memory. In the IDLE status, the instruction fetch stage split unit 606 does not split an instruction fetch stage IF, and has the PC_IFa 701a supply its output to the PC_ID 702 via the multiplexer MUX2 without passing through the PC_IFd 701d, thereby minimizing the penalty due to the cancellation of pipeline processes when a branch arises. (Refer to FIGS. 26, 27 and 28.)

The pipeline wait/stage number controller 1001 remains in the IDLE status until the instruction fetch module 901 asserts the external instruction fetch signal 1003, which is a signal indicating that the instruction fetch unit 601 fetches an external instruction, which is defined as an instruction stored in an external memory.

A second status is WAIT. When the instruction fetch module 901 asserts the external instruction fetch signal 1003 and the memory wait number controller 1002 asserts an if_waiting signal, the pipeline wait/stage number controller 1001 shifts its status from the IDLE status to a WAIT status.

A third status is LAST. When the instruction fetch module 901 asserts the external instruction fetch signal 1003 but the memory wait number controller 1002 does not assert an if_waiting signal, the pipeline wait/stage number controller 1001 shifts its status from the IDLE status to a LAST status.

In the WAIT status, the pipeline wait/stage number controller 1001 asserts an if_wait signal to the pipeline controllers shown in FIGS. 26, 27 and 28.

The pipeline wait/stage number controller 1001 remains in the WAIT status, while the memory wait number controller 1002 asserts the if_waiting signal. The memory wait number controller 1002 does not assert the if_waiting signal when no or only one [1] wait is inserted in an instruction fetch stage IF, but does assert the same for a duration of n−1 instruction cycles when n (n≧2) waits are inserted. When the memory wait number controller 1002 negates the if_waiting signal, the pipeline wait/stage number controller 1001 shifts its status from the WAIT status to the LAST status.

In the LAST status, the pipeline wait/stage number controller 1001 keeps asserting an fd_sel signal to the pipeline controller shown in FIG. 27, while negating an if_wait signal. In the LAST status, the instruction fetch module 901 fetches an external instruction.

The pipeline wait/stage number controller 1001 maintains the LAST status, while at least either the instruction decode module 902 negates the branch generation signal 1005 or the instruction fetch module 901 negates the internal instruction fetch signal 1004 and at least either the instruction fetch module 901 negates the external instruction fetch signal 1003 of the memory wait number controller 1002 negates the if_waiting signal. Here, the branch generation signal 1005 is a signal indicating that a branch arises as a result of executing a branch instruction, which is an external instruction. The internal instruction fetch signal 1004 is a signal indicating that the instruction fetch module 901 has the instruction fetch unit 601 fetch an internal instruction stored in an internal memory.

As well, being in the LAST status, when the instruction fetch module 901 has the instruction fetch unit 601 fetch a new external instruction, the instruction fetch module 901 asserts the external instruction fetch signal 1003 and the memory wait number controller 1002 asserts the if_waiting signal, the pipeline wait/stage number controller 1001 shifts its status from the LAST status to the WAIT status.

As described earlier, when the instruction fetch unit 601 fetches an external instruction from an external memory in the IDLE status, in which the instruction fetch stage split control unit 607 has not had the instruction fetch stage split unit 606 split an instruction fetch stage IF, the instruction fetch stage split control unit 607 has the instruction fetch stage split unit 606 split the instruction fetch stage IF, the PC_IFa 701a supplies its output via the PC_IFd 701d and the second multiplexer MUX2 to the PC_ID 702.

When the memory wait number controller 1002 asserts the if_waiting signal, i.e. when the instruction fetch unit 601 fetches an external memory incapable of being accessed at a time interval of a single pipeline pitch (=one [1] instruction cycle), the memory wait number controller 1002 generates a necessary WAIT status. (Refer to FIG. 30.)

When the memory wait number controller 1002 does not assert the if_waiting signal, i.e. when the instruction fetch unit 601 fetches an external memory capable of being accessed at a time interval of a single pipeline pitch (=one [1] instruction cycle), the pipeline wait/stage number controller 1001 shifts its status directly to the LAST status without the memory wait number controller 1002 generating the WAIT status. Thus, the instruction fetch stage split control unit 607 has the instruction fetch stage split unit 606 split an instruction fetch stage IF. (Refer to FIG. 31.)

Where the instruction fetch unit 601 fetches an instruction in the LAST status, when the instruction fetch stage split control unit 607 has the instruction fetch stage split unit 606 split an instruction fetch stage IF, the performance of pipeline processes can be ameliorated at a timing other than a branch generation.

In the LAST status, when pipeline processes are canceled, i.e. when the instruction decode module 902 asserts the branch generation signal 1005 and the instruction fetch module 901 asserts the internal instruction fetch signal 1004, the pipeline wait/stage number controller 1001 shifts from the LAST status to the IDLE status. As a result, as shown e.g. in FIG. 36, when a branch arises as a result of executing an instruction decode stage ID for the branch instruction A and the branch target instruction D is an internal instruction, the pipeline wait/stage number controller 1001 negates the fd_sel signal, thereby unsplitting the split instruction fetch stages IFa and IFd.

Figure 37:
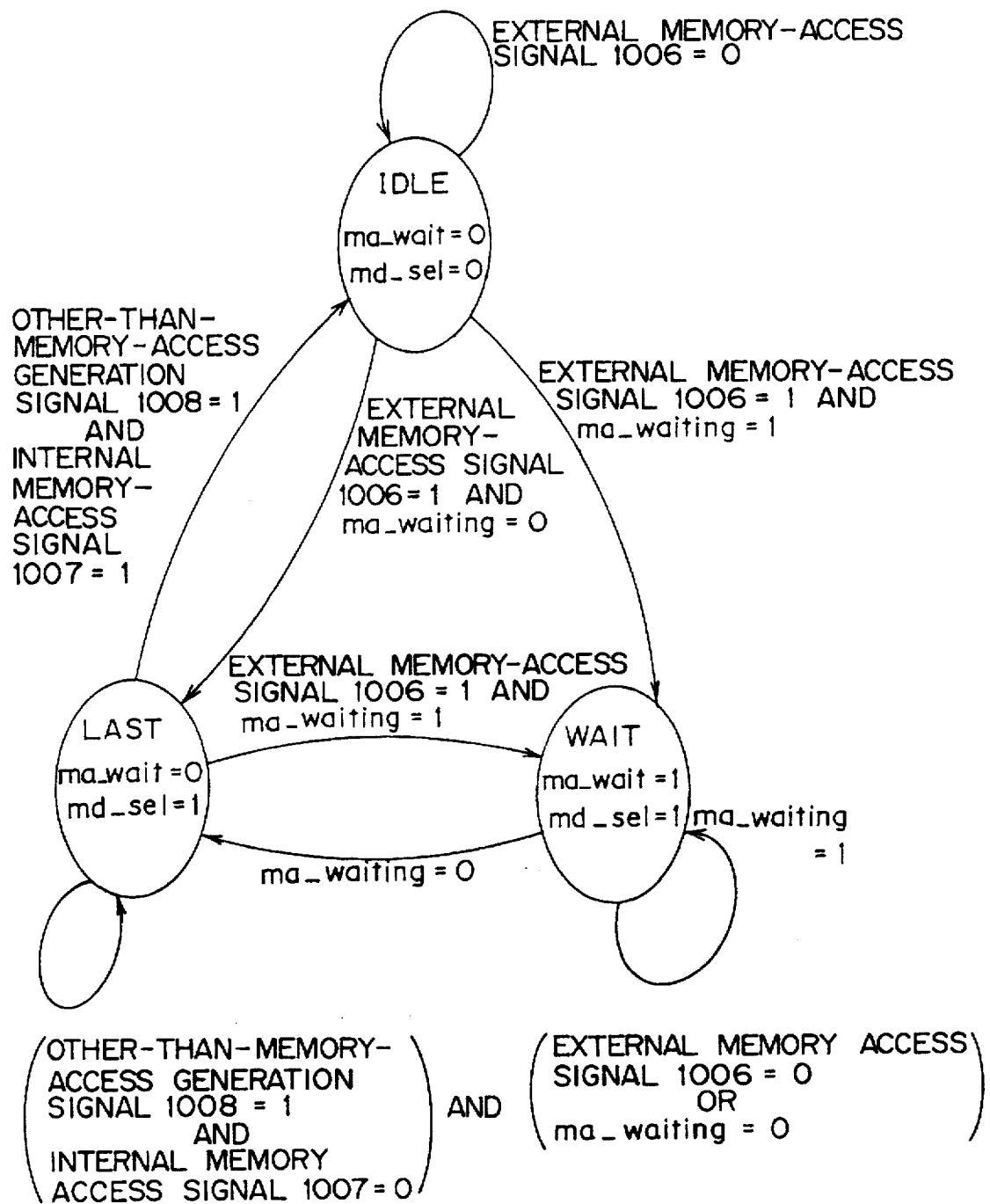
FIG. 37 is a status transition diagram illustrating a memory access stage control operation.

FIG. 37 is a status transition diagram illustrating a memory access stage control operation.

Figure 38:
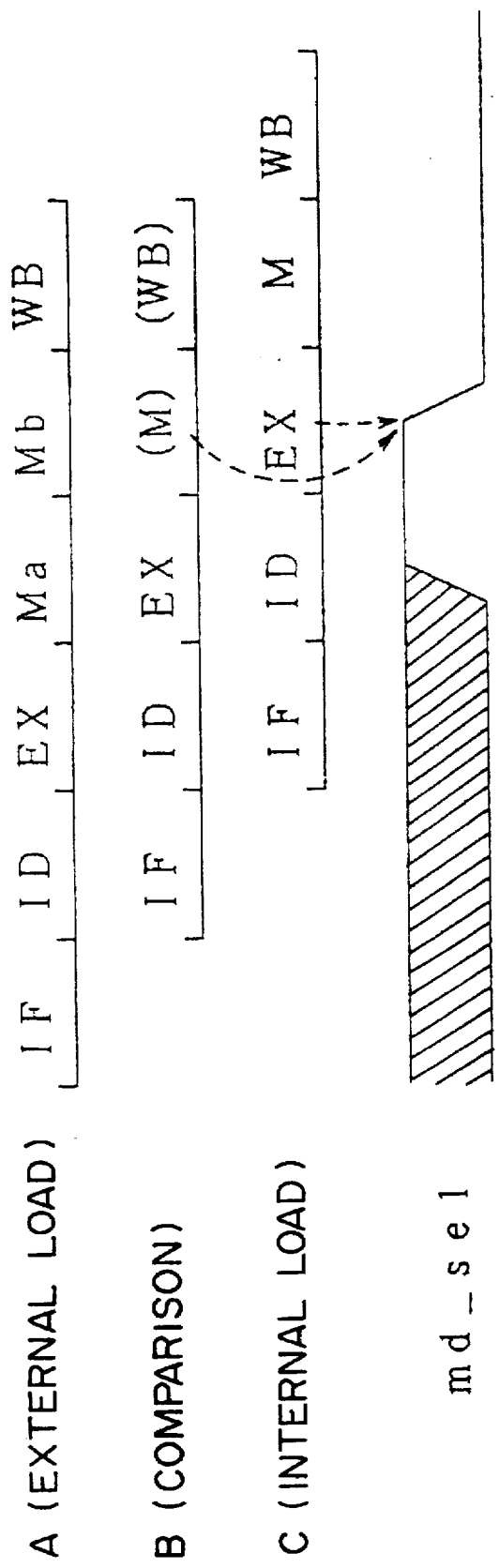
FIG. 38 is a timing chart illustrating a memory access stage control operation.

FIG. 38 is a timing chart illustrating a memory access stage control operation.

The pipeline wait/stage number controller 1001 also functions as a finite status machine regarding a memory access stage control operation, and takes any of three [3] statuses, namely IDLE, WAIT and LAST.

A first status is IDLE. The pipline wait/stage number controller 1001 does not assert an ma_wait signal or an md_sel signal to the pipeline controller shown in FIG. 27. This status can be achieved when an operand access to an internal memory is being executed. In the IDLE status, the memory access stage split unit 609 does not split a memory However, the access stage MA into MAa and MAd. PC_WB 705 receives via the third multiplexer MUX3 an output from the PC_MAd 704d. Because the memory access stage split unit 609 does not have the memory access stage split control unit 610 split the memory access stage MA in the IDLE status, the PC_MAa 704a supplies its output to the PC_WB 705 via the third multiplexer MUX3 without passing through the PC_MAd 704d. As well, in FIG. 26, the memory access unit 604 has the PC MAa 704a supply its output via the third multiplexer MUX3 to the PC_WB 705. Also, in FIG. 28, the memory access module 904 has the REG_MAa1 910a supply its output via the multiplexer MUX9 to the REG_WB1 911.

The pipeline wait/stage number controller 1001 maintains the IDLE status, until the data access controller 917 asserts the external memory access signal 1006, which is a signal indicating that the memory access module 904 executes an operand access to an external memory.

A second status is WAIT. When the data access controller 917 asserts the external memory access signal 1006 and the memory wait number controller 1002 asserts the ma_waiting signal, the pipeline wait/stage number controller 1001 shifts its status from the IDLE status to the WAIT status.

A third status is LAST. When the data access controller 917 asserts the external memory access signal 1006 but the memory wait number controller 1002 does not assert the ma waiting signal, the pipeline wait/stage number controller 1001 shifts its status from the IDLE status to the LAST status.

In the WAIT status, the pipeline wait/stage number controller 1001 asserts both an ma_wait signal and an md_sel signal for the pipeline controller shown in FIG. 27. As shown in parts (a) and (b) in the example shown in FIG. 30, the timing of instruction cycle 4 is the timing of this WAIT status.

The pipeline wait/stage number controller 1001 remains in the WAIT status while the memory wait number controller 1002 asserts the ma_waiting signal. The memory wait number controller 1002 does not assert the ma_waiting signal when no or only one [1] wait is inserted in a memory access stage MA, but does assert the same for a duration of n−1 instruction cycles when n (n≧2) waits are inserted. When the memory wait number controller 1002 negates the ma_waiting signal, the pipeline wait/stage number controller 1001 shifts its status from the WAIT status to the LAST status. In the LAST status, the memory access module 904 executes an operand access. As illustrated in parts (a) and (b) in the example shown in FIG. 30, the timing of instruction cycle 5 is the timing of this LAST status.

The pipeline wait/stage number controller 1001 maintains the LAST status, while at least either the instruction decode module 902 negates the other-than-memory-access instruction generation signal 1008 or the data access controller 917 negates the internal memory access signal 1007 and at least either the data access controller 917 negates the external memory access signal 1006 or the memory wait number controller 1002 negates the ma_waiting signal. Here, the other-than-memory-access instruction generation signal 1008 is a signal indicating the execution of an instruction other than a load instruction or a store instruction. The internal memory access signal 1007 is a signal indicating that the memory access module 904 executes an operand access to an internal memory.

As well, being in the LAST status, when the memory access module 904 executes a new operand access to an external memory, the data access controller 917 asserts the external memory access signal 1006 and the memory wait number controller 1002 asserts the ma_waiting signal, the pipeline wait/stage number controller 1001 shifts from the LAST status to the WAIT status. As illustrated in parts (a) and (b) in the example shown in FIG. 30, the timing of instruction cycle 6 is the timing of this WAIT status.

As described earlier, when the memory access unit 604 executes an operand access to an external memory in the IDLE status in which the memory access stage split control unit 610 has not had the memory access stage split unit 609 split a memory access stage MA, the memory access stage split control unit 610 has the memory access stage split unit 609 split the memory access stage MA, and the PC_MAa 704a supplies its output via the PC_MAd 704d and the third multiplexer MUX3 to the PC_WB 705. (Refer to FIG. 26.)

The memory access module 904 has the REG_MAa1 910a supply its output via the REG_Mad1 910d and the multiplexer MUX9 to the REG_WB1 911. The data access controller 917 receives control signals outputted from the REG MAa1 910a. Consequently, the data access controller 917 outputs to the memory 918 the control signals for instruction B in instruction cycle 6 shown in FIG. 30. Meanwhile, the memory access module 904 has the REG_MA2 916 output to the memory 918 the address corresponding to instruction B in instruction cycle 6 shown in FIG. 30. As a result, in instruction cycle 6, the memory access module 904 reads operand data for instruction A and outputs an address for reading the operand data for instruction B. Then, the memory access unit 604 executes an operand access to an external memory in the LAST status in which the memory access stage split control unit 610 has had the memory access stage split unit 609 split a memory access stage MA into MAa and MAd.

When an instruction not accompanying an access to an internal memory or an external memory in the LAST status is executed, i.e. when the instruction decode module 902 asserts the other-than-memory-access instruction generation signal 1008 and the data access controller 917 asserts the internal memory access signal 1007, the pipeline wait/stage number controller 1001 shifts its status to the IDLE status. As a result, when a comparison operation instruction B is executed after a load instruction A for an external memory and when a succeeding instruction C is a load instruction for an internal memory, the pipeline wait/stage number controller 1001 negates the md__sel signal, thereby unsplitting the split memory access stages MAa and MAd.

The above description of the second embodiment pertains to an exemplary configuration of the pipeline controller for a program counter pipeline. Yet, the application of this invention is by no means limited to such, but is equally effective for a pipeline for supplying to each module an operational code of an instruction or a control signal obtained by decoding it, or a pipeline for supplying an instruction operand to each module.

The second embodiment enables each of an instruction fetch stage IF and a memory access stage MA for pipeline processes to be split or unsplit.

As a result, when an instruction fetch or a memory access of operand data arises for an internal memory contained in the inside of a processor chip, by unsplitting respective split stages, a penalty due to the cancellation of pipeline processes upon generating a branch is minimized.

As well, when an instruction fetch or a memory access of operand data arises for an external memory connected to the outside of the processor chip, by splitting each stage, the duration in which processes of other stages are put on hold is shortened, thereby ameliorating the performance of pipeline processes.

Further, when the execution of a branch instruction generates a branch and a branch target instruction corresponding to the branch is fetched from an internal memory contained in the inside a processor chip, by unsplitting the split instruction fetch stages IFa and IFd; or when the execution of an instruction not accompanying a memory access is succeeded by an instruction for executing the memory access for the internal memory contained in the inside of the processor chip, by unsplitting the split memory access stages MAa and MAd; this invention enables the pipeline status to be optimized without causing effective data to be lost during pipeline processes.

What is claimed is:

1. A processor having a variable stage number pipeline, comprising:
   register means for registering operand data;
   instruction fetch means for fetching an instruction from a memory accessed by the processor, in an instruction fetch stage executable in parallel with other stages;
   instruction decode means for decoding said instruction fetched in said instruction fetch stage, in an instruction decode stage executable in parallel with other stages;
   instruction execute means for executing said instruction decoded in said instruction decode stage, in an instruction execute stage executable in parallel with other stages;
   memory access means for accessing for a read/write operation said memory at an address calculated in said instruction execute stage, in a memory access stage executable in parallel with other stages;
   write back means for writing into said register means either operand data obtained from said memory in said memory access stage or operand data processed in said instruction execute stage, in a write back stage executable in parallel with other stages; and
   instruction fetch stage split means for splitting said instruction fetch stage into an instruction address output stage in which the instruction fetch means outputs to said memory an instruction address, and an instruction data input stage in which the instruction fetch means inputs from said memory input data corresponding to said instruction address.

2. The processor having a variable stage number pipeline according to claim 1, further comprising:
   instruction fetch stage split control means for controlling said instruction fetch stage split means to split said instruction fetch stage, upon fetching an instruction to an external memory connected to the processor, when said instruction fetch stage split means has not split said instruction fetch stage.

3. The processor having a variable stage number pipeline according to claim 2, wherein:
   said instruction fetch stage split control means controls said instruction fetch stage split means to unsplit said instruction fetch stage, upon generating a branch by executing a branch instruction and fetching an instruction from an internal memory having an access time shorter than that of said external memory, when said instruction fetch stage split means has split said instruction fetch stage.

4. The processor having a variable stage number pipeline according to claim 1, further comprising:
   instruction address output stage wait control means for putting said instruction address output stage in a wait status for a desired number of instruction cycles.

5. The processor having a variable stage number pipeline according to claim 1, wherein:
   said instruction fetch means executes an output operation for said instruction address in said instruction address output stage in parallel with an input operation for said instruction data corresponding to an instruction address outputted in a previous stage in said instruction data input stage.

6. A processor having a variable stage number pipeline comprising:
   register means for registering operand data;
   instruction fetch means for fetching an instruction from a memory accessed by the processor, in an instruction fetch stage executable in parallel with other stages;
   instruction decode means for decoding said instruction fetched in said instruction fetch stage, in an instruction decode stage executable in parallel with other stages;
   instruction execute means for executing said instruction decoded in said instruction decode stage, in an instruction execute stage executable in parallel with other stages;
   memory access means for accessing for a read/write operation said memory at an address calculated in said instruction execute stage, in a memory access stage executable in parallel with other stages;
   write back means for writing into said register means either operand data obtained from said memory in said memory access stage or operand data processed in said instruction execute stage, in a write back stage executable in parallel with other stages;
   a pipeline having
      instruction fetch stage data retaining means for retaining data for use in said instruction fetch stage,
      instruction decode stage data retaining means for retaining data for use in said instruction decode stage, instruction execute stage data retaining means for retaining data for use in said instruction execute stage, memory access stage data retaining means for retaining data for use in said memory access stage, and write back stage data retaining means for retaining data for use in said write back stage; and an instruction fetch stage split means for splitting said instruction fetch stage data retaining means into instruction address output stage data retaining means for retaining data for use in said instruction address output stage in which an instruction address is outputted to said memory, and instruction data input stage data retaining means for retaining data for use in said instruction data input stage in which data corresponding to said instruction address is inputted from said memory.

7. The processor having a variable stage number pipeline according to claim 6, further comprising:

instruction fetch stage split control means for controlling said instruction fetch stage split means to split said instruction fetch stage data retaining means, upon fetching an instruction to an external memory connected to the processor, when said instruction fetch stage split means has not split said instruction fetch stage data retaining means.

8. The processor having a variable stage number pipeline according to claim 7, wherein:

said instruction fetch stage split control means controls said instruction fetch stage split means to unsplit said instruction fetch stage data retaining means, upon generating a branch by executing a branch instruction and fetching an instruction from an internal memory having an access time shorter than that of said external memory, when said instruction fetch stage split means has split said instruction fetch stage data retaining means.

9. The processor having a variable stage number pipeline according to claim 6, further comprising:

instruction address output stage wait control means for controlling said instruction address output stage data retaining means to wait for a desired number of instruction cycles in an output operation for data retained by said instruction address output stage data retaining means.

10. The processor having a variable stage number pipeline according to claim 6, wherein:

said data retained by said instruction fetch stage data retaining means, said instruction decode stage data retaining means, said instruction execute stage data retaining means, said memory access stage data retaining means and said write back stage data retaining means in said pipeline are a program counter value.

11. A processor having a variable stage number pipeline comprising:

first memory means for storing an instruction and operand data;

register means for registering said operand data;

instruction fetch means for fetching said instruction from said memory means, in an instruction fetch stage executable in parallel with other stages;

instruction decode means for decoding said instruction fetched in said instruction fetch stage, in an instruction decode stage executable in parallel with other stages;

instruction execute means for executing said instruction decoded in said instruction decode stage, in an instruction execute stage executable in parallel with other stages;

memory access means for accessing for a read/write operation said memory means at an address calculated in said instruction execute stage, in a memory access stage executable in parallel with other stages;

write back means for writing into said register means one of said operand data obtained from said memory means in said memory access stage and said operand data processed in said instruction execute stage, in a write back stage executable in parallel with other stages; and memory access stage split means for splitting said memory access to stage into an operand address output stage for outputting to said memory means an operand address and an operand data read/write stage for accessing said memory means for reading/writing operand data corresponding to said operand address.

12. The processor having a variable stage number pipeline according to claim 11, wherein:

said memory access stage split means also splits a control signal corresponding to each instruction shifted in said memory access means into a signal corresponding to an operand address output stage and a signal corresponding to an operand data read/write stage.

13. The processor having a variable stage number pipeline according to claim 11, further comprising:

second memory means having an access time longer than that of said first memory means for storing said operand data;

memory access stage split control means for controlling said memory access stage split means to split said memory access stage, upon accessing for reading/writing said operand data from/to said second memory means, when said memory access stage split means has not split said memory access stage.

14. The processor having a variable stage number pipeline according to claim 13, wherein:

said memory access stage split control means controls said memory access stage split means to unsplit said memory access stage, upon executing an instruction not accompanying a memory access and a memory access executed by a succeeding instruction for said first memory means when said memory access stage split means has split said memory access stage.

15. The processor having a variable stage number pipeline according to claim 11, further comprising:

operand address output stage wait control means for putting said operand address output stage in a wait status for a desired number of instruction cycles.

16. The processor having a variable stage number pipeline according to claim 11, wherein:

said memory access means executes an output operation for said operand address in said operand address output stage in parallel with a read/write operation for said operand data in said operand data read/write stage.

17. A variable pipeline controller comprising:

first memory means for storing an instruction and operand data;

register means for registering said operand data;

instruction fetch means for fetching said instruction from said memory means, in an instruction fetch stage executable in parallel with other stages;

instruction decode means for decoding said instruction fetched in said instruction fetch stage, in an instruction decode stage executable in parallel with other stages;

instruction execute means for executing said instruction decoded in said instruction decode stage, in an instruction execute stage executable in parallel with other stages;

memory access means for accessing for a read/write operation said memory means at an address calculated in said instruction execute stage, in a memory access stage executable in parallel with other stages;

write back means for writing into said register means one of said operand data obtained from said memory means in said memory access stage and said operand data processed in said instruction execute stage, in a write back stage executable in parallel with other stages;

a pipeline having
- memory access stage data retaining means for retaining data for use in said memory access stage,
- instruction decode stage retaining means for retaining data for use in said instruction decode stage,
- instruction execute stage data retaining means for retaining data for use in said instruction execute stage,
- memory access stage data retaining means for retaining data for use in said memory access stage, and
- write back stage data retaining means for retaining data for use in said write back stage; and
- memory access stage split means for splitting said memory access stage data retaining means into
- operand address output stage data retaining means for retaining data for use in said operand address output stage for outputting to said first memory means an operand address, and
- an operand data read/write stage data retaining means for retaining data for use in said operand data read/write stage for accessing said first memory means for reading/writing operand data corresponding to said operand address.

18. The variable length pipeline controller according to claim 17, further comprising:

second memory means having an access time longer than that of said first memory for storing said operand data; and a memory access stage split control means for controlling said memory access stage split means to split said memory access stage data retaining means, upon accessing for reading/writing said operand data from/to said second memory means, when said memory access stage split means has not split said memory access stage data retaining means.

19. The variable length pipeline controller according to claim 18, wherein:

said memory access stage split control means controls said memory access stage split means to unsplit said memory access stage data retaining means, upon executing an instruction not accompanying a memory access and a memory access executed by a succeeding instruction is for said first memory means, when said memory access stage split means has split said memory access stage data retaining means.

20. The variable length pipeline controller according to claim 17, comprising:

operand address output stage wait control means for having said operand address output stage data retaining means wait for a desired number of instruction cycles in an output operation for data retained by said operand address output stage data retaining means.

21. The variable length pipeline controller according to claim 17, wherein:

said data retained by said memory access stage data retaining means are a program counter value.

22. A variable length pipeline controller comprising:

first memory means for storing an instruction and operand data;

register means for registering said operand data;

instruction fetch means for fetching said instruction from said memory means, in an instruction fetch stage executable in parallel with other stages;

instruction decode means for decoding said instruction fetched in said instruction fetch stage, in an instruction decode stage executable in parallel with other stages;

instruction execute means for executing said instruction decoded in said instruction decode stage, in an instruction execute stage executable in parallel with other stages;

memory access means for accessing for a read/write operation said memory means at an address calculated in said instruction execute stage, in a memory access stage executable in parallel with other stages;

write back means for writing into said register means one of said operand data obtained from said memory means in said memory access stage and said operand data processed in said instruction execute stage, in a write back stage executable in parallel with other stages;

instruction fetch stage split means for splitting said instruction fetch stage into
- an instruction address output stage for outputting to said first memory means an instruction address, and
- an instruction data input stage for inputting from said first memory means input data corresponding to said instruction address; and memory access stage split means for splitting said memory access stage into
- an operand address output stage for outputting to said first memory means an operand address, and
- an operand data read/write stage for accessing said first memory means for reading/writing operand data corresponding to said operand address.

23. The variable length pipeline controller according to claim 22, further comprising:

second memory means having an access time longer than that of said first memory means for storing an instruction; and an instruction fetch stage split control means for controlling said instruction fetch stage split means to split said instruction fetch stage, upon fetching an instruction to said second memory means, when said instruction fetch stage split means has not split said instruction fetch stage.

24. The variable length pipeline controller according to claim 23, wherein:

said instruction fetch stage split control means controls said instruction fetch stage split means to unsplit said instruction fetch stage, upon generating a branch by executing a branch instruction and fetching an instruction from said first memory means, when said instruction fetch stage split means has split said instruction fetch stage.

25. The variable length pipeline controller according to claim 22, further comprising:

second memory means having an access time longer than that of said first memory means for storing said operand data; and a memory access stage split control means for controlling said memory access stage split means to split said memory access stage, upon accessing for reading/writing said operand data from/to said second memory means, when said memory access stage split means has not split said memory access stage.

26. The variable length pipeline controller according to claim 25, wherein:

said memory access stage split control means controls said memory access stage split means to unsplit said memory access stage, upon executing an instruction not accompanying a memory access and a memory access executed by a succeeding instruction is for said first memory means, when said memory access stage split means has split said memory access stage.

27. The variable length pipeline controller according to claim 22, further comprising:

instruction address output stage wait control means for putting said instruction address output stage in a wait status for a desired number of instruction cycles; and operand address output stage wait control means for putting said operand address output stage in a wait status for a desired number of instruction cycles.

28. The variable length pipeline controller according to claim 22, wherein:

said instruction fetch means executes an output operation for said instruction address in said instruction address output stage in parallel with an input operation for said instruction data in said instruction data input stage; and said memory access means executes an output operation for said operand address in said operand address output stage in parallel with a read/write operation for said operand data in said operand data read/write stage.

29. A variable length pipeline controller comprising:

first memory means for storing an instruction and operand data;

register means for registering said operand data;

instruction fetch means for fetching said instruction from said memory means, in an instruction fetch stage executable in parallel with other stages;

instruction decode means for decoding said instruction fetched in said instruction fetch stage, in an instruction decode stage executable in parallel with other stages;

instruction execute means for executing said instruction decoded in said instruction decode stage, in an instruction execute stage executable in parallel with other stages;

memory access means for accessing for a read/write operation said memory means at an address calculated in said instruction execute stage, in a memory access stage executable in parallel with other stages;

write back means for writing into said register means one of said operand data obtained from said memory means in said memory access stage and said operand data processed in said instruction execute stage, in a write back stage executable in parallel with other stages;

a pipeline having instruction fetch stage data retaining means for retaining data for use in said instruction fetch stage, instruction decode stage data retaining means for retaining data for use in said instruction decode stage, instruction execute stage data retaining means for retaining data for use in said instruction execute stage, memory access stage data retaining means for retaining data for use in said memory access stage, and write back stage data retaining means for retaining data for use in said write back stage;

instruction fetch stage split means for splitting said instruction fetch stage data retaining means into instruction address output stage data retaining means for retaining data for use in said instruction address output stage for outputting to said first memory means an instruction address, and instruction data input stage data retaining means for retaining data for use in said instruction data input stage for inputting from said first memory means input data corresponding to said instruction address; and memory access stage split means for splitting said memory access stage data retaining means into operand address output stage data retaining means for retaining data for use in said operand address output stage for outputting to said first memory means an operand address, and an operand data read/write stage data retaining means for retaining data for use in said operand data read/write stage for accessing said first memory means for reading/writing operand data corresponding to said operand address.

30. The variable length pipeline controller according to claim 29, further comprising:

second memory means having an access time longer than that of said first memory means for storing an instruction; and instruction fetch stage split control means for controlling said instruction fetch stage split means to split said instruction fetch stage data retaining means, upon fetching an instruction to said second memory means, when said instruction fetch stage split means has not split said instruction fetch stage data retaining means.

31. The variable length pipeline controller according to claim 30, wherein:

said instruction fetch stage split control means controls said instruction fetch stage split means to unsplit said instruction fetch stage data retaining means, upon generating a branch by executing a branch instruction and fetching an instruction from said first memory means, when said instruction fetch stage split means has split said instruction fetch stage data retaining means.

32. The variable length pipeline controller according to claim 29, further comprising:

second memory means having an access time longer than that of said first memory means for storing operand data; and memory access stage split control means for controlling said memory access stage split means to split said memory access stage data retaining means, upon accessing for reading/writing said operand data from/to said second memory means, when said memory access stage split means has not split said memory access stage data retaining means.

33. The variable length pipeline controller according to claim 32, wherein:

said memory access stage split control means controls said memory access stage split means to unsplit said memory access stage data retaining means, upon executing an instruction not accompanying a memory access and a memory access executed by a succeeding instruction is for said first memory means, when said memory access stage split means has split said memory access stage data retaining means.

34. The variable length pipeline controller according to claim 29 further comprising:

instruction address output stage wait control means for having said instruction address output stage data retaining means wait for a desired number of instruction cycles in an output operation for data retained by said instruction address output stage data retaining means; and operand address output stage wait control means for having said operand address output stage data retaining means wait for a desired number of instruction cycles in an output operation for data retained by said operand address output stage data retaining means.

35. The variable length pipeline controller according to claim 29, wherein:

said data retained by said pipeline are a program counter value.

36. A pipeline processing method for use in a processor apparatus having a pipeline function, comprising:

an instruction address output stage of outputting an address for fetching a first instruction;

an instruction data input stage of outputting an address for fetching a second instruction and of inputting data at said first instruction;

an instruction decode stage of decoding said first instruction inputted in said instruction data input stage;

an instruction execute stage of executing said first instruction decoded in said instruction decode stage;

a memory access stage of either reading or writing data at an address calculated from said first instruction executed in said instruction execute stage, when said first instruction is an instruction for either one of reading from and writing to a memory said operand data; and a write back stage of writing data into an register, when said first instruction is an instruction for writing said data into said register.

37. A pipeline process method for use in a processor apparatus having a pipeline function, comprising:

an instruction fetch stage of fetching a first instruction;

an instruction decode stage of decoding said first instruction fetched in said instruction fetch stage;

an instruction execute stage of executing said first instruction decoded in said instruction decode stage;

an operand address output stage for outputting an address calculated from said first instruction executed in said instruction execute stage;

an operand data read/write stage of outputting an address calculated by executing a second instruction, when said second instruction is an instruction for either one of reading from and writing to a memory said operand data; and a write back stage of writing data into a register, when said first instruction is an instruction for writing said data into said register.

38. A pipeline processing method for use in a processor apparatus having a pipeline function, comprising:

an instruction address output stage of outputting an address for fetching a first instruction;

an instruction data input stage of outputting an address for fetching a second instruction and of inputting data on said first instruction;

an instruction decode stage of decoding said first instruction inputted in said instruction address input stage;

an instruction execute stage of executing said first instruction decoded in said instruction decode stage;

an operand address output stage for outputting an address calculated from said first instruction executed in said instruction execute stage;

an operand data read/write stage of outputting an address calculated by executing a second instruction, when said second instruction is an instruction for either one of reading from and writing to a memory operand data; and a write back stage of writing data into a register, when said first instruction is an instruction for writing said data into said register.

39. A variable stage number pipeline controller for use in a processor comprising:

instructions fetch means for fetching an instruction from a memory accessed by the processor, in an instruction fetch stage executable in parallel with other stages;

instruction decode means for decoding said instruction fetched in said instruction fetch stage, in an instruction decode stage executable in parallel with other stages;

instruction execute means for executing said instruction decoded in said instruction decode stage, in an instruction execute stage executable in parallel with other stages;

memory access means for accessing for a read/write operation said memory at an address calculated in said instruction execute stage, in a memory access stage executable in parallel with other stages;

write back means for writing into a register equipped with the processor either operand data obtained from said memory in said memory access stage or operand data processed in said instruction execute stage, in a write back stage executable in parallel with other stages; and instruction fetch stage split means for splitting said instruction fetch stage into an instruction address output stage in which the instruction fetch means outputs to said memory an instruction address, and an instruction data input stage in which the instruction fetch means is inputted from said memory input data corresponding to said instruction address.

40. The variable stage number pipeline controller for use in a processor according to claim 39, further comprising:

instruction fetch stage split control means for controlling said instruction fetch stage split means to split said instruction fetch stage, upon fetching an instruction to an external memory connected to the processor, when said instruction fetch stage split means has not split said instruction fetch stage.

41. The variable stage number pipeline controller for use in a processor according to claim 39, wherein:

said instruction fetch stage split control means controls said instruction fetch stage split means to unsplit said instruction fetch stage, upon generating a branch by executing a branch instruction and fetching an instruction from an internal memory having an access time shorter than that of said external memory, when said instruction fetch stage split means has split said instruction fetch stage.

42. The variable stage number pipeline controller for use in a processor according to claim 39, further comprising:

instruction address output stage wait control means for putting said instruction address output stage in a wait status for a desired number of instruction cycles.

43. The variable stage number pipeline controller for use in a processor according to claim 39, wherein:

said instruction fetch means executes an output operation for said instruction address in said instruction address output stage in parallel with an input operation for said instruction data corresponding to instruction address outputted in a previous stage in said instruction data input stage.

* * * * *

UNITED STATES PATENT AND TRADEMARK OFFICE
CERTIFICATE OF CORRECTION

PATENT NO. : 5,706,459
DATED : January 6, 1998
INVENTOR(S) : Sakurai ATSUSHI

It is certified that error appears in the above-identified patent and that said Letters Patent is hereby corrected as shown below:

Col. 6, line 33, change "$PC_{13}IF$" to --PC_IF-- line 39, change "$ex_{13}wait$" to --ex_wait--

Col 24, line 6, change "Mar" to --Ma,--

Col. 29, line 51, change "PCadder" to --PC_adder--

Signed and Sealed this

Second Day of June, 1998

Attest:

BRUCE LEHMAN

*Attesting Officer*   Commissioner of Patents and Trademarks